US011303928B2

(12) United States Patent
Ikai et al.

(10) Patent No.: US 11,303,928 B2
(45) Date of Patent: Apr. 12, 2022

(54) IMAGE DECODING APPARATUS AND IMAGE CODING APPARATUS

(71) Applicants: Sharp Kabushiki Kaisha, Sakai (JP); FG Innovation Company Limited, New Territories (HK)

(72) Inventors: Tomohiro Ikai, Sakai (JP); Tomonori Hashimoto, Sakai (JP)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 16/650,027

(22) PCT Filed: Sep. 21, 2018

(86) PCT No.: PCT/JP2018/035003
§ 371 (c)(1),
(2) Date: Mar. 24, 2020

(87) PCT Pub. No.: WO2019/065488
PCT Pub. Date: Apr. 4, 2019

(65) Prior Publication Data
US 2020/0280737 A1 Sep. 3, 2020

(30) Foreign Application Priority Data
Sep. 28, 2017 (JP) .............................. JP2017-189061

(51) Int. Cl.
*H04N 19/593* (2014.01)
*H04N 19/176* (2014.01)
(Continued)

(52) U.S. Cl.
CPC ......... *H04N 19/593* (2014.11); *H04N 19/176* (2014.11); *H04N 19/619* (2014.11); *H04N 19/70* (2014.11); *H04N 19/82* (2014.11)

(58) Field of Classification Search
CPC .... H04N 19/119; H04N 19/12; H04N 19/159; H04N 19/176; H04N 19/593; H04N 19/619; H04N 19/70; H04N 19/82
See application file for complete search history.

(56) References Cited

U.S. PATENT DOCUMENTS

2017/0324643 A1* 11/2017 Seregin .................. H04N 19/16
2018/0020218 A1* 1/2018 Zhao ...................... H04N 19/12
(Continued)

FOREIGN PATENT DOCUMENTS

JP      2014-045434 A      3/2014

OTHER PUBLICATIONS

Official Communication issued in International Patent Application No. PCT/JP2018/035003, dated Dec. 25, 2018.
(Continued)

*Primary Examiner* — Farzana Hossain
(74) *Attorney, Agent, or Firm* — ScienBiziP, P.C.

(57) ABSTRACT

An image decoding apparatus and an image coding apparatus are implemented that are capable of more efficiently and effectively performing reconstruction of a prediction residual for a TU. An image decoding apparatus (1) is an image decoding apparatus including: a transforming unit (15) configured to perform, on a prescribed unit basis, inverse transform of a transform coefficient or a modification transform coefficient by using a transform basis selected from a plurality of the transform bases, in which the plurality of the transform bases include a first transform basis and a second transform basis obtained by performing symmetric transform of the first transform basis.

7 Claims, 36 Drawing Sheets

(51) Int. Cl.
  *H04N 19/61* (2014.01)
  *H04N 19/70* (2014.01)
  *H04N 19/82* (2014.01)

(56) References Cited

U.S. PATENT DOCUMENTS

2018/0098081 A1\* 4/2018 Zhao ................... H04N 19/176
2020/0213626 A1\* 7/2020 Ikai ....................... H04N 19/12

OTHER PUBLICATIONS

Chen et al., "Algorithm Description of Joint Exploration Test Model 5 (JEM 5)", Joint Video Exploration Team (JVET) of ITU-T SG 16 WP 3 and ISO/IEC JTC 1/SC 29/WG 11, JVET-E1001-v2, Jan. 12-20, 2017, 8 pages.
Chen et al., "Algorithm Description of Joint Exploration Test Model 7 (JEM 7)", Joint Video Exploration Team (JVET) of ITU-T SG 16 WP 3 and ISO/IEC JTC 1/SC 29/WG 11, JVET-G1001-v1, Jul. 13-21, 2017, 50 pages.
Elena Alshina et al., "CE7: Experimental results of ROT by Samsung", JCTVC-E380, Joint Collaborative Team On Video Coding (JCT-VC) of ITU-T SG16 WP3 and ISO/IEC JTC1/SC29/WG11, 5th Meeting: Geneva, CH, Mar. 16-23, 2011, Mar. 17, 2011.
X. Zhao et al., "TU-level non-separable secondary transform", JVET-B0059, Joint Video Exploration Team (JVET) of ITU-T SG16 WP3 and ISO/IEC JTC1/SC29/WG11, 2nd Meeting: San Diego, USA, Feb. 20-26, 2016.

\* cited by examiner

| coding_tree_unit( ) { | Descriptor | |
|---|---|---|
| xCtb = ( CtbAddrInRs % PicWidthInCtbsY )<<CtbLog2SizeY | | |
| yCtb = ( CtbAddrInRs / PicWidthInCtbsY )<<CtbLog2SizeY | | |
| if( slice_sao_luma_flag \|\| slice_sao_chroma_flag ) | | |
| sao( xCtb >> CtbLog2SizeY, yCtb >> CtbLog2SizeY ) | | |
| coding_quadtree( xCtb, yCtb, CtbLog2SizeY, 0 ) | | ←SYN1400 |
| } | | |

| coding_quadtree( x0, y0, log2CbSize, cqtDepth ) { | Descriptor | |
|---|---|---|
| if( x0 + ( 1<<log2CbSize ) <= pic_width_in_luma_samples && <br> y0 + ( 1<<log2CbSize ) <= pic_height_in_luma_samples && <br> log2CbSize > MinCbLog2SizeY ) | | ←SYN1411 |
| split_cu_flag[ x0 ][ y0 ] | ae(v) | ←SYN1421 |
| if( split_cu_flag[ x0 ][ y0 ] ) { | | |
| x1 = x0 + ( 1<<( log2CbSize − 1 ) ) | | |
| y1 = y0 + ( 1<<( log2CbSize − 1 ) ) | | |
| coding_quadtree( x0, y0, log2CbSize − 1, cqtDepth + 1 ) | | ←SYN1441A |
| if( x1 < pic_width_in_luma_samples ) | | |
| coding_quadtree( x1, y0, log2CbSize − 1, cqtDepth + 1 ) | | ←SYN1441B |
| if( y1 < pic_height_in_luma_samples ) | | |
| coding_quadtree( x0, y1, log2CbSize − 1, cqtDepth + 1 ) | | ←SYN1441C |
| if( x1 < pic_width_in_luma_samples && y1 < pic_height_in_luma_samples ) | | |
| coding_quadtree( x1, y1, log2CbSize − 1, cqtDepth + 1 ) | | ←SYN1441D |
| } else | | |
| coding_unit( x0, y0, log2CbSize ) | | ←SYN1500 |
| } | | |

FIG. 7

| | Descriptor | |
|---|---|---|
| coding_unit( x0, y0, log2CbSize ) { | | |
|   if( transquant_bypass_enabled_flag ) | | ←SYN1505 |
|     cu_transquant_bypass_flag | ae(v) | |
|   if( slice_type!=I ) | | |
|     cu_skip_flag[ x0 ][ y0 ] | ae(v) | ←SYN1511 |
|   nCbS = ( 1<<log2CbSize ) | | |
|   if( cu_skip_flag[ x0 ][ y0 ] ) | | ←SYN1512 |
|     prediction_unit( x0, y0, nCbS, nCbS ) | | |
|   else { | | |
|     if( slice_type!=I ) | | |
|       pred_mode_flag | ae(v) | ←SYN1611 |
|     if( CuPredMode[ x0 ][ y0 ]!=MODE_INTRA \|\| log2CbSize==MinCbLog2SizeY ) | | |
|       part_mode | ae(v) | ←SYN1621 |
|     if( CuPredMode[ x0 ][ y0 ]==MODE_INTRA ) { | | |
|     ... | | |
|     } else { | | |
|       if( PartMode==PART_2Nx2N ) | | |
|         prediction_unit( x0, y0, nCbS, nCbS ) | | ←SYN1631A |
|       else if( PartMode==PART_2NxN ) { | | |
|         prediction_unit( x0, y0, nCbS, nCbS / 2 ) | | ←SYN1631B |
|         prediction_unit( x0, y0 - ( nCbS / 2 ), nCbS, nCbS / 2 ) | | ←SYN1631C |
|       } else if( PartMode==PART_Nx2N ) { | | |
|         prediction_unit( x0, y0, nCbS / 2, nCbS ) | | ←SYN1631D |
|         prediction_unit( x0 + ( nCbS / 2 ), y0, nCbS / 2, nCbS ) | | ←SYN1631E |
|       } else { /* PART_NxN */ | | |
|         prediction_unit( x0, y0, nCbS / 2, nCbS / 2 ) | | ←SYN1631F |
|         prediction_unit( x0 + ( nCbS / 2 ), y0, nCbS / 2, nCbS / 2 ) | | ←SYN1631G |
|         prediction_unit( x0, y0 - ( nCbS / 2 ), nCbS / 2, nCbS / 2 ) | | ←SYN1631H |
|         prediction_unit( x0 + ( nCbS / 2 ), y0 + ( nCbS / 2 ), nCbS / 2, nCbS / 2 ) | | ←SYN1631I |
|       } | | |
|     } | | |
|     rqt_root_cbf | | ←SYN1513 |
|     if( rqt_root_cbf ) { | | ←SYN1514 |
|       transform_tree( x0, y0, x0, y0, log2CbSize, 0, 0 ) | | |
|     } | | |
| } | | |

FIG. 8

| prediction_unit( x0, y0, nPbW, nPbH ) { | Descriptor |
|---|---|
|   if( cu_skip_flag[ x0 ][ y0 ] ) { | |
|     if( MaxNumMergeCand > 1 ) | |
|       merge_idx[ x0 ][ y0 ] | ae(v) |
|   } else { /* MODE_INTER */ | |
|     merge_flag[ x0 ][ y0 ] | ae(v) |
|     if( merge_flag[ x0 ][ y0 ] ) { | |
|       if( MaxNumMergeCand > 1 ) | |
|         merge_idx[ x0 ][ y0 ] | ae(v) |
|     } else { | |
|       if( slice_type == B ) | |
|         inter_pred_idc[ x0 ][ y0 ] | ae(v) |
|       if( inter_pred_idc[ x0 ][ y0 ] != PRED_L1 ) { | |
|         if( num_ref_idx_l0_active_minus1 > 0 ) | |
|           ref_idx_l0[ x0 ][ y0 ] | ae(v) |
|         mvd_coding( x0, y0, 0 ) | |
|         mvp_l0_flag[ x0 ][ y0 ] | ae(v) |
|       } | |
|       if( inter_pred_idc[ x0 ][ y0 ] != PRED_L0 ) { | |
|         if( num_ref_idx_l1_active_minus1 > 0 ) | |
|           ref_idx_l1[ x0 ][ y0 ] | ae(v) |
|         if( mvd_l1_zero_flag && inter_pred_idc[ x0 ][ y0 ] == PRED_BI ) { | |
|           MvdL1[ x0 ][ y0 ][ 0 ] = 0 | |
|           MvdL1[ x0 ][ y0 ][ 1 ] = 0 | |
|         } else | |
|           mvd_coding( x0, y0, 1 ) | |
|         mvp_l1_flag[ x0 ][ y0 ] | ae(v) |
|       } | |
|     } | |
|   } | |
| } | |

FIG. 9

(a)
coreTrSet

| coreTrSetIdx | Name | amt_trans_idx=0 | amt_trans_idx=1 |
|---|---|---|---|
| 0 | TrSetIntra0 | DST7 | DCT8 |
| 1 | TrSetIntra1 | DST7 | DST1 |
| 2 | TrSetIntra2 | DST7 | DCT5 |
| 3 | TrSetInter | DCT8 | DST7 |

(b)

| coreTrIdx | TRANSFORM BASE |
|---|---|
| 0 | DCT2 |
| 1 | DCT5 |
| 2 | DCT8 |
| 3 | DST1 |
| 4 | DST7 |

FIG. 11

CoreTrSetTbl

| Intra Pred Mode | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| Horizontal | 2 | 1 | 0 | 1 | 0 | 1 | 0 | 1 | 0 | 0 | 0 | 0 | 0 | 1 | 0 | 1 | 0 | 1 |
| Vertical | 2 | 1 | 0 | 1 | 0 | 1 | 0 | 1 | 2 | 2 | 2 | 2 | 2 | 1 | 0 | 1 | 0 | 1 |
| Intra Pred Mode | 18 | 19 | 20 | 21 | 22 | 23 | 24 | 25 | 26 | 27 | 28 | 29 | 30 | 31 | 32 | 33 | 34 | |
| Horizontal | 0 | 1 | 0 | 1 | 0 | 1 | 2 | 2 | 2 | 2 | 2 | 1 | 0 | 1 | 0 | 1 | 0 | |
| Vertical | 0 | 1 | 0 | 1 | 0 | 1 | 0 | 0 | 0 | 0 | 0 | 1 | 0 | 1 | 0 | 1 | 0 | |

FIG. 12

( o ) EXISTING CoreTrIdx

| CoreTrSetIdx | Name | amt_trans_idx=0 | amt_trans_idx=1 |
|---|---|---|---|
| 0 | TrSetIntra0 | DST7 | DCT8 |
| 1 | TrSetIntra1 | DST7 | DST1 |
| 2 | TrSetIntra2 | DST7 | DCT5 |
| 3 | TrSetInter | DCT8 | DST7 |

( a ) CoreTrIdx IN A CASE OF DST7Swap

| CoreTrSetIdx | Name | amt_trans_idx=0 | amt_trans_idx=1 |
|---|---|---|---|
| 0 | TrSetIntra0 | DST7 | DST7Swap |
| 1 | TrSetIntra1 | DST7 | DST1 |
| 2 | TrSetIntra2 | DST7 | DCT5 |
| 3 | TrSetInter | DST7Swap | DST7 |

( b ) CoreTrIdx IN A CASE OF DST8Swap

| CoreTrSetIdx | Name | amt_trans_idx=0 | amt_trans_idx=1 |
|---|---|---|---|
| 0 | TrSetIntra0 | DCT8Swap | DCT8 |
| 1 | TrSetIntra1 | DCT8Swap | DST1 |
| 2 | TrSetIntra2 | DCT8Swap | DCT5 |
| 3 | TrSetInter | DCT8 | DCT8Swap |

( c ) CoreTrIdx IN A CASE OF DST4Swap

| CoreTrSetIdx | Name | amt_trans_idx=0 | amt_trans_idx=1 |
|---|---|---|---|
| 0 | TrSetIntra0 | DST4 | DST4Swap |
| 1 | TrSetIntra1 | DST4 | DST1 |
| 2 | TrSetIntra2 | DST4 | DCT5 |
| 3 | TrSetInter | DST4Swap | DST4 |

( d ) CoreTrIdx IN A CASE OF DCT5Swap

| CoreTrSetIdx | Name | amt_trans_idx=0 | amt_trans_idx=1 |
|---|---|---|---|
| 0 | TrSetIntra0 | DCT5Swap | DCT8 |
| 1 | TrSetIntra1 | DST7 | DST1 |
| 2 | TrSetIntra2 | DST7 | DCT5 |
| 3 | TrSetInter | DCT8 | DST7 |

FIG. 16

(a) EXAMPLE OF DST7 AND Swap transMatrixDST7b8 =
[[ 117   219   296   336]
 [ 296   296     0  -296]
 [ 336  -117  -296   219]
 [ 219  -336   296  -117]]

transMatrixDST7b8Swap =
[[ 336   296   219   117]
 [-296     0   296   296]
 [ 219  -296  -117   336]
 [-117   296  -336   219]]

(b) EXAMPLE OF DST8 AND Swap transMatrixDCT8b8 =
[[ 336   296   219   117]
 [ 296     0  -296  -296]
 [ 219  -296  -117   336]
 [ 117  -296   336  -219]]

transMatrixDCT8b8Swap =
[[ 117   219   296   336]
 [-296  -296     0   296]
 [ 336  -117  -296   219]
 [-219   336  -296   117]]

(c) EXAMPLE OF DST4 AND Swap transMatrixDST4b8 =
[[  71   201   301   355]
 [ 201   355    71  -301]
 [ 301    71  -355   201]
 [ 355  -301   201   -71]]

transMatrixDST4b8Swap =
[[ 355   301   201    71]
 [-301    71   355   201]
 [ 201  -355    71   301]
 [ -71   201  -301   355]]

(d) EXAMPLE OF DCT5 AND Swap transMatrixDCT5b8 =
[[ 194   274   274   274]
 [ 274   241   -86  -349]
 [ 274   -86  -349   241]
 [ 274  -349   241   -86]]

transMatrixDCT5b8Swap =
[[ 274   274   274   194]
 [-349   -86   241   274]
 [ 241  -349   -86   274]
 [ -86   241  -349   274]]

FIG. 17

(a) EXAMPLE OF DST7 AND Swap transMatrixDST7b6 =
[[ 29  55  74  84]
 [ 74  74   0 -74]
 [ 84 -29 -74  55]
 [ 55 -84  74 -29]]

transMatrixDST7b6Swap =
[[ 84  74  55  29]
 [-74   0  74  74]
 [ 55 -74 -29  84]
 [-29  74 -84  55]]

(b) EXAMPLE OF DST8 AND Swap transMatrixDCT8b6 =
[[ 84  74  55  29]
 [ 74   0 -74 -74]
 [ 55 -74 -29  84]
 [ 29 -74  84 -55]]

transMatrixDCT8b6Swap =
[[ 29  55  74  84]
 [-74 -74   0  74]
 [ 84 -29 -74  55]
 [-55  84 -74 -29]]

FIG. 18

| coding_unit( x0, y0, log2CbSize ) { | Descriptor | |
|---|---|---|
| if( transquant_bypass_enabled_flag ) | | ← SYN1505 |
| cu_transquant_bypass_flag | ae(v) | |
| if( slice_type != I ) | | |
| cu_skip_flag[ x0 ][ y0 ] | ae(v) | ← SYN1511 |
| nCbS = ( 1 << log2CbSize ) | | |
| if( cu_skip_flag[ x0 ][ y0 ] ) | | ← SYN1512 |
| prediction_unit( x0, y0, nCbS, nCbS ) | | |
| else { | | |
| if( slice_type != I ) | | |
| pred_mode_flag | ae(v) | ← SYN1611 |
| else { | | |
| if( CuPredMode[ x0 ][ y0 ] != MODE_INTRA \|\| log2CbSize == MinCbLog2SizeY ) | | |
| part_mode | ae(v) | ← SYN1621 |
| if( CuPredMode[ x0 ][ y0 ] == MODE_INTRA ) { | | |
| ... | | |
| } else { | | |
| if( PartMode == PART_2Nx2N ) | | |
| prediction_unit( x0, y0, nCbS, nCbS ) | | |
| else if( PartMode == PART_2NxN ) { | | |
| prediction_unit( x0, y0, nCbS, nCbS / 2 ) | | |
| prediction_unit( x0, y0 + ( nCbS / 2 ), nCbS, nCbS / 2 ) | | |
| } else if( PartMode == PART_Nx2N ) { | | |
| prediction_unit( x0, y0, nCbS / 2, nCbS ) | | |
| prediction_unit( x0 + ( nCbS / 2 ), y0, nCbS / 2, nCbS ) | | |
| } else { /* PART_NxN */ | | |
| prediction_unit( x0, y0, nCbS / 2, nCbS / 2 ) | | |
| prediction_unit( x0 + ( nCbS / 2 ), y0, nCbS / 2, nCbS / 2 ) | | |
| prediction_unit( x0, y0 + ( nCbS / 2 ), nCbS / 2, nCbS / 2 ) | | |
| prediction_unit( x0 + ( nCbS / 2 ), y0 + ( nCbS / 2 ), nCbS / 2, nCbS / 2 ) | | |
| } | | |
| } | | |
| if( !pcm_flag[ x0 ][ y0 ] ) { | | |
| if( CuPredMode[ x0 ][ y0 ] != MODE_INTRA && !( PartMode == PART_2Nx2N && merge_flag[ x0 ][ y0 ] ) ) | | |
| rqt_root_cbf | ae(v) | ← SYN1513 |
| if( rqt_root_cbf ) { | | |
| MaxTrafoDepth = ( CuPredMode[ x0 ][ y0 ] == MODE_INTRA ? ( max_transform_hierarchy_depth_intra + IntraSplitFlag ) : max_transform_hierarchy_depth_inter ) | | |
| transform_tree( x0, y0, x0, y0, log2CbSize, 0, 0 ) | | ← SYN1700 |
| if (cbf_cu && PredMode == PRED_INTRA) | | |
| sec_idx [ x0 ][ y0 ][ trafoDepth ] | ae(v) | ← |
| } | | |
| } | | |
| } | | |
| } | | |
| } | | |

FIG. 23

| | Descriptor | |
|---|---|---|
| transform_tree( x0, y0, xBase, yBase, log2TrafoSize, trafoDepth, blkIdx ) { | | ←SYN1700 |
|   if( log2TrafoSize <= MaxTbLog2SizeY && <br>    log2TrafoSize > MinTbLog2SizeY && <br>    trafoDepth < MaxTrafoDepth && !( IntraSplitFlag && ( trafoDepth == 0 <br>) ) ) | | ←SYN1721 |
|     split_transform_flag[ x0 ][ y0 ][ trafoDepth ] | ae(v) | ←SYN1731 |
|     cbf_cb[ x0 ][ y0 ][ trafoDepth ] | ae(v) | |
|     cbf_cr[ x0 ][ y0 ][ trafoDepth ] | ae(v) | |
|   } | | |
|   if( split_transform_flag[ x0 ][ y0 ][ trafoDepth ] ) { | | |
|     x1 = x0 + ( 1 << ( log2TrafoSize − 1 ) ) | | |
|     y1 = y0 + ( 1 << ( log2TrafoSize − 1 ) ) | | |
|     if (trafoDepth == 0 && predMode == PRED_INTRA) | | ←SYN1754a |
|     sec_idx [ x0 ][ y0 ][ trafoDepth ] | ae(v) | ←SYN1755a |
|     transform_tree( x0, y0, x0, y0, log2TrafoSize − 1, trafoDepth + 1, 0 ) | | ⎫ |
|     transform_tree( x1, y0, x0, y0, log2TrafoSize − 1, trafoDepth + 1, 1 ) | | ⎬ SYN1756 |
|     transform_tree( x0, y1, x0, y0, log2TrafoSize − 1, trafoDepth + 1, 2 ) | | ⎬ |
|     transform_tree( x1, y1, x0, y0, log2TrafoSize − 1, trafoDepth + 1, 3 ) | | ⎭ |
|   } else { | | |
|     if( CuPredMode[ x0 ][ y0 ] == MODE_INTRA \|\| trafoDepth != 0 \|\| <br>      cbf_cb[ x0 ][ y0 ][ trafoDepth ] \|\| cbf_cr[ x0 ][ y0 ][ trafoDepth ] ) | | |
|     cbf_luma[ x0 ][ y0 ][ trafoDepth ] | ae(v) | ←SYN1752a |
|     if (cbf_luma[ x0 ][ y0 ][ trafoDepth ] && trafoDepth == 0 && predMode == <br>PRED_INTRA) | | |
|     sec_idx [ x0 ][ y0 ][ trafoDepth ] | ae(v) | ←SYN1753a |
|     transform_unit( x0, y0, xBase, yBase, log2TrafoSize, trafoDepth, blkIdx ) | | |
|   } | | |
| } | | |

FIG. 26

IMAGE DECODING APPARATUS AND IMAGE CODING APPARATUS

TECHNICAL FIELD

One aspect of the present invention relates to an image decoding apparatus that decodes coded data representing an image, and an image coding apparatus that generates coded data by coding an image.

BACKGROUND ART

A video coding apparatus which generates coded data by coding a video, and a video decoding apparatus which generates decoded images by decoding the coded data are used to send or record a video efficiently.

For example, specific video coding schemes include schemes suggested in H.264/MPEG-4.AVC and High-Efficiency Video Coding (HEVC) that is a succeeding codec thereof (NPL 1), and the like.

In such a video coding scheme, images (pictures) constituting a video are managed by a hierarchy structure including slices obtained by splitting images, coding units obtained by splitting slices, prediction units (PUs) constituting coding units, and transform units (TUs), and are typically coded/decoded for each block.

In such a video coding scheme, usually, a prediction image is generated based on local decoded images obtained by coding/decoding input images, and prediction residual (also sometimes referred to as "difference images" or "residual images") obtained by subtracting the prediction images from input images (original image) are coded. Additionally, generation methods of prediction images include an inter-picture prediction (an inter prediction) and an intra-picture prediction (intra prediction).

In NPL 1, a technique is known in which, using a quad tree split, by achieving the coding unit and the transform unit described above, a block size with a high degree of freedom is selected, and a code amount and accuracy are balanced. Furthermore, adaptive core transform for transforming by multiple core transforms and secondary transform for re-transforming a transform coefficient after the core transform are known.

CITATION LIST

Non Patent Literature

NPL 1: "Algorithm Description of Joint Exploration Test Model 7", JVET-G1001, Joint Video Exploration Team (JVET) of ITU-T SG 16 WP 3 and ISO/IEC JTC 1/SC 29/WG 11, 2017 Aug. 19

SUMMARY OF INVENTION

Technical Problem

However, there is a problem in the existing technique as described above that there is room for more efficiently performing reconstruction of a prediction residual for a TU. Furthermore, the adaptive core transform described above has a problem that the device becomes complicated in accordance with the number of transform bases.

The present invention has been made in view of the problems described above, and has an object to achieve an image decoding apparatus and an image coding apparatus that are capable of more efficiently or simply performing reconstruction of a prediction residual for a TU.

Solution to Problem

In order to solve the above-described problem, an image decoding apparatus according to an aspect of the present invention is an image decoding apparatus including a transforming unit configured to perform, on a prescribed unit basis, inverse transform of a transform coefficient or a modification transform coefficient by using a transform basis selected from a plurality of the transform bases, in which the plurality of the transform bases include a first transform basis and a second transform basis obtained by performing symmetric transform of the first transform basis.

In order to solve the above-described problem, an image coding apparatus according to an aspect of the present invention is an image coding apparatus including a transforming unit configured to perform, on a prescribed unit basis, inverse transform of a transform coefficient or a modification transform coefficient by using a transform basis selected from a plurality of the transform bases, in which the plurality of the transform bases include a first transform basis and a second transform basis obtained by performing symmetric transform of the first transform basis.

In order to solve the above-described problem, an image decoding apparatus according to an aspect of the present invention is an image decoding apparatus for performing inverse transform of a transform coefficient on a prescribed unit basis, the image decoding apparatus including: a first transforming unit configured to apply any one of first type core transform and second type core transform to the transform coefficient; and a second transforming unit configured to perform secondary transform of the transform coefficient only in a case that the first transforming unit performs the first type core transform.

In order to solve the above-described problem, an image coding apparatus according to an aspect of the present invention is an image coding apparatus for performing inverse transform of a transform coefficient on a prescribed unit basis, the image coding apparatus including: a first transforming unit configured to apply any one of first type core transform and second type core transform to the transform coefficient; and a second transforming unit configured to perform secondary transform of the transform coefficient only in a case that the first transforming unit performs the first type core transform.

In order to solve the above-described problem, an image decoding apparatus according to an aspect of the present invention is an image decoding apparatus for performing inverse transform of a transform coefficient on a prescribed unit basis, the image decoding apparatus including: a first transforming unit configured to apply core transform to the transform coefficient; and a second transforming unit configured to perform secondary transform of a non-separable transform coefficient, in which a unit of transform by the second transforming unit includes a non-square subblock.

In order to solve the above-described problem, an image coding apparatus according to an aspect of the present invention is an image coding apparatus for performing inverse transform of a transform coefficient on a prescribed unit basis, the image coding apparatus including: a first transforming unit configured to apply core transform to the transform coefficient; and a second transforming unit configured to perform secondary transform of a non-separable transform coefficient, in which a unit of transform by the second transforming unit includes a non-square subblock.

In order to solve the above-described problem, an image decoding apparatus according to an aspect of the present invention is an image decoding apparatus for performing inverse transform of a transform coefficient on a prescribed unit basis, the image decoding apparatus including: a first transforming unit configured to apply core transform to the transform coefficient; a second transforming unit configured to perform secondary transform of the transform coefficient; and a switching unit configured to switch a unit of transform by the second transforming unit in accordance with an index.

Advantageous Effects of Invention

According to an aspect of the present invention, an effect is obtained that reconstruction of a prediction residual for a TU can be performed more efficiently and effectively.

BRIEF DESCRIPTION OF DRAWINGS

FIG. 7 is a diagram illustrating a configuration example of a syntax table of CT information according to an embodiment of the present invention.

FIG. 8 is a diagram illustrating a configuration example of a syntax table of CU information, PT information PTI, and TT information TTI according to an embodiment of the present invention.

FIG. 9 is a diagram illustrating a configuration example of a syntax table of PU information PUI according to an embodiment of the present invention.

FIG. 11 is a diagram illustrating a configuration example of a transform set table according to an embodiment of the present invention.

FIG. 12 is a diagram illustrating a configuration example of a table defining a transform subset selected based on an intra prediction mode.

FIG. 16 is a table showing a list of transform bases corresponding to an index coreTrSetIdx of a transform set and a transform selection flag amt_trans_idx used by the video decoding apparatus according to an embodiment of the present invention.

FIG. 17 includes equations illustrating examples of transform matrices derived by the video decoding apparatus according to an embodiment of the present invention.

FIG. 18 includes equations illustrating other examples of transform matrices derived by the video decoding apparatus according to an embodiment of the present invention.

FIG. 23 is a diagram illustrating a configuration example of a syntax table of CU information, PT information PTI, and TT information TTI according to an embodiment of the present invention.

FIG. 26 is a diagram illustrating a configuration example of a syntax table of TT information TTI according to an embodiment of the present invention.

DESCRIPTION OF EMBODIMENTS

Embodiment 1

An embodiment of the present invention will be described with reference to FIG. 1 to FIG. 18. First, with reference to FIG. 2, an overview of a video decoding apparatus (image decoding apparatus) 1 and a video coding apparatus (image coding apparatus) 2 will be described. FIG. 2 is a functional block diagram illustrating a schematic configuration of the video decoding apparatus 1.

The video decoding apparatus 1 and the video coding apparatus 2 illustrated in FIG. 2 implement the technique employed in High-Efficiency Video Coding (HEVC). The video coding apparatus 2 performs, in these video coding schemes, entropy coding on the value of syntax that has been defined to be sent from an coder to a decoder, and generates coded data #1.

As an entropy coding scheme, Context-based Adaptive Binary Arithmetic Coding (CABAC) is known.

In coding/decoding by the CABAC, context-adapted processing is performed. Context is the status (context) of coding/decoding and is used to record an occurrence probability of an associated syntax. In the CABAC, binarization processing is performed on a syntax that may take a multi-value, and the binary data obtained by this binarization processing is subjected to adaptive arithmetic coding in accordance with the occurrence probability. Specifically, multiple buffers that maintain the occurrence probability of the binary value (0 or 1) are prepared, and one buffer is selected in accordance with the context, and arithmetic coding is performed based on an occurrence probability recorded in the buffer. In addition, by updating the occurrence probability of the buffer based on the binary value to be decoded/coded, an appropriate occurrence probability can be maintained in accordance with the context.

To the video decoding apparatus 1, coded data #1 obtained by the video coding apparatus 2 coding video is input. The video decoding apparatus 1 decodes the inputted coded data #1 and outputs video #2 to the outside. Prior to detailed description of the video decoding apparatus 1, the configuration of the coded data #1 will be described below.

Structure of Coding Stream Te

Prior to detailed description of the video coding apparatus 2 and the video decoding apparatus 1 according to the present embodiment, the data structure of a coding stream Te generated by the video coding apparatus 2 and decoded by the video decoding apparatus 1 will be described.

Figure 3:
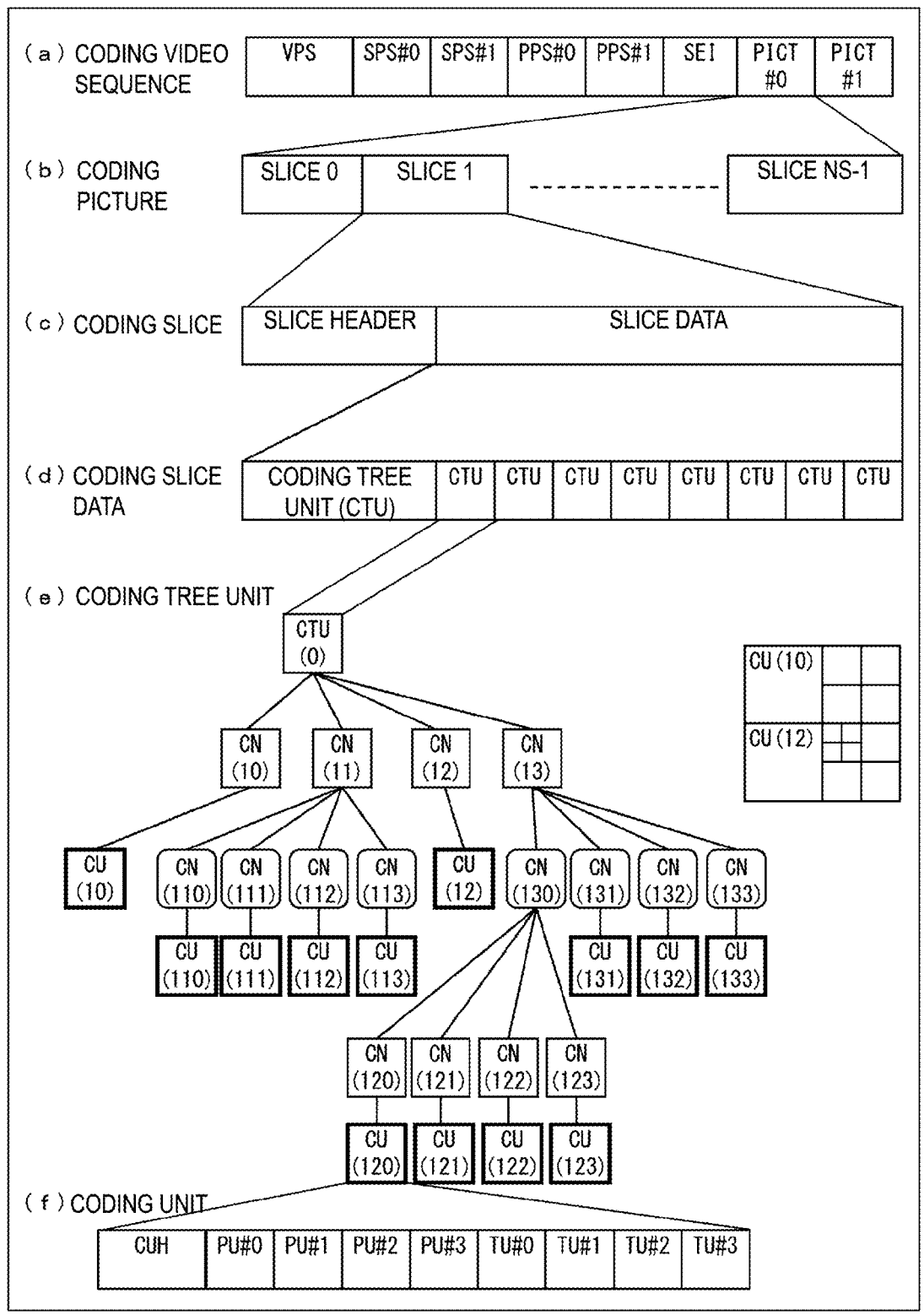
FIG. 3 is a diagram illustrating a hierarchy structure of data of a coding stream according to the present embodiment.

FIG. 3 is a diagram illustrating a hierarchy structure of data in the coding stream Te. The coding stream Te includes a sequence and multiple pictures constituting a sequence illustratively. (a) to (f) of FIG. 3 are diagrams illustrating a coding video sequence prescribing a sequence SEQ, a coding picture prescribing a picture PICT, a coding slice prescribing a slice S, a coding slice data prescribing slice data, a coding tree unit included in coding slice data, and Coding Units (CUs) included in a coding tree unit, respectively.

Coding Video Sequence

In the coding video sequence, a set of data referred to by the video decoding apparatus 1 to decode the sequence SEQ of a processing target is prescribed. As illustrated in (a) of FIG. 3, the sequence SEQ includes a Video Parameter Set, a Sequence Parameter Set SPS, a Picture Parameter Set PPS, a picture PICT, and Supplemental Enhancement Information SEI. Here, a value indicated after # indicates a layer ID. In FIG. 3, although an example is illustrated where coded data of #0 and #1, in other words, layer 0 and layer 1 exist, types of layers and the number of layers do not depend on this.

In the video parameter set VPS, in a video including multiple layers, a set of coding parameters common to multiple videos and a set of coding parameters associated with multiple layers and an individual layer included in a video are prescribed.

In the sequence parameter set SPS, a set of coding parameters referred to by the video decoding apparatus 1 to decode a target sequence is prescribed. For example, width and height of a picture are prescribed. Note that multiple SPSs may exist. In that case, any of multiple SPSs is selected from the PPS.

In the picture parameter set PPS, a set of coding parameters referred to by the video decoding apparatus 1 to decode each picture in a target sequence is prescribed. For example, a reference value (pic_init_qp_minus26) of a quantization step size used for decoding of a picture and a flag (weighted_pred_flag) indicating an application of a weighted prediction are included. Note that multiple PPSs may exist. In that case, any of multiple PPSs is selected from each picture in a target sequence.

Coding Picture

In the coding picture, a set of data referred to by the video decoding apparatus 1 to decode the picture PICT of a processing target is prescribed. As illustrated in (b) of FIG. 3, the picture PICT includes slices S0 to $S_{NS-1}$ (NS is the total number of slices included in the picture PICT).

Note that in a case not necessary to distinguish the slices S0 to $S_{NS-1}$ below, subscripts of reference signs may be omitted and described. The same applies to other data included in the coding stream Te described below and described with an added subscript.

Coding Slice

In the coding slice, a set of data referred to by the video decoding apparatus 1 to decode the slice S of a processing target is prescribed. As illustrated in (c) of FIG. 3, the slice S includes a slice header SH and a slice data SDATA.

The slice header SH includes a coding parameter group referred to by the video decoding apparatus 1 to determine a decoding method of a target slice. Slice type specification information (slice_type) to specify a slice type is one example of a coding parameter included in the slice header SH.

Examples of slice types that can be specified by the slice type specification information include (1) I slice using only an intra prediction in coding, (2) P slice using a unidirectional prediction or an intra prediction in coding, and (3) B slice using a unidirectional prediction, a bidirectional prediction, or an intra prediction in coding, and the like.

Note that, the slice header SH may include a reference (pic_parameter_set_id) to the picture parameter set PPS included in the coding video sequence.

Coding Slice Data

In the coding slice data, a set of data referred to by the video decoding apparatus 1 to decode the slice data SDATA of a processing target is prescribed. As illustrated in (d) of FIG. 3, the slice data SDATA includes Coding Tree Units (CTUs). The CTU is a block of a fixed size (for example, 64×64) constituting a slice, and may be referred to as a Largest Coding Unit (LCU).

Coding Tree Unit

As illustrated in (e) of FIG. 3, a set of data referred to by the video decoding apparatus 1 to decode a coding tree unit of a processing target is prescribed. The coding tree unit is split by recursive quad tree splits. Nodes of a tree structure obtained by recursive quad tree splits are referred to as Coding Nodes (CNs). Intermediate nodes of a quad tree are coding nodes, and the coding tree unit itself is also prescribed as the highest coding node. The CTU includes a split flag (cu_split_flag), and in a case that cu_split_flag is 1, the CTU is split into four coding node CNs. In a case that cu_split_flag is 0, the coding node CN is not split, and has one Coding Unit (CU) as a node. The coding unit CU is an end node of the coding nodes, and is not split anymore. The coding unit CU is a basic unit of coding processing.

In a case that the size of the coding tree unit CTU is 64×64 pixels, the size of the coding unit may be any of 64×64 pixels, 32×32 pixels, 16×16 pixels, and 8×8 pixels.

Coding Unit

As illustrated in (f) of FIG. 3, a set of data referred to by the video decoding apparatus 1 to decode the coding unit of a processing target is prescribed. Specifically, the coding unit includes a prediction tree, a transform tree, and a CU header CUH. In the CU header, a prediction mode, a split method (PU split mode), and the like are prescribed.

In the prediction tree, prediction information (a reference picture index, a motion vector, and the like) of each prediction unit (PU) where the coding unit is split into one or multiple is prescribed. In another expression, the prediction unit is one or multiple non-overlapping regions constituting the coding unit. The prediction tree includes one or multiple prediction units obtained by the above-mentioned split. Note that, in the following, a unit of prediction where the prediction unit is further split is referred to as a "subblock". The subblock includes multiple pixels. In a case that the sizes of the prediction unit and the subblock are the same, there is one subblock in the prediction unit. In a case that the prediction unit is larger than the size of the subblock, the prediction unit is split into subblocks. For example, in a case that the prediction unit is 8×8, and the subblock is 4×4, the prediction unit is split into four subblocks formed by horizontal split into two and vertical split into two.

The prediction processing may be performed for each of these prediction units (subblocks).

Generally speaking, there are two types of splits in the prediction tree, including a case of an intra prediction and a case of an inter prediction. The intra prediction is a prediction in an identical picture, and the inter prediction refers to a prediction processing performed between mutually different pictures (for example, between display times, and between layer images).

In a case of an intra prediction, the split method has 2N×2N (the same size as the coding unit) and N×N.

In a case of an inter prediction, the split method includes coding by a PU split mode (part_mode) of the coded data, and includes 2N×2N (the same size as the coding unit), 2N×N, 2N×nU, 2N×nD, N×2N, nL×2N, nR×2N and N×N, and the like. Note that 2N×N and N×2N indicate a symmetric split of 1:1, and 2N×nU, 2N×nD and nL×2N, nR×2N indicate an asymmetry split of 1:3 and 3:1. The PUs included in the CU are expressed as PU0, PU1, PU2, and PU3 sequentially.

Figure 4:
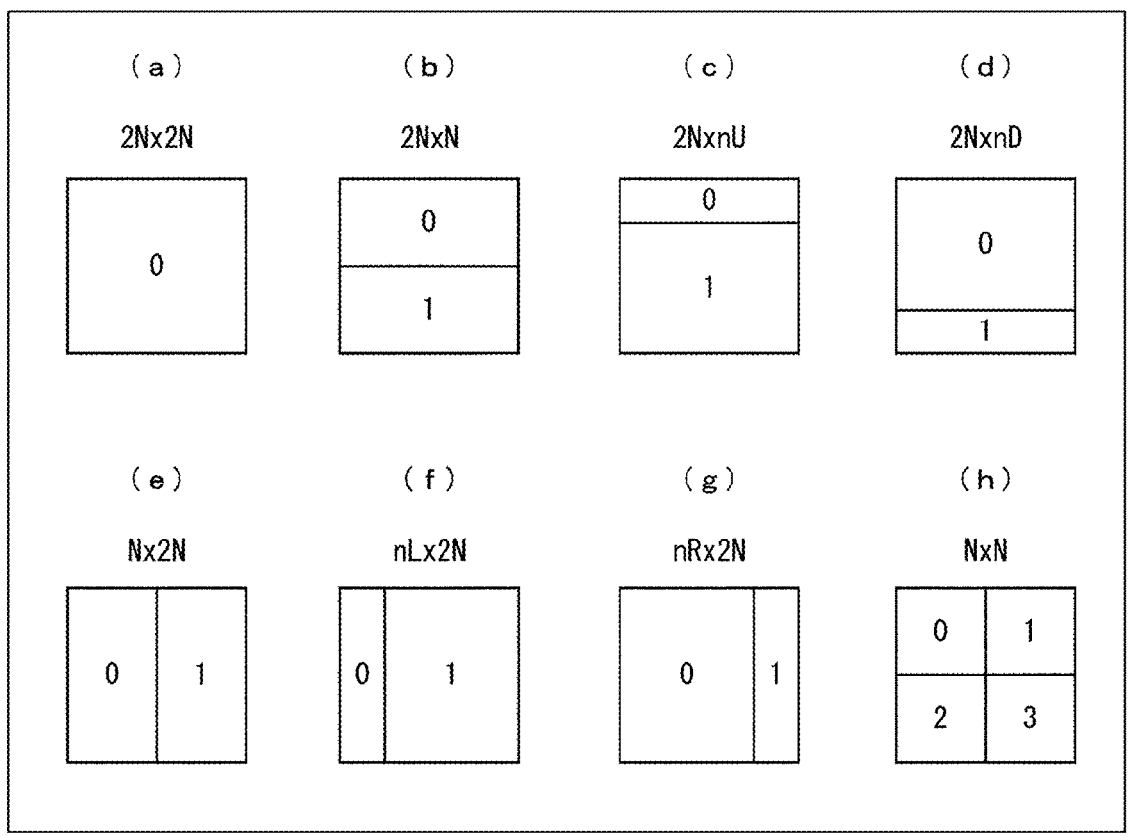
FIG. 4 is a diagram illustrating patterns of PU split modes. (a) to (h) illustrate partition shapes in cases that PU split modes are 2N×2N, 2N×N, 2N×nU, 2N×nD, N×2N, nL×2N, nR×2N, and N×N, respectively.

(a) to (h) of FIG. 4 illustrate shapes of partitions in respective PU split modes (positions of boundaries of PU split) specifically. (a) of FIG. 4 illustrates a partition of 2N×2N, and (b), (c), and (d) of FIG. 4 illustrate partitions (horizontally long partitions) of 2N×N, 2N×nU, and 2N×nD, respectively. (e), (f), and (g) illustrate partitions (vertically long partitions) in cases of N×2N, nL×2N, and nR×2N, respectively, and (h) illustrates a partition of N×N. Note that horizontally long partitions and vertically long partitions are collectively referred to as partitions, and 2N×2N and N×N are collectively referred to as square partitions.

In the transform tree, the coding unit is split into one or multiple transform units, and a position and a size of each transform unit are prescribed. In another expression, the transform unit is one or multiple non-overlapping regions constituting the coding unit. The transform tree includes one or multiple transform units obtained by the above-mentioned split.

Splits in the transform tree include those to allocate a region that is the same size as the coding unit as a transform unit, and those by recursive quad tree splits similar to the above-mentioned split of CUs.

A transform processing is performed for each of these transform units.

Video Decoding Apparatus

A configuration of the video decoding apparatus 1 according to the present embodiment will be described below with reference to FIG. 1 and FIG. 2.

Overview of Video Decoding Apparatus

The video decoding apparatus 1 generates a prediction image Pred for each PU, generates a decoded image #2 by adding the generated prediction image Pred and a prediction residual D decoded from the coded data #1 (hereinafter, the prediction residual is expressed as r[ ][ ] in some cases), and outputs the generated decoded image #2 to the outside.

Here, the generation of the prediction image Pred is performed with reference to a coding parameter obtained by decoding the coded data #1. The coding parameter is a parameter referred to for generating the prediction image Pred. The coding parameters include, in addition to prediction parameters such as a motion vector referred to in an inter-picture prediction and a prediction mode referred to in an intra-picture prediction, size and shape of the PU, size and shape of the TU, residual data between an original image and the prediction image Pred, and the like. In the following, a set of all information excluding the residual data among the information included in the coding parameters is referred to as side information.

Additionally, in the following, a picture (frame), a slice, a CTU, a CT, a CU, and a PU, a TT, and TU which are to be decoding target are referred to as a target picture, a target slice, a target CTU, a target CT, a target CU, a target PU, a target TT, and a target TU, respectively.

Note that the size of the tree unit is, for example, 64×64 pixels, and the size of the PU and the TU is, for example, 64×64 pixels, 32×32 pixels, 16×16 pixels, 8×8 pixels, 4×4 pixels, or the like. However, these sizes are merely examples, and the size of the tree unit, the PU, and the TU may be sizes other than those described above.

Configuration of Video Decoding Apparatus

Referring again to FIG. 2, the schematic configuration of the video decoding apparatus 1 will be described as follows. FIG. 2 is a functional block diagram illustrating the schematic configuration of the video decoding apparatus 1.

As illustrated in FIG. 2, the video decoding apparatus 1 includes a decoding module 10, a CT information decoding unit 11, a PU information decoding unit 12, a TT information decoding unit 13, a prediction image generation unit 14, an inverse quantization and inverse transform processing unit 15, a frame memory 16 and an adder 17, a loop filter 18, a header decoding unit 19, a CU decoding unit 20, and a CU information decoding unit 21. The TT information decoding unit 13 further includes a TU decoding unit 22.

Basic Flow

Figure 1:
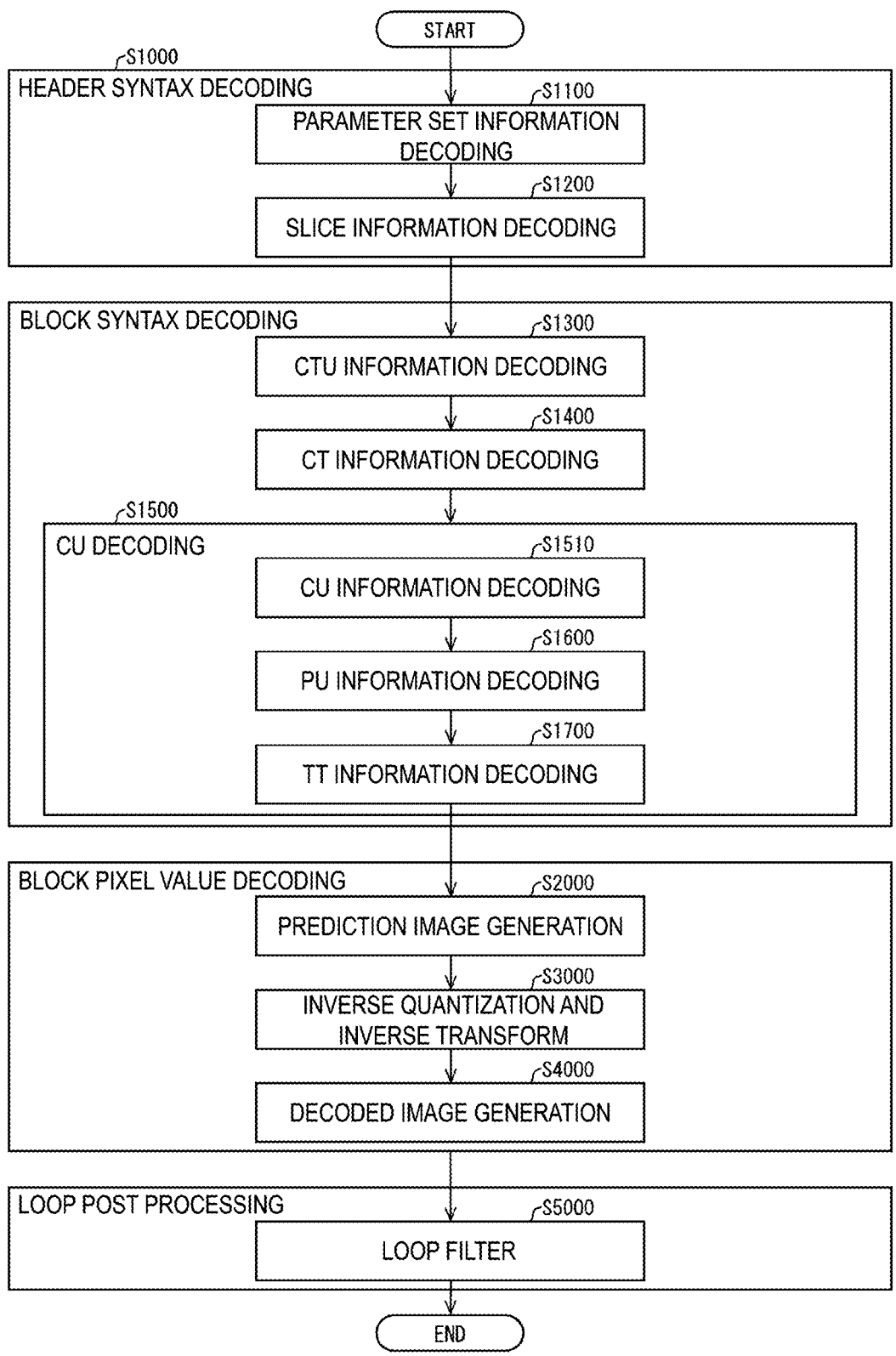
FIG. 1 is a functional block diagram illustrating a configuration example of a CU information decoding unit and a decoding module included in a video decoding apparatus according to an embodiment of the present invention.
Figure 2:
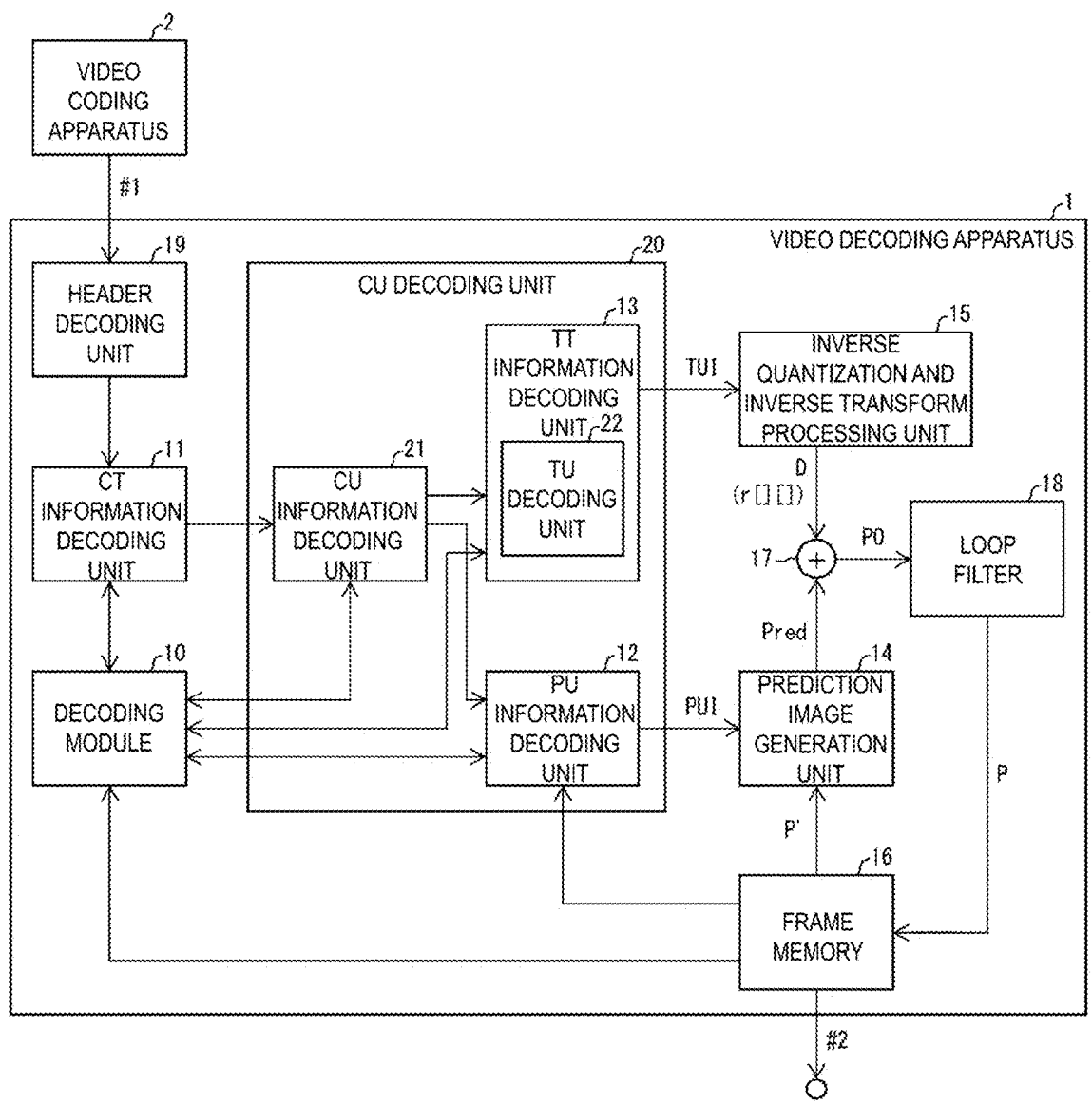
FIG. 2 is a functional block diagram illustrating a schematic configuration of the video decoding apparatus.

FIG. 1 is a flowchart describing a schematic operation of the video decoding apparatus 1.

(S1100: Parameter Set Information Decoding) The header decoding unit 19 decodes parameter set information such as a VPS, an SPS, a PPS, and the like, from coded data #1.

(S1200: Slice Information Decoding) The header decoding unit 19 decodes a slice header (slice information) from the coded data #1.

Hereinafter, the video decoding apparatus 1 derives, for each CTU included in the target picture, by repeating processing of S1300 to S5000, a decoded image of each CTU.

(S1300: CTU information decoding) The CT information decoding unit 11 decodes a tree unit (CTU) from the coded data #1.

(S1400: CT information decoding) The CT information decoding unit 11 decodes a coding tree (CT) from the coded data #1.

(S1500: CU decoding) The CU decoding unit 20 performs processing of S1510, S1600, and S1700 to decode a coding unit (CU) from the coded data #1.

(S1510: CU information decoding) The CU information decoding unit 21 decodes CU information from the coded data #1.

(S1600: PU information decoding) The PU information decoding unit 12 decodes prediction unit information (PU information PTI) from the coded data #1.

(S1700: TT information decoding) The TT information decoding unit 13 decodes a transform tree TT from the coded data #1.

(S2000: Prediction Image Generation) The prediction image generation unit 14 generates, for each PU included in the target CU, based on the PU information PUI, a prediction image Pred.

(S3000: Inverse Quantization and Inverse Transform) The inverse quantization and inverse transform processing unit 15 performs, on each TU included in the target CU, based on TT information TTI, inverse quantization and inverse transform processing.

(S4000: Decoded Image Generation) The adder 17 generates a decoded image P0 for the target CU by adding the prediction image Pred supplied from the prediction image generation unit 14 and the prediction residual D supplied from the inverse quantization and inverse transform processing unit 15.

(S5000: Loop Filter) The loop filter 18 applies a loop filter, such as a deblocking filter, a sample-adaptive filter (SAO), or the like, to the decoded image P0 to generate a decoded image P.

Decoding Module

General operation of each module will now be described. The decoding module 10 performs decoding processing of decoding syntax values from binary. More specifically, the decoding module 10 decodes syntax values coded by an entropy coding scheme such as CABAC, based on coded data and a syntax type supplied from sources of supply. Then, the decoding module 10 returns decoded syntax values to the sources of supply.

In the examples given below, sources of supply of coded data and a syntax type are the CT information decoding unit 11 and the CU decoding unit 20 (the CU information decoding unit 21, the PU information decoding unit 12, and the TT information decoding unit 13).

Header Decoding Unit

The header decoding unit 19 decodes a video parameter set (VPS), an SPS, a PPS, and a slice header of the coded data #1 input from the video coding apparatus 2.

CT Information Decoding Unit

The CT information decoding unit 11 uses the decoding module 10 to perform decoding processing in a tree unit layer and a coding tree layer, on the coded data #1 input from the video coding apparatus 2. Specifically, the CT information decoding unit 11 decodes CTU information and CT information from the coded data #1, according to the following procedure.

First, the CT information decoding unit 11 uses the decoding module 10 to decode a tree unit header CTUH of the CTU information. Next, the CT information decoding unit 11 decodes, in accordance with the context of a QT split flag indicating whether or not to perform a QT split on the target CT, the QT split flag from the CT information included in the CT. Then, the CT information decoding unit 11 recursively splits and decodes the target CT until the QT split flag does not signal additional splits. Finally, a tree unit footer CTUF of the CTU information is decoded. Although an example is described in which the CT information to be decoded is the QT split flag (qt_split_flag), to the CT information to be decoded, a BT split flag (bt_split_flag) indicating whether or not to perform a binary tree (BT) split on the target CT, and a TT split flag (tt_split_flag) indicating whether or not to perform a triple tree (TT) split on the target CT may further be added.

The tree unit header CTUH and the tree unit footer CTUF include coding parameters referred to by the video decoding apparatus 1 to determine a decoding method of a target coding tree unit. Additionally, the CT information may include, in addition to the QT split flag, a BT direction flag (BT split mode), parameters applied in the target CT and lower coding nodes.

CU Decoding Unit

The CU decoding unit 20 includes the CU information decoding unit 21, the PU information decoding unit 12, and the TT information decoding unit 13, and decodes CU information, PUI information, and TTI information of the lowest coding tree CT (i.e., CU).

CU Information Decoding Unit

The CU Information decoding unit 21 uses the decoding module 10 to decode CU information (skip flag SKIP, CU prediction scheme information PredMode, PU split type information PartMode, or the like) of each CU.

PU Information Decoding Unit

The PU information decoding unit 12 uses the decoding module 10 to decode PU information (such as a merge flag (merge_flag), a merge index (merge_idx), an estimation motion vector index (mvp_idx), a reference image index (ref_idx), an inter prediction identifier (inter_pred_flag), a motion vector (mvd), and the like) of each PU.

TT Information Decoding Unit

The TT information decoding unit 13 uses the decoding module 10 to decode each TTI (such as TU split flag SP_TU (split_transform_flag), a CU residual flag CBP_TU (cbf_cb, cbf_cr, cbf_luma), or the like, and a TU).

The TT information decoding unit 13 includes the TU decoding unit 22. In a case that a TU includes a residual, the TU decoding unit 22 decodes QP update information (quantization correction value). Note that the QP update information is a value indicating a difference value from a quantization parameter prediction value qPpred, which is a prediction value of a quantization parameter QP. The TU decoding unit 22 decodes a quantized prediction residual (residual_coding).

Figure 5:
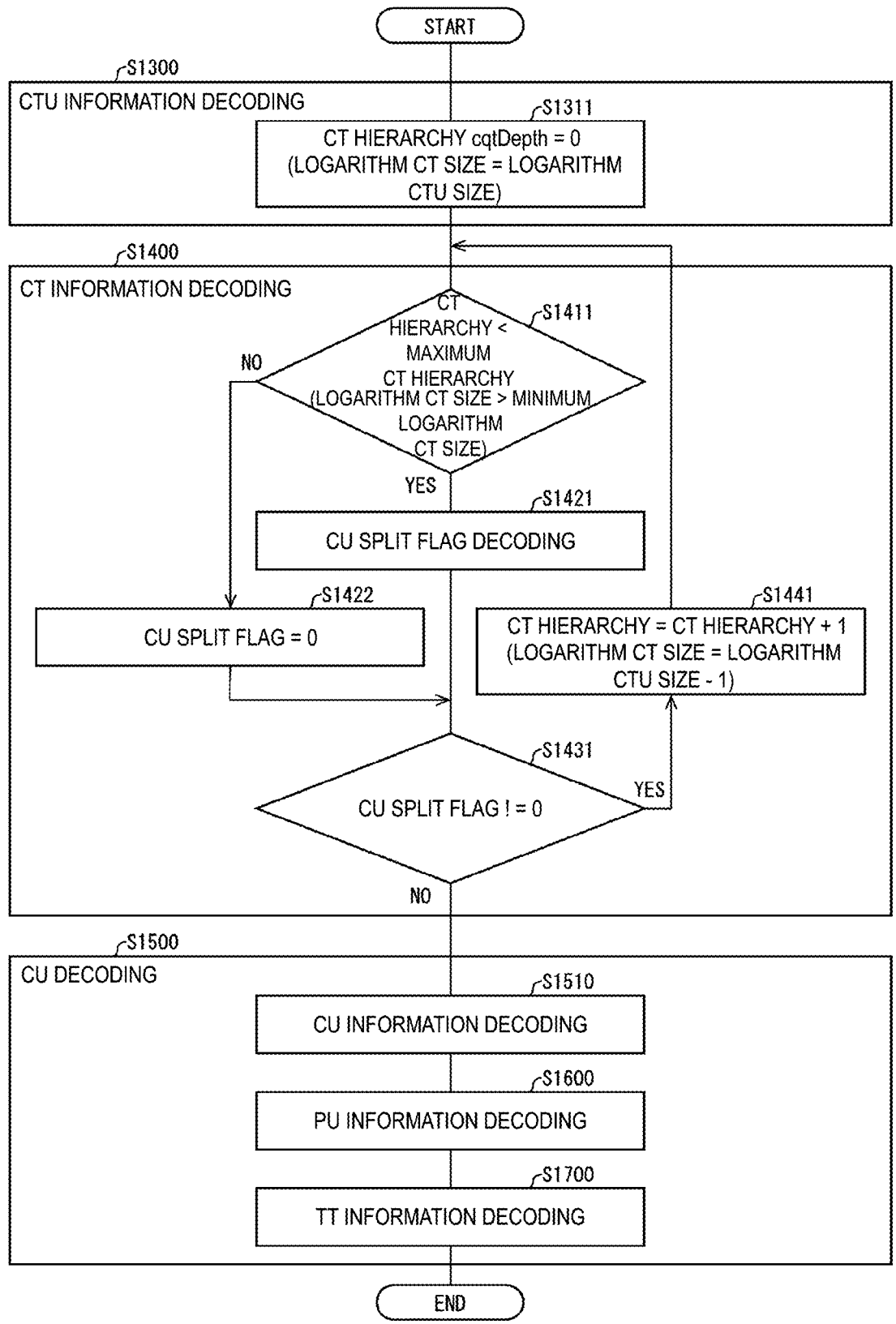
FIG. 5 is a flowchart illustrating schematic operations of a CT information decoding unit (CTU information decoding S1300, CT information decoding S1400) according to an embodiment of the invention.

To describe in more detail, the CT information decoding unit 11 performs the following operations as illustrated in FIG. 5. FIG. 5 is a flowchart illustrating schematic operations of the CT information decoding unit 11 (CTU information decoding S1300, CT information decoding S1400) according to an embodiment of the invention.

FIG. 7 is a diagram illustrating a configuration example of a syntax table of CTU information and CT information according to an embodiment of the present invention.

(S1311) The CT information decoding unit 11 decodes the CTU information from the coded data #1, and initializes a variable for managing the coding tree CT to be recursively split. Specifically, as described in the following equation, a CT hierarchy (CT depth) cqtDepth, which indicates the hierarchy of the coding tree, is configured to 0, and the CT size (here, logarithm CT size log2CbSize), which is the size of the coding tree, is configured to a logarithm size CtbLog2SizeY of the tree unit as the initial value.

cqtDepth=0 log2CbSize=CtbLog2SizeY

Note that the CT hierarchy cqtDepth is assumed to be 0 at the highest hierarchy, and increase one by one as the lower layer becomes deeper, but the configuration is not limited thereto. In the above description, by limiting the CT size and the CTU size to the power of 2 (4, 8, 16, 32, 64, 128, 256, . . . , or the like), these sizes are treated as the logarithm with the bottom of 2, but the configuration is not limited thereto. Note that in a case that the sizes are 4, 8, 16, 32, 64, 128, and 256, respectively, 2, 3, 4, 5, 6, 7 and 8 become logarithm values.

Hereinafter, the CT information decoding unit 11 recursively decodes the coding tree CT (coding_quadtree) (S1400).

The CT information decoding unit 11 decodes the highest (root) coding tree coding_quadtree (xCtb, yCtb, CtbLog2SizeY, 0) (SYN1400). Note that xCtb and yCtb represent the top left coordinates of the CTU, and CtbLog2SizeY is the logarithm size of the CTU (e.g. 6, 7, and 8 in a case that the sizes are 64, 128, and 256, respectively).

(S1411) The CT information decoding unit 11 determines whether or not the logarithm CT size log2CbSize is larger than a logarithm value MinCbLog2SizeY of a prescribed minimum CT size (SYN1411). In a case that the logarithm CT size log2CbSize is larger than MinCbLog2SizeY, the processing proceeds to S1421, and in the other cases, the processing proceeds to S1422.

(S1421) In a case that it is determined that the logarithm CT size log2CbSize is larger than MinCbLog2SizeY, the CT information decoding unit 11 decodes a CU split flag (split_cu_flag), which is a syntax element indicated in SYN1421.

(S1422) In other cases (the logarithm CT size log2CbSize is equal to or less than MinCbLog2SizeY), i.e., in a case that the CU split flag split_cu_flag is not found in the coded data #1, the CT information decoding unit 11 omits decoding of the CU split flag split_cu_flag from the coded data #1, and derives the CU split flag split_cu_flag as 0.

(S1431) In a case that the CU split flag split_cu_flag is other than 0 (=1) (SYN1431), the CT information decoding unit 11 performs (S1441) described below, and transitions to an immediately lower level of hierarchy to repeat processing of (S1411) and subsequent processing. That is, four coding trees CT of a logarithm CT size log2CbSize−1, at positions of a CT hierarchy cqtDepth+1 (x0, y0), (x1, y0), (x0, y1), (x1, y1) are decoded. The CT information decoding unit 11 continues the CT information decoding processing S1400 starting from S1411, in the lower coding tree CT as well.

| | |
|---|---|
| coding_quadtree(x0,y0,log2CbSize−1,cqtDepth+1) | (SYN1441A) |
| coding_quadtree(x1,y0,log2CbSize−1,cqtDepth+1) | (SYN1441B) |
| coding_quadtree(x0,y1,log2CbSize−1,cqtDepth+1) | (SYN1441C) |
| coding_quadtree(x1,y1,log2CbSize−1,cqtDepth+1) | (SYN1441D) |

Here, x0, y0 represent top left coordinates of a target coding tree, x1, y1 are derived by adding ½ of a logarithm CT size (1<<log2CbSize) to (x0, y0), as in the following equations.

x1=x0+(1<<(log2CbSize−1))

y1=y0+(b<<(log2CbSize−1))

Note that << indicates a left shift. 1<<N has the same value as 2 to the power of N (the same holds true hereinafter). Similarly, hereinafter, >> indicates a right shift.

In other cases (in a case that the CU split flag split_cu_flag is 0), the processing proceeds to S1500 in order to decode the coding unit CU.

(S1441) By adding 1 to the CT hierarchy cqtDepth indicating the hierarchy of the coding tree, and by subtracting 1 from the logarithm CT size log2CbSize, which is a logarithm value of a coding unit size, (divides the CT size by two), update is performed.

cqtDepth=cqtDepth+1 log2CbSize=log2CbSize−1

Figure 6:
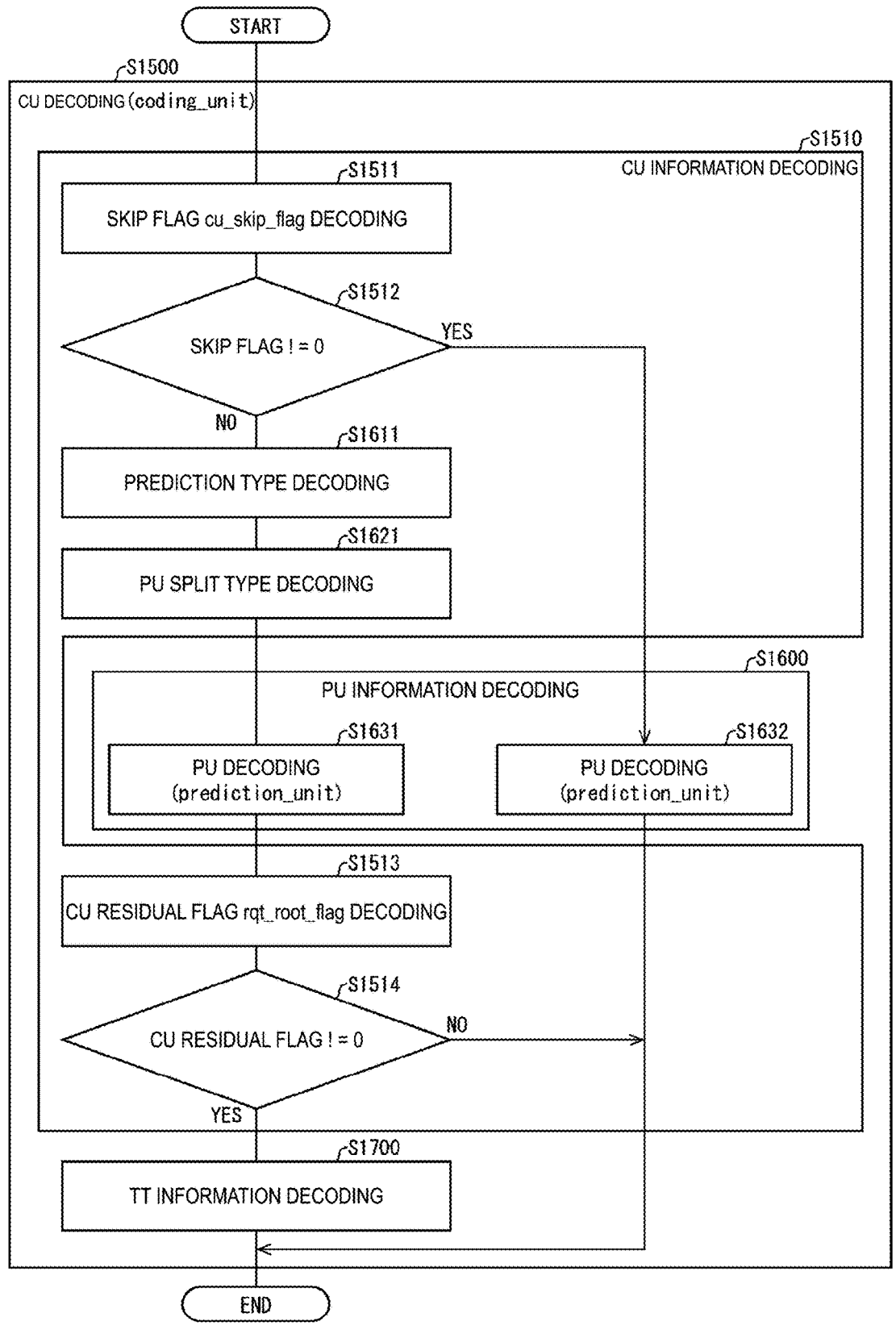
FIG. 6 is a flowchart illustrating schematic operations of a CU decoding unit (CU decoding S1500), a CU information decoding unit 21 (CU information decoding S1510), a PU information decoding unit (PU information decoding S1600), and a TT information decoding unit (TT information decoding S1700) according to an embodiment of the invention.

FIG. 6 is a flowchart illustrating schematic operations of the CU decoding unit 20 (CU decoding S1500), the CU information decoding unit 21 (CU information decoding S1510), the PU information decoding unit 12 (PU information decoding S1600), and the TT information decoding unit 13 (TT information decoding S1700) according to an embodiment of the invention. FIG. 8 is a diagram illustrating a configuration example of a syntax table of the CU information, the PT information PTI, and the TT information TTI according to an embodiment of the present invention.

CU Decoding Unit (S1500) The CU decoding unit 20 decodes the coding unit CU (coding_unit (x0, y0, log2CbSize)) (SYN1500). Here, x0, y0 represent the top left coordinates of the coding unit. The logarithm size log2CbSize of the coding unit is signaled from the CT information decoding unit 11. The specific processing of the CU decoding unit 20 is performed in the CU information decoding unit 21, the PU information decoding unit 12, and the TT information decoding unit 13 described below.

CU Information Decoding Unit

The CU Information decoding unit 21 uses the decoding module 10 to decode CU information (skip flag, CU prediction scheme information PartMode, PU split type information, residual root flag).

(S1511) The CU information decoding unit 21 uses the decoding module 10 to decode a skip flag cu_skip_flag from the coded data #1.

(S1512) The CU information decoding unit 21 determines whether or not the skip flag cu_skip_flag is other than 0 (=1). In a case that the skip flag cu_skip_flag is other than 0, the CU information decoding unit 21 signals to the PU information decoding unit 12. Furthermore, in a case that the skip flag cu_skip_flag is 0, (S1513) the CU information decoding unit 21 decodes the CU prediction scheme information pred_mode_flag and further (S1514) decodes the PU split type information PartMode (part_mode) and signals to the PU information decoding unit 12. Furthermore, (S1515) the CU information decoding unit 21 decodes the residual root flag rqt_root_flag, (S1516) determines whether or not the residual root flag is other than 0, and in a case that the residual root flag is 0, terminates the processing, and in a case of not being other than 0, signals to the TT information decoding unit 13.

PU Information Decoding Unit

The PU information decoding unit 12 uses the decoding module 10 to perform decoding processing on the PU information PUI. Specifically, the PU information decoding unit 12 decodes the PU information PUI, according to the following procedure.

The PU information decoding unit 12 refers to the PU split type information PartMode configured in advance or signaled from the CU information decoding unit 21 to determine the PU split type in the target CU. Subsequently, the PU information decoding unit 12 performs, by sequentially taking each PU included in the target CU as the target PU, decoding processing on the PU information corresponding to the target PU.

In other words, the PU information decoding unit 12 performs decoding processing on each parameter used to generate the prediction image Pred from the PU information corresponding to the target PU.

The PU information decoding unit 12 supplies the decoded PU information PUI for the target PU to the prediction image generation unit 14.

To describe in more detail, the PU information decoding unit 12 performs the following operations as illustrated in FIG. 6. FIG. 6 is a flowchart illustrating a schematic operation of the PU information decoding illustrated in S1600.

FIG. 9 is a diagram illustrating a configuration example of a syntax table of the PU information PUI according to an embodiment of the present invention.

(S1631) The PU information decoding unit 12 decodes each PU information included in the target CU from the coded data #1 in accordance with the number of PU splits indicated by the PU split type information PartMode.

For example, in a case that the PU split type is 2N×2N, the PU information decoding unit 12 decodes one piece of PU information PUI described below that the CU is taken as one PU.

prediction_unit(x0,y0,nCbS,nCbS)          (SYN1631A)

In a case that the PU split type is 2N×N, the PU information decoding unit 12 decodes two pieces of PU information PUI described below that the CU is split up an down.

prediction_unit(x0,y0,nCbS,nCbS/2)          (SYN1631B)

prediction_unit(x0,y0+(nCbS/2),nCbs,nCbS/2)          (SYN1631C)

In a case that the PU split type is N×2N, the PU information decoding unit 12 decodes two pieces of PU information PUI described below that the CU is split left and right.

prediction_unit(x0,y0,nCbS/2,nCbS)          (SYN1631D)

prediction_unit(x0+(nCbS/2),y0,nCbS/2,nCbS)          (SYN1631E)

In a case that the PU split type is N×N, four pieces of PU information PUI described below that the CU is split into four equal portions are decoded.

prediction_unit(x0,y0,nCbS/2,nCbS/2)          (SYN1631F)

prediction_unit(x0+(nCbS/2),y0,nCbS/2,nCbS/2)          (SYN1631G)

prediction_unit(x0,y0+(nCbS/2),nCbS/2,nCbS/2)          (SYN1631H)

prediction_unit(x0+(nCbS/2),y0+(nCbS/2),nCbS/2, nCbS/2)          (SYN1631I)

(S1632) In a case that the skip flag is 1, the PU information decoding unit 12 takes the PU split type as 2N×2N and decodes one piece of PU information PUI.

prediction_unit(x0,y0,nCbS,nCbS) (SYN1632S)

TT Information Decoding Unit

In the case that the residual root flag rqt_root_cbf decoded in the CU information decoding unit 21 is other than 0 (=1), the processing proceeds to S1700 in order to decode the TT information TTI, and processing by the TT information decoding unit 13 is performed. In a case that the residual root flag rqt_root_cbf is 0, processing of decoding the TT information TTI of the target CU from the coded data #1 is omitted, and the TT information TTI is derived by assuming that the target CU has no TU split and a quantized prediction residual of the target CU is 0.

The TT information decoding unit 13 uses the decoding module 10 to perform decoding processing on the TT information TTI (TU split information, CU residual flag, AMT flag, and TU).

Prediction Image Generation Unit

The prediction image generation unit 14 generates the prediction image Pred based on the PU information PUI for each PU included in the target CU. Specifically, the prediction image generation unit 14 generates the prediction image Pred from a local decoded image P', which is a decoded image, by performing intra prediction or inter prediction in accordance with parameters included in the PU information PUI corresponding to the target PU. The prediction image generation unit 14 supplies the generated prediction image Pred to the adder 17.

Note that a technique in which the prediction image generation unit 14 generates the prediction image Pred of the PU included in the target CU based on a motion compensation prediction parameter (motion vector, reference image index, and inter prediction identifier) will be described as follows.

In a case that the inter prediction identifier indicates a uni-prediction, the prediction image generation unit 14 generates the prediction image Pred using the decoded image at the position indicated by the motion vector in the reference image indicated by the reference image index.

On the other hand, in a case that the inter prediction identifier indicates a bi-prediction, the prediction image generation unit 14 generates the final prediction image Pred by generating a prediction image by motion compensation for each of the two sets of reference image index and motion vector, and calculating the average thereof or subjecting each prediction image to weight-adding based on a display time interval between the target picture and each reference image.

Inverse Quantization and Inverse Transform Processing Unit

The inverse quantization and inverse transform processing unit 15 performs, on each TU included in the target CU, based on the TT information TTI, inverse quantization and inverse transform processing. Specifically, the inverse quantization and inverse transform processing unit 15 reconstructs the prediction residual D for each pixel by performing inverse quantization and inverse orthogonal transform on a quantization transform coefficient qd[ ][ ] included in the target TU. That is, the transform reconstructed (inversely operated) by the inverse quantization and inverse transform processing unit 15 is processing for mapping such that, for information formed of multiple components, energy (the sum of variance) is concentrated (i.e., biased) on a small number of components, and the performance of the transform depends on how this energy can be concentrated on the small number of components.

Note that the transform here, for example, refers to an orthogonal transform from a pixel domain to a frequency domain. Accordingly, the inverse transform is transform from the frequency domain to the pixel domain. Additionally, examples of the inverse transform include Inverse Discrete Cosine Transform (inverse DCT transform), Inverse Discrete Sine Transform (inverse DST transform), and the like. The inverse quantization and inverse transform processing unit 15 supplies the reconstructed prediction residual D to the adder 17.

In addition to the inverse transform described above, the inverse quantization and inverse transform processing unit 15 can also reconstruct the prediction residual D, by using adaptive core transform (Adaptive Multiple Core Transform (AMT)) (first transform), which is transform adaptively selected in accordance with a kind of an intra/inter prediction method, a block size, and a signal of luminance/chrominance, and/or Secondary Transform (second transform), which is transform selected in an intra prediction mode. This adaptive core transform and the secondary transform will be described later.

Adder

The adder 17 generates the decoded image P0 for the target CU by adding the prediction image Pred supplied from the prediction image generation unit 14 and the prediction residual D supplied from the inverse quantization and inverse transform processing unit 15.

Loop Filter

The loop filter 18 applies a filter such as a deblocking filter, a sample adaptive offset filter SAO, an adaptive loop filter ALF, and the like on the decoded image P0 of the target CU to generate the decoded image P.

Frame Memory

In the frame memory 16, the decoded image P to which the loop filter is applied is sequentially recorded along with parameters used to decode the decoded image P. In the frame memory 16, at the time point of decoding a target tree unit, decoded images corresponding to all the tree units (e.g., all the tree units preceding in raster scan order) decoded earlier than the target tree unit are recorded. Examples of the decoding parameters recorded in the frame memory 16 include CU prediction scheme information (PredMode) and the like.

Note that, in the video decoding apparatus 1, for all the tree units in the image, at the time point when the decoded image generation processing of each of the tree units has ended, a decoded image #2 corresponding to the coded data #1 for one frame input to the video decoding apparatus 1 is output to the outside.

Adaptive Core Transform and Secondary Transform

Figure 10:
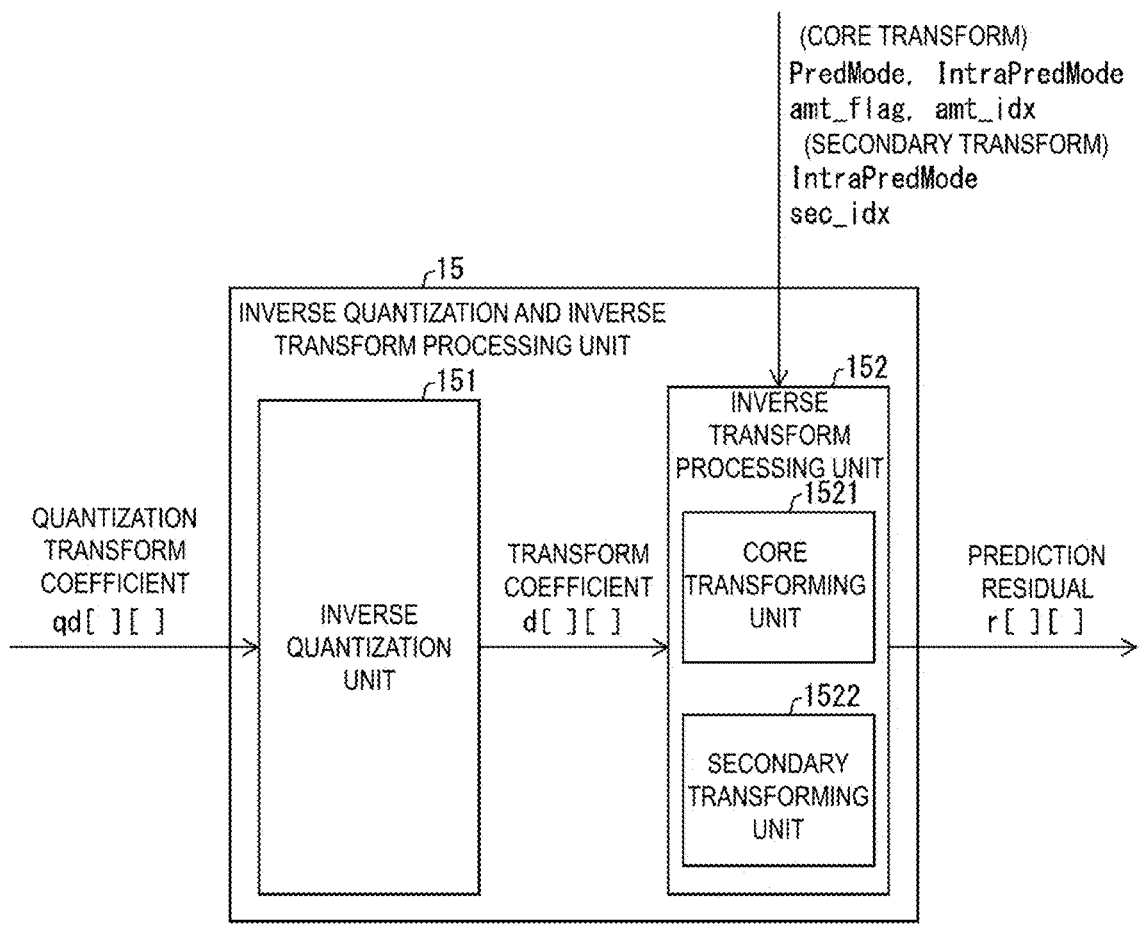
FIG. 10 is a functional block diagram illustrating a configuration example of an inverse quantization and inverse transform processing unit according to an embodiment of the present invention.

FIG. 10 is a functional block diagram illustrating a configuration example of the inverse quantization and inverse transform processing unit 15. As illustrated in FIG. 10, the quantization and inverse transform processing unit 15 includes an inverse quantization unit 151 and an inverse transform processing unit 152. The inverse quantization unit 151 performs inverse quantization on a quantization transform coefficient qd[ ][ ] decoded by the TU decoding unit 22 in the TT information decoding unit 13, and derives a transform coefficient d[ ][ ]. The inverse quantization unit 151 sends the derived transform coefficient d[ ][ ] to the inverse transform processing unit 152.

The inverse transform processing unit 152 performs inverse transform on the received transform coefficient d[ ][ ] to reconstruct a prediction residual r[ ][ ] (also expressed as D in FIG. 2). The reconstructed prediction residual r[ ][ ] is sent from the inverse transform processing unit 152 to the adder 17.

The inverse transform processing unit 152 can use adaptive core transform and secondary transform.

Note that between transform and inverse transform, there is no difference in processing excluding the value of a coefficient serving as the transform basis. In the following description, for the transform processing in the inverse transform processing unit 152, the term "transform" is used instead of "inverse transform".

Adaptive Core Transform

In the inverse transform processing unit 152, the transform method can be switched adaptively, and in the present specification, transform that is switched by an explicit flag, an index, a prediction mode, and the like is referred to as an adaptive core transform. The transform used in the adaptive core transform (core transform) is separable transform including vertical transform and horizontal transform or non-separable transform. Transform bases of the core transform are DCT2, DST7, DCT8, DST1, and DCT5. In adaptive core transform, in each of the vertical transform and the horizontal transform, the transform basis is independently switched. Note that selectable transform is not limited to the above, and another transform (transform basis) can be used. Note that DCT2, DST7, DCT8, DST1, and DCT5 may be expressed as DCT-II, DST-VII, DCT-VIII, DST-I, and DCT-V, respectively.

The adaptive core transform refers to an AMT flag (amt_flag) decoded from the coded data and switches between fixed transform (basic core transform) in which switching by an index is not performed and selective transform (extended core transform) in which switching by an index is performed. In a case of amt_flag=0, the fixed transform is used, and in a case of amt_flag=1, the selective transform is used. In the fixed transform (amt_flag=0), the AMT index amt_idx is not referred to and transform is performed using transform which is fixed, DCT2 here. In the selective transform (amt_flag=1), the AMT index amt_idx used for selection is further decoded from the coded data, and the transform is switched in accordance with the prediction mode and the AMT index amt_idx. Note that in the present working example, an example is described in which the AMT flag is decoded in CU units or TU units, and AMT index amt_idx is decoded in TU units, but the unit of decoding (switching) is not limited thereto.

The AMT Index amt_idx is a switching index for selecting the transform basis of the adaptive core transform. The higher bit of the AMT index amt_idx is assigned to a transform selection flag of the vertical transform, and the lower bit of amt_idx is assigned to transform selection of the horizontal transform, and amt_trans_idx_ver, which is a transform selection flag amt_trans_idx of the vertical transform, and amt_trans_idx_hor, which is a transform selection flag amt_trans_idx of the horizontal transform, are derived by the following equations.

$$\text{amt\_trans\_idx\_ver=amt\_idx>>1}$$

$$\text{amt\_trans\_idx\_hor=amt\_idx\&1}$$

amt_trans_idx_ver and ramt_trans_idx_hor are collectively referred to as amt_trans_idx.

Note that in a case of using a flag vertTrFlag (1 in a case of vertical and 0 in a case of horizontal) indicating whether to be vertical transform or horizontal transform, amt_trans_idx may be derived from the following equation.

$$\text{amt\_trans\_idx=(vertTrFlag)?amt\_trans\_idx\_ver:amt\_trans\_idx\_hor}$$

Note that among bits of amt_trans_idx, the assignment of vertical transform and horizontal transform is not limited to the above, and may be performed as follows, for example.

$$\text{amt\_trans\_idx\_ver=amt\_idx\&1}$$

$$\text{amt\_trans\_idx\_hor=amt\_idx>>1}$$

The transform used in the adaptive core transform is selected from the multiple transform bases described above using a prediction mode (intra, inter) and a transform selection flag (amt_trans_idx). FIG. 11(*a*) is a diagram illustrating a table of a transform set coreTrSet, and a selection method will be described using this.

In a case of the intra prediction mode, transform to be used is selected from three transform sets respectively named TrSetIntra0, TrSetIntra1, and TrSetIntra2. Each transform set has two transform bases. For example, TrSetIntra0 has DST7 and DCT8 as a set. The transform selection flag (amt_trans_idx) is used to switch which of the two transform bases is used. For example, in a case of TrSetIntra0, DST7 is selected in a case of amt_trans_idx=0, and DCT8 is selected in a case of amt_trans_idx=1.

In a case of the inter prediction mode, the transform set is one type of TrSetInter. In the same manner as the case of the intra prediction mode, the transform selection flag (amt_trans_idx) is used to switch which of two transform bases included in TrSetInter is used.

It is determined which transform set among three transform sets (TrSetIntra0, TrSetIntra1, and TrSetIntra2) in the intra prediction mode is used, with reference to an intra prediction mode IntraPredMode. This is illustrated in FIG. 12. FIG. 12 illustrates which transform set is selected by the horizontal transform and the vertical transform of each of 35 kinds of intra prediction modes IntraPredMode. In the figure, 0, 1, and 2 represent transform sets TrSetIntra0, TrSetIntra1, and TrSetIntra2, respectively. For example, in a case of IntraPredMode=10, since the value of the horizontal transform (Horizontal) in the figure is 0, a transform set of TrSetIntra0 (=0) is used for the horizontal transform, and since the value of the vertical transform (Vertical) in the figure is 2, a transform set of TrSetIntra2 (=2) is used for the vertical transform.

Figure 13:
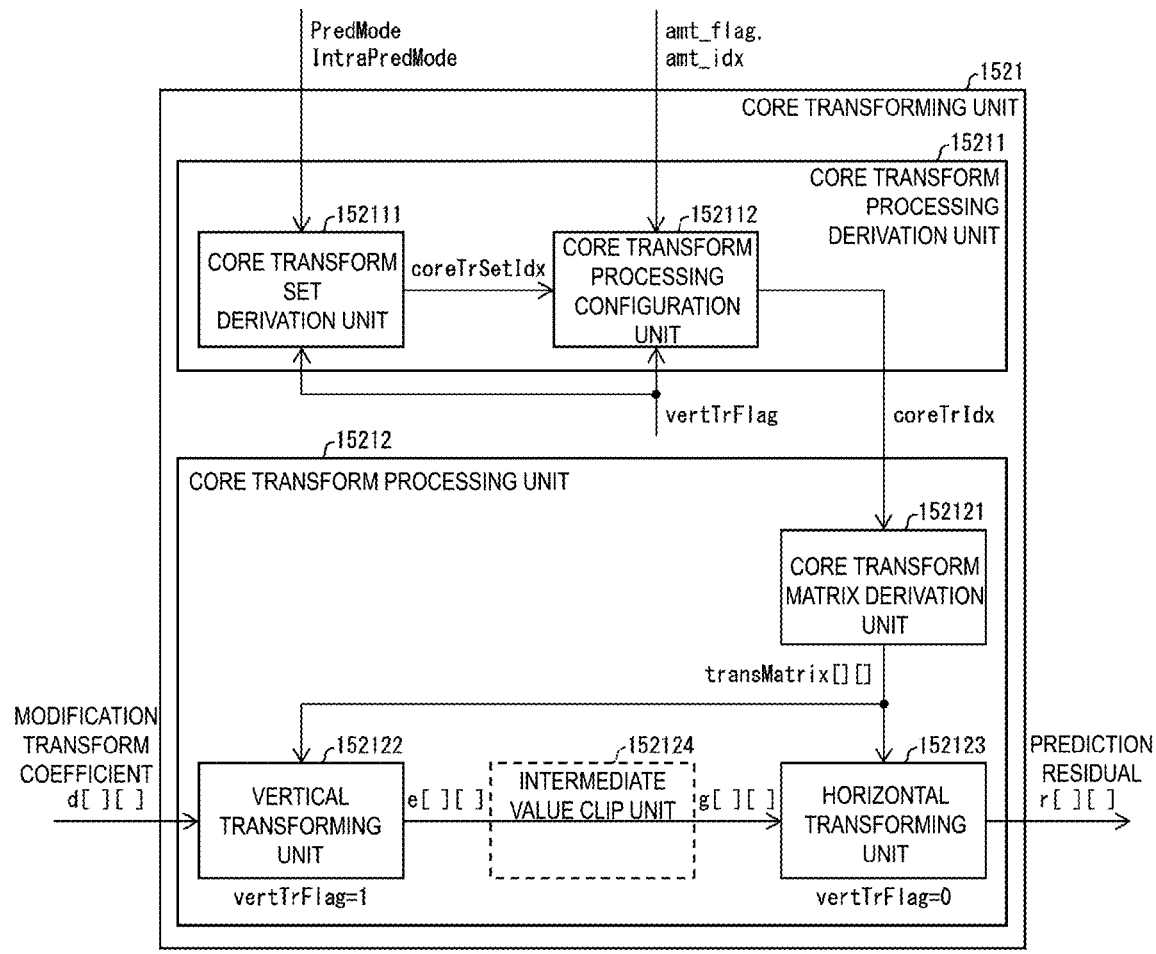
FIG. 13 is a functional block diagram illustrating a configuration example of an inverse transform processing unit according to an embodiment of the present invention.

The adaptive core transform described above is specifically described using FIG. 13. The inverse transform processing unit 152 in FIG. 13 is an example of the inverse transform processing unit 152 in FIG. 10. A core transforming unit 1521 in FIG. 13 includes a core transform processing derivation unit 15211 configured to derive core transform used from multiple transform bases, and a core transform processing unit 15212 configured to calculate the prediction residual r[ ][ ] from the (modification) transform coefficient d[ ][ ] using the derived core transform. In a case that the secondary transform is not performed, the modification transform coefficient is equal to the transform coefficient. In a case that the secondary transform is performed, the modification transform coefficient takes a value different from the transform coefficient. The core transform processing derivation unit 15211 includes a core transform set derivation unit 152111 configured to derive the index coreTrSetIdx of a transform set to be used, and a core transform processing configuration unit 152112 configured to derive an index coreTrIdx of the core transform to be used using coreTrSetIdx.

The core transform set derivation unit 152111 is described.

First, a table coreTrSet summarizing four kinds of transform sets (TrSetIntra0, TrSetIntra1, TrSetIntra2, TrSetInter) is shown below.

```
coreTrSet[ ][ ] =
{
{DST7, DCT8}, /* TrSetIntra0 */
{DST7, DST1}, /* TrSetIntra1 */
{DST7, DCT5}, /* TrSetIntra2 */
{DCT8, DST7} /* TrSetInter */
}
coreTrSet[ ][ ] =
{
{DST7, DCT7Swap}, /* TrSetIntra0 */
{DST7, DST1}, /* TrSetIntra1 */
{DST7, DCT5}, /* TrSetIntra2 */
{DCT7Swap, DST7} /* TrSetInter */
}
coreTrSet[ ][ ] =
{
{DCT8Swap, DCT8}, /* TrSetIntra0 */
{DCT8Swap, DST1}, /* TrSetIntra1 */
{DCT8Swap, DCT5}, /* TrSetIntra2 */
{DCT8, DCT8Swap } /* TrSetInter */
}
```

The core transform set derivation unit 152111 derives the index coreTrSetIdx of a transform set to be used next in accordance with the following equation.

coreTrSetIdx=(PredMode==PRED_INTER)?TrSetInter:coreTrSetTbl[IntraPredMode][vertTrFlag]

Here, PredMode is the intra or inter prediction mode, and coreTrSetTbl and vertTrFlag are the table and the flag indicating whether to be horizontal transform or vertical transform, respectively, illustrated in FIG. 12. For example, in a case of the inter prediction (PredMode=PRED_INTER), coreTrSetIdx=TrSetInter is satisfied. In a case of the intra prediction mode IntraPredMode=10 in intra prediction (PredMode=PRED_INTRA), in a case of the horizontal transform (vertTrFlag=0), coreTrSetIdx=TrSetIntra0 is satisfied, and in a case of the vertical transform (vertTrFlag=1), coreTrSetIdx=TrSetIntra2 is satisfied.

The core transform processing configuration unit 152112 will be described. The core transform processing configuration unit 152112 derives the index coreTrIdx of core transform to be used in accordance with the following equation.

coreTrIdx=(amt_flag==0)?fixedTr:coreTrSet[coreTrSetIdx][amt_trans_idx], where fixedTr indicates fixed transform. Additionally, coreTrIdx is defined below (FIG. 11(b)).

coreTrIdx={DCT2,DCT5,DCT8,DST1,DST7}

Note that coreTrIdx can be handled numerically. That is, for DCT2, DCT5, DCT8, DST1, and DST7, 0, 1, 2, 3, 4, or the like can be used.

Note that in a case that the fixed transform fixedTr is selected by amt_flag=0, since the transform basis is DCT2 or DST7 in both horizontal transform and vertical transform, DCT2 or DST7 may be selected as coreTrIdx and processing may be performed by the core transform processing unit 15212, or a processing unit dedicated to fixed transform (not illustrated) may be provided and processing may be performed. Details of a case that the adaptive transform is selected by amt_flag=1 will be described later.

The core transform processing unit 15212 includes a core transform matrix derivation unit 152121 configured to derive a transform matrix indicated by the index coreTrIdx of the core transform, a vertical transforming unit 152122 configured to apply vertical transform, and a horizontal transforming unit 152123 configured to apply horizontal transform, to the modification transform coefficient d[ ][ ]. The core transform processing unit 15212, first, derives a transform matrix transMatrix[ ][ ] indicated by the index coreTrIdx of the core transform by the core transform matrix derivation unit 152121.

transMatrix[ ][ ]=coreTransMatrixTbl[coreTrIdx][ ][ ]

Here, coreTransMatrixIdx is a table storing the transform basis illustrated in FIG. 11(b).

Note that by using transMatrixV for the transform matrix transMatrix of the vertical transform and using transMatrixH for the transform matrix of the horizontal transform, both of them may be distinguished.

Next, the core transform processing unit 15212 signals the transform matrix derived for each vertical/horizontal transform to the vertical transforming unit 152122 and the horizontal transforming unit 152123, and transforms the modification transform coefficient d[ ][ ] to the prediction residual r[ ][ ]. The vertical transforming unit 152122 transforms the modification transform coefficient d[ ][ ] to an intermediate value e[ ][ ] by a vertical direction one-dimensional transform, and sends the intermediate value e [ ][ ] to an intermediate value clip unit 152124. The intermediate clip unit 152124 derives an intermediate value g[ ][ ] by clipping the intermediate value e[ ][ ] and sends the resulting value to the horizontal transforming unit 152123. The horizontal transforming unit 152123 transforms the intermediate value g[ ][ ] to the prediction residual r[ ][ ]. The prediction residual r[ ][ ] is sent from the horizontal transforming unit 152123 to the adder 17.

The vertical transforming unit 152121 (core transform processing unit 15212) derives a first intermediate value e[x][y].

e[x][y]=Σ(transMatrix[y][j]×d[x][j]) (j=0 . . . nTbs−1)

Here, transMatrix[ ][ ] (=transMatrixV[ ][ ]) is a transform basis represented by a matrix of nTbs×nTbs derived in the above equation in a case of the vertical transform (vertTrFlag=1). nTbs is TU size. In a case that coreTrIdx is 4×4 transform (nTbs=4) of DCT2, for example, transMatrix={{29, 55, 74, 84}{74, 74, 0, −74}{84, −29, −74, 55}{55, −84, 74, −29}} is used. The symbol of Σ means processing in which for the subscripts j of j=0 . . . nTbs−1, the products of the matrix transMatrix[y][j] and the transform coefficient d[x][j] are added. In other words, e[x][y] is obtained by arranging columns obtained from the products of vectors x[j] (j=0 ... nTbs−1) formed of d[x][j] (j=0 ... nTbs−1), which are columns of d[x][y], and elements transMatrix[y][j] of the matrix.

The intermediate clip unit 152124 (core transform processing unit 15212) clips the first intermediate value e[x][y] and derives a second intermediate value g[x][y].

g[x][y]=Clip3(coeffMin,coeffMax,(e[x][y]+64)>>7)

The values 64 and 7 in the above equation are numerical values determined from a bit depth of the transform basis, and in the above equation, the transform basis is assumed to be 7 bits. Additionally, coeffMin and coeffMax are the minimum value and the maximum value of clipping, respectively.

The horizontal transforming unit 152123 (core transform processing unit 15212) uses the transform basis transMatrix [ ][ ] (=transMatrixH[ ][ ]) represented by the matrix of nTbs×nTbs derived in the above equation in a case of the vertical transform (vertTrFlag=1) to transform the intermediate value g[x][y] to the prediction residual r[x][y] by horizontal one-dimensional transform.

r[x][y]=ΣtransMatrix[x][j]×g[j][y] (j=0 ... nTbs−1)

The above-described symbol Σ means processing in which for the subscripts j of j=0 ... nTbs−1, the products of the matrix transMatrix[x][j] and g[j][y] are added. That is, r[x][y] is obtained by arranging rows obtained from the products of g[j][y] (j=0 ... nTbs−1), which are rows of g[x][y], and the matrix transMatrix.

Note that as a working example of the transform, by using a means for transforming a one-dimensional signal x[j] described below to a one-dimensional signal y[i], the vertical transform and the horizontal transform can be performed. The vertical transform is performed by setting the transform coefficient d[x][j] in the x column to a one-dimensional transform coefficient x[j]. The horizontal transform is performed by setting the intermediate coefficient g[j][y] in the y row to x[j].

y[i]=Σ(transMatrix[i][j]×x[j]) (j=0 ... nTbs−1)

Transform Basis Swap

In the above-described configuration of the transform basis by the core transform processing configuration unit 152112 and the core transform using the transform basis by the core transform processing unit, there is a problem, in the existing technique using the multiple transform bases, that an arithmetic circuit or a matrix coefficient memory increases by the number of bases.

In order to solve the above-described problem, the multiple transform bases used by the video decoding apparatus 1 according to the present embodiment include a first transform basis and a second transform basis obtained by applying symmetric transform (swap) to the first transform basis. Note that the term "symmetric transform" in the present specification indicates a transform in which in a case that elements of a matrix such as a transform target, a transform basis, or the like and elements of a matrix after symmetric transform are allocated left and right, the elements of the matrix are rearranged such that these elements are allocated in left-right symmetry (mirror image symmetry, line symmetry). For example, a matrix TSwap after target transform of an m×m matrix T is represented by the following equation.

T[s][t]=TSwap[m−1−s][t]

$$T = \begin{bmatrix} t_{00}, & t_{01}, & t_{02}, & \dots & t_{0m-1} \\ t_{10}, & t_{11}, & t_{12}, & \dots & t_{1m-1} \\ \vdots & \vdots & \vdots & \dots & \vdots \\ t_{m-10}, & t_{m-11}, & t_{m-12}, & \dots & t_{m-1m-1} \end{bmatrix}$$ Equation 1

$$Tswap = \begin{bmatrix} t_{0m-1}, & t_{0m-2}, & \dots & t_{01}, & t_{00} \\ t_{1m-1}, & t_{1m-2}, & \dots & t_{11}, & t_{10} \\ \vdots & \vdots & \dots & \vdots & \vdots \\ t_{m-1m-1} & t_{m-1m-2}, & \dots & t_{m-11}, & t_{m-10} \end{bmatrix}$$

TSwap[s][t]=T[m−1−s][t]

Figure 14:
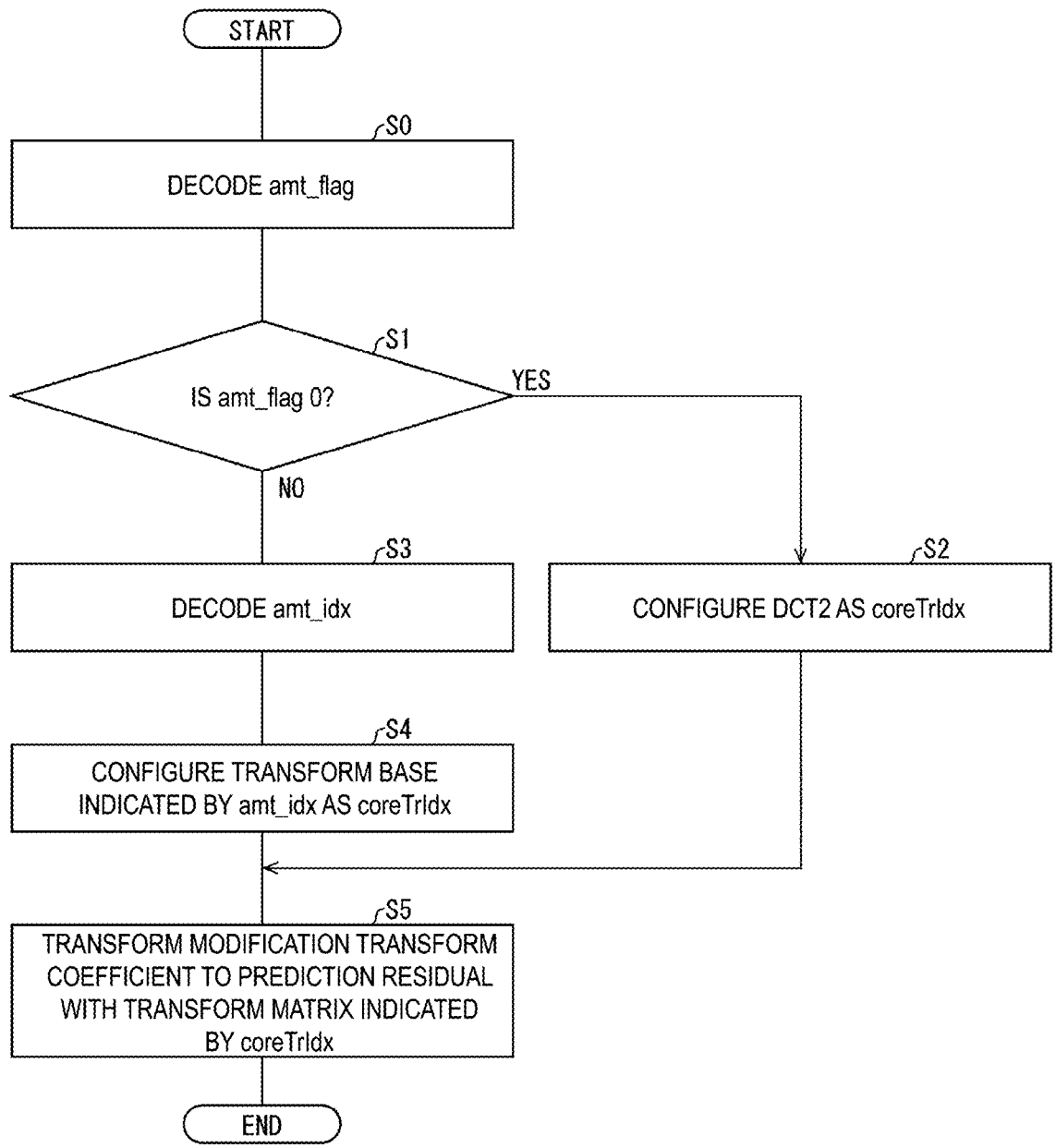
FIG. 14 is a flowchart diagram illustrating a transform basis swap method performed by a video decoding apparatus according to an embodiment of the present invention.

A transform basis swap method by the video decoding apparatus 1 according to the present embodiment will be described below with reference to FIG. 14. FIG. 14 is a flowchart diagram illustrating the transform basis swap method performed by the video decoding apparatus 1 according to the present embodiment.

First, the TT information decoding unit 13 decodes, with reference to coded data, amt_flag, which is a flag indicating whether or not to be basic core transform, and sends the result to the core transform processing configuration unit 152112 (step S0).

Next, the core transform processing configuration unit 152112 determines whether or not amt_flag decoded by the TT information decoding unit 13 is 0 (step S1). In a case that the core transform processing configuration unit 152112 determines that amt_flag is 0, the processing proceeds to step S2, and in a case that the core transform processing configuration unit 152112 determines that amt_flag is 1, the processing proceeds to step S3.

In step S2, the core transform processing configuration unit 152112 selects fixed transform (basic core transform) in which switching of the transform basis by an index is not performed, and configures DCT2 as coreTrIdx which is the index of the core transform to be used. Note that the basic core transform is not limited to DCT2, and DST1 or DST7 swap or the like may be used.

In step S3, the core transform processing configuration unit 152112 selects selective transform (extended core transform) in which switching by an index is performed, and the TT information decoding unit 13 decodes the AMT index amt_idx and sends the result to the core transform processing configuration unit 152112. Here, the transform basis indicated by the AMT index amt_idx decoded by the TT information decoding unit 13 in step S3 includes a first transform basis and a second transform basis obtained by applying symmetric transform to the first transform basis. Examples of these two transform bases include a transform pair of DST7 and DST7 swap, a transform pair of DCT8 and DCT8 swap, a transform pair of DCT5 and DCT5 swap, a transform pair of DST4 and DST4 swap, and the like. Note that details of these transform pairs will be described later.

As a next step of step S3, the core transform processing configuration unit 152112 configures the transform basis indicated by the AMT index amt_idx as coreTrIdx, which is the index of the core transform to be used (step S4). Note that the transform basis includes, as described above, the first transform basis and the second transform basis obtained by applying symmetric transform to the first transform basis.

As a next step or step S2 or step S4, the core transform processing unit 15212 derives a transform matrix (transform basis) indicated by coreTrIdx configured by the core transform processing configuration unit 152112, and transforms the modification transform coefficient d[ ][ ] to the prediction residual r[ ][ ] with the transform matrix (step S5). Note that the transform matrix derived by the core transform processing unit 15212 includes a first transform matrix and a second transform matrix obtained by applying symmetric transform to the first transform matrix.

Specific Examples of Transform Basic Swap

Figure 15:
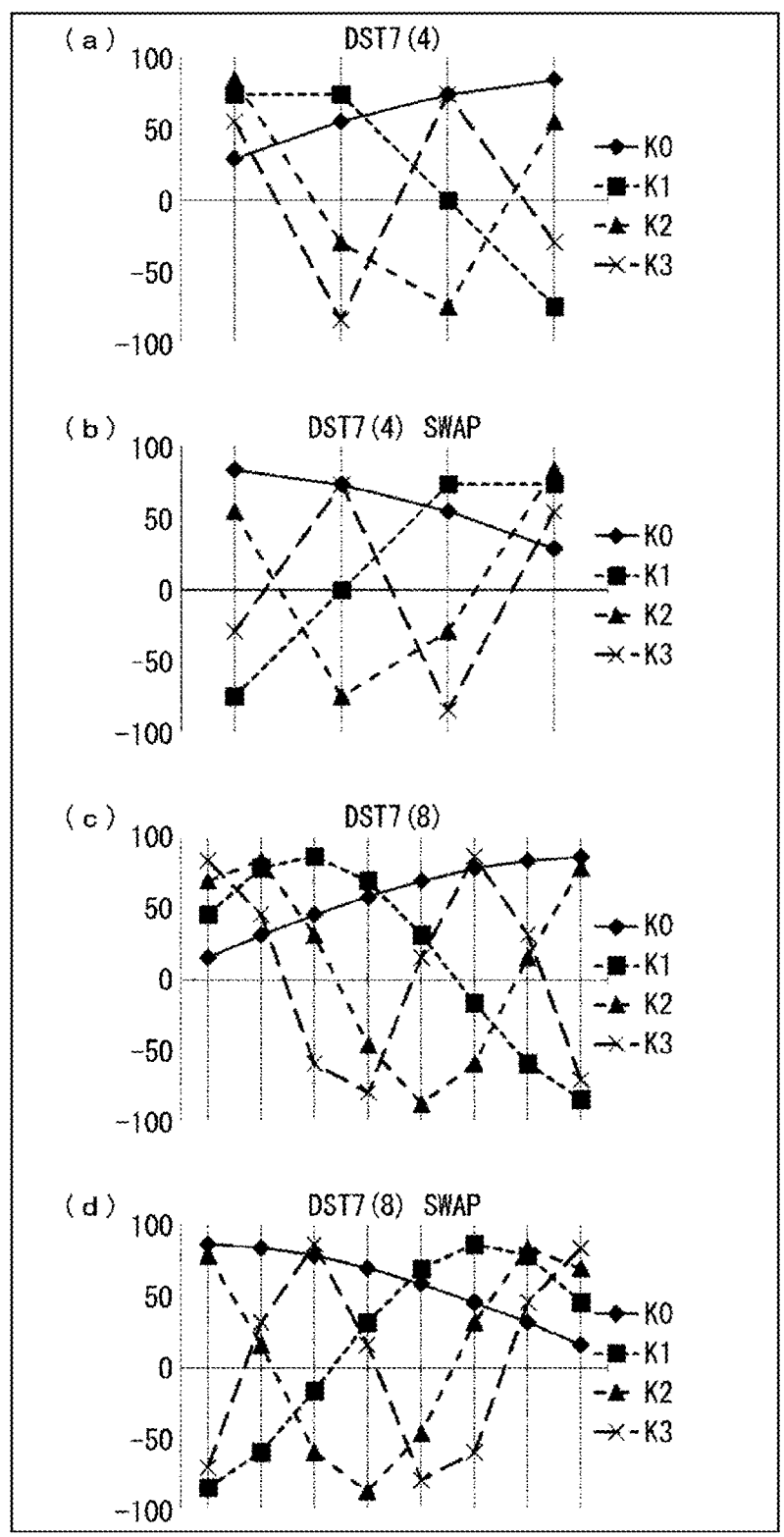
FIG. 15 is a graph illustrating an example of a transform basis indicated by an AMT index amt_idx used by the video decoding apparatus according to an embodiment of the present invention.

Specific examples of the transform basis swap method by the video decoding apparatus 1 according to the present embodiment will be described below. FIG. 15 is a graph showing an example of the transform basis of four points or eight points indicated by the AMT index amt_idx decoded by the TT information decoding unit 13 in step S3 described above. In each graph of (a) to (d) of FIG. 15, lines of K0 to K3 indicate transform bases of K0-th to K3-th component, respectively, the horizontal axis indicates the position on the spatial coordinates, and the vertical axis indicates the value of the transform basis.

As described above, the transform basis indicated by the AMT index amt_idx decoded by the TT information decoding unit 13, includes the first transform basis and the second transform basis (swap transform basis) obtained by applying symmetric transform to the first transform basis.

Examples of the two transform bases described above include DST7[s][t] and DST7swap[s][t]. Here, DST7swap [s][t] satisfies the following relational equation (1).

$$DST7swap[s][t] = DST7[nTbs-1-s][t] \ (s=0 \ldots nTbs-1) \quad \text{Equation (1)}$$

Furthermore, for example, as described above, the transform matrix derived by the core transform processing unit 15212 (core transform matrix derivation unit 152121) with reference to coreTrIdx in step S5 includes the first transform matrix expressed by Equation (2) indicated below and the second transform matrix, expressed by Equation (3), obtained by applying symmetric transform to the first transform matrix.

First Transform Matrix $$y[i] = \Sigma transMatrix[i][j]*x[j], \ i=0 \ldots nTbs-1 \quad \text{Equation (2)}$$

Second Transform Matrix $$y[i] = \Sigma transMatrix[nTbs-1-i][j]*x[j] = \Sigma transMatrixSwap[i][j]*x[j], \ i=0 \ldots nTbs-1 \quad \text{Equation (3)}$$

Note that $\Sigma$ in Equation (2) and Equation (3) described above indicates the sum for $j=0 \ldots nTbs-1$.

Here, the core transform processing unit 15212 uses the basis transMatrix expressed by Equation (2) described above to derive a swap basis transMatrixSwap expressed by Equation (3) in accordance with Equation (4) indicated below.

$$TransMatrixSwap[i][j] = transMatrix[nTbs-1-i][j], \\ i=0 \ldots nTbs-1, j=0 \ nTbs-1 \quad \text{Equation (4)}$$

(o) and (a) to (d) of FIG. 16 are tables each of which shows a list of transform bases indicated by the index coreTrSetIdx of the transform set and the transform selection flag amt_trans_idx. coreTrIdx configured in step S4 by the core transform processing configuration unit 152112 described above is determined in accordance with each table shown in FIG. 16. (o) of FIG. 16 is a table showing a list of the existing transform bases, in the same manner as in FIG. 15(a), and (a) to (d) of FIG. 16 are tables each of which shows a list of transform bases in the present embodiment.

For example, as shown in (a) of FIG. 16, DST7Swap may be used instead of DCT8. Alternatively, as shown in (b) of FIG. 16, DCT8Swap may be used instead of DST7. It is not necessary to store the transform basis of DCT8 in the case of (a) and the transform basis of DST7 in the case of (b) in memory, it is possible to reduce the memory required for the storing the transform basis. Alternatively, as shown in (c) of FIG. 16, DST7 is replaced with DST4, and DST4Swap may be used instead of DCT8. In the case of (c), since DST4 is added to the memory and DCT8 and DST7 are removed from the memory, the amount of memory required to store the transform basis can be reduced as a total. Alternatively, as shown in (d) of FIG. 16, only a part of the transform bases, for example, only DST7 of TrSetIntra0 may be changed to DCT5Swap. Note that the replacement in target transform is not limited to the examples shown in FIG. 16.

(a) to (d) of FIG. 17 are equations each of which illustrates an example of a transform matrix (transform basis) derived by the core transform processing unit 15212 (core transform matrix derivation unit 152121) with reference to coreTrIdx, in step S5. Coefficient accuracy of the transform matrix is eight bits. Additionally, (a) and (b) of FIG. 18 are equations each of which illustrates an example of a transform matrix similar to that illustrated in FIG. 17, and the coefficient accuracy of the transform matrix is six bits. As illustrated in (a) to (d) of FIG. 17 and (a) and (b) of FIG. 18, the first transform basis and the second transform basis obtained by applying symmetric transform to the first transform basis are arranged left and right, and these elements are allocated in left-right symmetry (mirror image target, line symmetry).

Modification of Transform Basis Swap

A modification of the transform basis swap method by the video decoding apparatus 1 according to the present embodiment will be described below. The video decoding apparatus 1 according to the modification performs, instead of the inverse transform using the second transform basis described above, processing obtained by adding post-processing to inverse transform using the first transform basis. This makes it possible to perform left-right symmetry (mirror image target, line symmetry) inverse transform using only the first transform basis. Specifically, the core transform processing unit 15212 performs inverse transform on an input signal (transform coefficient, modification transform coefficient) by the first transform basis, and performs swapping of an output signal of the inverse transform.

For example, in the above-described step S5, the core transform processing unit 15212 (core transform matrix derivation unit 152121) refers to coreTrIdx configured by the core transform processing configuration unit 152112. In a case that the swapped transform basis is selected, the transform basis is not changed (the corresponding first transform basis is used), and the transform coefficient is subjected to inverse transform and swapping of the output signal is performed. For example, in the case of (a) of FIG. 16, in a case of coreTrSetIdx=0 and amt_trans_idx=1, or coreTrSetIdx=3 and amt_trans_idx=0, the swapped transform basis (DST7Swap) as coreTrIdx is selected.

In a case of using the second transform basis which is one of transforms in a symmetric relationship with each other (e.g., in a case of selecting DST7Swap), as the inverse transform processing, transform is performed using the first transform basis which is the other of the transforms in the symmetric relationship with each other. Here, transform is performed using DST7 of the transform basis which is in a relationship of left-right symmetry (mirror image symmetry, line symmetry) with DST7Swap.

$$\text{output}[i] = \Sigma \text{transMatrix}[i][j] * x[j], j=0 \ldots nTbs-1 \quad \text{Equation (5)}$$

Here, $\Sigma$ indicates the sum for j=0 . . . nTbs−1. Here, transMatrix uses, in a case of performing the transform indicated by DST7Swap as well, the same transform basis as that in a case of performing the transform of DST7.

In a case of using the second transform basis which is one of the transforms in a symmetric relationship with each other (e.g., in a case of selecting DST7Swap), a flag amt_swap_flag indicating that swap is to be performed is configured to 1. In other cases (in a case of using the first transform basis which is the other of the transforms in a symmetric relationship with each other, or in a case of using transform which is not in the symmetric relationship with each other), amt_swap_flag is configured to 0.

In a case that amt_swap_flag indicates 0, as described in Equation (6), the output signal (output) of the inverse transform is output as it is without swap. In a case that amt_swap_flag indicates 1, as described in Equation (7), the output signal (output) of the inverse transform is swapped and output.

$$y[i] = \text{output}[i] \; i=0 \ldots nTbs-1 \; (\text{if amt\_swap\_flag}==0) \quad \text{Equation (6)}$$

$$y[i] = \text{output}[nTbs-1-i] \; i=0 \ldots nTbs-1 \; (\text{if amt\_swap\_flag}!=0) \quad \text{Equation (7)}$$

For example, in (a) of FIG. 16, in a case of coreTrSetIdx=0 and amt_trans_idx=0, the transform basis DST7 is selected as coreTrIdx. Since this is not the swapped transform basis, amt_swap_flag=0 is configured, transMatrix[ ][ ] is set to DST7, the transform coefficient x[ ] is subjected to inverse transform by Equation (5), and the output result output[ ] is substituted into y[ ]. On the other hand, in a case of coreTrSetIdx=0 and amt_trans_idx=1, the transform basis DST7swap is selected as coreTrIdx. Since this is the swapped transform basis, amt_swap_flag=1 is configured, transMatrix[ ][ ] is set to DST7, the transform coefficient x[ ] is subjected to inverse transform by Equation (5), and by Equation (7), the output result output[ ] is swapped and substituted into y[ ].

As described above, instead of swapping of the transform basis, by swapping of the output obtained by performing inverse transform on the transform coefficient (the input signal to the vertical or horizontal transforming unit), the same result as the swap of the transform basis can be obtained. Accordingly, the memory that stores the transform basis can be reduced.

Note that in a case of the separable inverse transform, two inverse transforms in the horizontal direction and the vertical direction are performed. That is, in the first inverse transform, the inverse transform is applied to the input signal using the first transform basis, and the output signal is swapped. Next, the swapped output signal is taken as the input of the second inverse transform, the inverse transform is applied to the input signal using the first transform basis, and the output signal is swapped.

Note that in a case that the secondary transform is performed as in Embodiment 1 and the modification of the present application, the transform coefficient that is input to and processed by the core transforming unit 1521 is the modification transform coefficient (transform coefficient after secondary inverse transform). In a case that the secondary transform is not performed, it is merely a transform coefficient.

Additionally, the same method as the modification of the transform basis swap method by the video decoding apparatus 1 according to the present embodiment can be applied to the video coding apparatus 2. In this case, in a case that a swapped transform basis is specified, the video coding apparatus 2 does not change the transform basis, performs swap indicated in Equation (9) on an input signal (prediction residual), and performs forward transform on the swapped input signal.

$$\text{input}[j] = x[j] \; j=0 \ldots nTbs-1 \; (\text{if amt\_swap\_flag}==0) \quad \text{(Equation 8)}$$

$$\text{input}[j] = x[nTbs-1-j] \; j=0 \ldots nTbs-1 \; (\text{if amt\_swap\_flag}!=0) \quad \text{(Equation 9)}$$

Note that in a case of the separable transform, two forward transforms in the horizontal direction and the vertical direction are performed. That is, in the first forward transform, the input signal is swapped, and the swapped input signal is transformed using the first transform basis. In the second forward transform as well, in the same manner, the output signal of the first transform basis is swapped and taken as the input of the second forward transform, and forward transform is performed using the first transform basis and the output signal is calculated.

Note that in the case that the secondary transform is performed as in Embodiment 1 and the modification of the present application, the transform coefficient that is output by the core transforming unit 1521 is the modification transform coefficient (transform coefficient before secondary transform). In a case that the secondary transform is not performed, it is merely a transform coefficient.

Supplement

As described above, an image decoding apparatus (video decoding apparatus 1) according to the present embodiment is an image decoding apparatus including a transforming unit (core transforming unit 1521) configured to perform, on a prescribed unit basis, inverse transform of a transform coefficient or a modification transform coefficient by using a transform basis selected from a plurality of the transform bases, in which the plurality of the transform bases include a first transform basis and a second transform basis obtained by performing symmetric transform of the first transform basis.

According to the above-described configuration, since the second transform basis is obtained by applying target transform to the first transform basis, it is not necessary to store the second transform basis. Accordingly, the arithmetic circuit or the matrix coefficient memory can be reduced by an amount equivalent to the second transform basis.

Furthermore, in the image decoding apparatus (video decoding apparatus 1) according to the present embodiment, the transforming unit performs the inverse transforms being in mirror image symmetry (line symmetry) to each other with one transform basis, performs, in one inverse transform, additional processing, which is symmetric transform, on the output signal, and does not perform, in another inverse transform, the additional processing of the symmetric transform. In other words, the inverse transform using the second transform basis may also be performed, using the first transform basis, by applying the symmetric transform to the output signal of the inverse transform using the first transform basis.

According to the above-described configuration, since it is not necessary to include the second transform basis, the arithmetic circuit for the second transform and the matrix coefficient memory for the second transform basis can be reduced.

Furthermore, the video coding apparatus 2 having the same configuration as the video decoding apparatus 1 according to the present embodiment is also included in the scope of the present embodiment. An image coding apparatus (video coding apparatus 2) according to the present embodiment is an image coding apparatus including a transforming unit configured to perform, on a prescribed unit basis, forward transform of an prediction error by using a transform basis selected from a plurality of the transform bases; and a transforming unit configured to perform inverse transform in the same manner as the image decoding apparatus, in which the plurality of the transform bases include a first transform basis and a second transform basis obtained by performing symmetric transform of the first transform basis.

Furthermore, an image coding apparatus (video coding apparatus 2) according to the present embodiment is an image coding apparatus including a forward transforming unit configured to perform, on a prescribed unit basis, forward transform of an prediction error by using a transform basis selected from a plurality of the transform bases; and an inverse transform processing unit configured to perform inverse transform in the same manner as the image decoding apparatus, in which transforms being in mirror image symmetry (line symmetry) to each other are performed with one transform basis, in one transform, preprocessing being symmetric transform is performed on an input signal, and in another transform, preprocessing of the symmetric transform is not performed. In other words, the inverse transform using the second transform basis may also be performed, by using the preprocessing of the symmetric transform for the transform using the first transform basis.

According to the above-described configuration, similarly to the effect achieved by the image decoding apparatus according to the present embodiment, since the second transform basis is obtained by applying target transform to the first transform basis, it is not necessary to store the second transform basis. Accordingly, the arithmetic circuit or the matrix coefficient memory can be reduced by an amount equivalent to the second transform basis.

Embodiment 2

In the secondary transform (NSST) described above, there is a problem that, as the size of the block to be a target of the secondary transform increases, the processing time (latency) required for the transform increases. Additionally, there is a problem that, as the size of the block to be a target of the secondary transform increases, a circuit scale of the transform or a memory size for storing the transform basis matrix increases.

In order to solve the above-described problem, the video decoding apparatus 1 according to the present embodiment includes: a first transforming unit (core transforming unit 1521) configured to apply core transform to a transform coefficient; and a second transforming unit (secondary transforming unit 1522) configured to perform secondary transform of a non-separable transform coefficient, in which a unit of transform by the second transforming unit includes a non-square subblock.

Embodiment 2 of the present invention having the configuration described above will be described as follows with reference to the drawings. Note that in the present embodiment as well, the video decoding apparatus 1 and the video coding apparatus 2 according to Embodiment 1 are used. Therefore, members having the same function as the members included in the video decoding apparatus 1 described in Embodiment 1 are denoted by the same reference signs, and description thereof will be omitted.

Secondary Transform

The inverse transform processing unit 152 can use, in addition to the adaptive core transform described above, the secondary transform.

The secondary transform is performed, in the video decoding apparatus 1, in order of secondary transform and adaptive core transform in the inverse transform performed following the inverse quantization (note that in the video coding apparatus 2, adaptive core transform and secondary transform in the transform are performed in this order, and the result is quantized).

Figure 19:
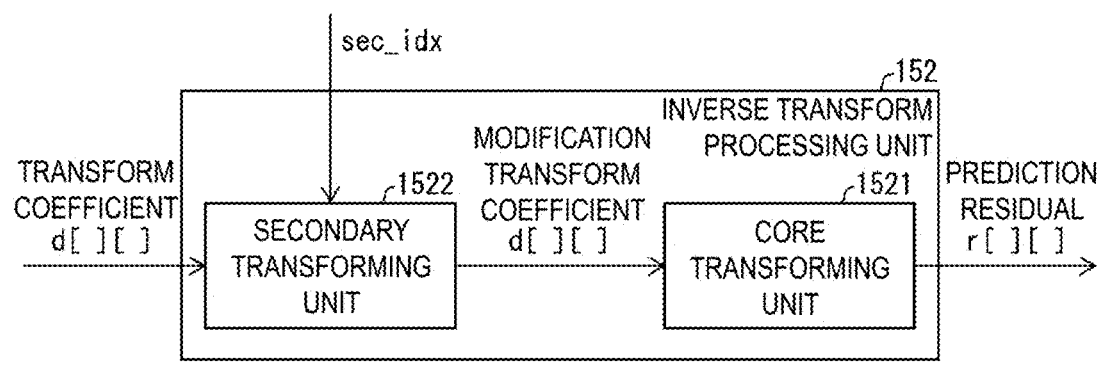
FIG. 19 is a functional block diagram illustrating a configuration example of the inverse transform processing unit according to an embodiment of the invention.

Here, the configuration of the inverse transform processing unit 152 that can also perform the secondary transform in addition to the core transform will be described using FIG. 19. FIG. 19 is a functional block diagram illustrating a configuration example of the inverse transform processing unit 152. As illustrated, the inverse transform processing unit 152 includes the core transforming unit 1521 and a secondary transforming unit 1522. The secondary transforming unit 1522 receives information indicating that secondary transform is performed from the TT information decoding unit 13, and reconstructs, by performing secondary transform on the transform coefficient d[ ][ ] received from the inverse quantization unit 151, the modification transform coefficient d[ ][ ]. The reconstructed modification transform coefficient d[ ][ ] is sent from the secondary transforming unit 1522 to the core transforming unit 1521. In a case that the secondary transform is not performed, the transform coefficient d[ ][ ] received by the secondary transforming unit 1522 is sent from the secondary transforming unit 1522 to the core transforming unit 1521 as it is.

Additionally, information indicating on and off of the secondary transform and the type of the secondary transform may be an index such as sec_idx or the like. Additionally, the information indicating on and off of the secondary transform and the type of the secondary transform may be divided into two pieces of syntax instead of expressing using one index sec_idx. For example, in a case of splitting the information into syntax sec_flag indicating the presence or absence of the secondary transform and syntax sec_trans_idx indicating the type of the secondary transform, the following mutual relationship is obtained.

sec_flag=sec_idx!=0 sec_trans_idx=sec_idx−1 sec_idx=(sec_flag)?sec_trans_idx+1:0

For example, as the secondary transform processing, in a case that the secondary transform is not used (secondary transform off) and in a case that three secondary transforms named secondary transform 1 to 3 are selected, sec_idx, which is the index for secondary transform, may take a total of four values of 0 to 3. Examples of the secondary transform indicated by each sec_idx are given below.

In a case of sec_idx=0 (i.e. sec_flag=0), the secondary transforming unit 1522 does not perform the secondary transform processing, in a case of sec_idx=1 (i.e., sec_flag=1, sec_trans_idx=0), the secondary transforming unit 1522 performs the secondary transform 1 (e.g., transform for the horizontal direction), in a case of sec_idx=2 (i.e., sec_flag=1, sec_trans_idx=1), the secondary transforming unit 1522 performs the secondary transform 2 (e.g., transform for the vertical direction), and in a case of sec_idx=3 (i.e., sec_flag=1, sec_trans_idx=2), the secondary transforming unit 1522 performs the secondary transform 3 (e.g., transform for the horizontal and vertical directions).

Note that the range of the value of sec_idx is not limited to the above. For example, instead of four stages of 0 to 3 in the above description, M stages from 0 to M−1 may be used, and M may be a value such as 2, 3, 4, or the like.

The core transforming unit 1521 receives the transform coefficient d[ ][ ] or the modification transform coefficient d [ ][ ] reconstructed by the secondary transforming unit 1522, and performs adaptive core transform to derive the prediction residual r[ ][ ]. The prediction residual r[ ][ ] is sent from the core transforming unit 1521 to the adder 17. In a case that the secondary transform is off, the modification transform coefficient is equal to the transform coefficient.

The secondary transform is performed, for each 4×4 subblock, on a TU having nTbs×nTbs size (transform coefficient d[ ][ ]). The secondary transform is applied only in an intra CU, and the transform basis is determined with reference to the intra prediction mode. Selection of the transform basis is described later.

The secondary transform includes separable transform (Rotational Transform (ROT)) in which the transform of the subblock is performed in two stages of 1×4 vertical transform and 4×1 horizontal transform, and Non-separable secondary transform (NSST) in which the transform of the subblock is performed at once as one-dimensional 16×1 vector transform.

Separable Transform (ROT)

Figure 20:
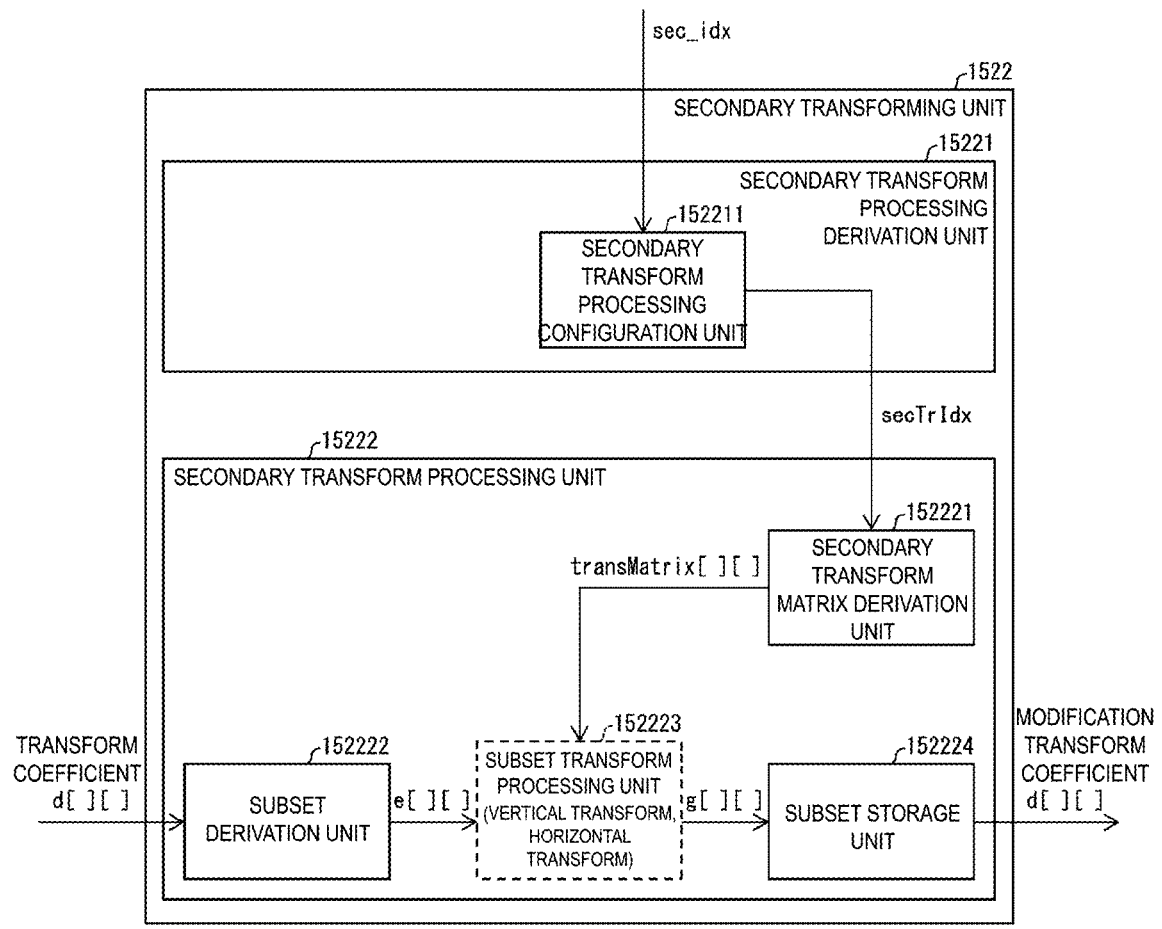
FIG. 20 is a diagram illustrating a configuration example in a case that a secondary transforming unit in FIG. 10 performs separable transform.

Next, the separable transform (ROT) will be described using FIG. 20. FIG. 20 is a diagram illustrating, in a case that the secondary transforming unit 1522 in FIG. 19 performs the separable transform, a configuration example of the secondary transforming unit 1522.

The secondary transforming unit 1522 includes a secondary transform processing derivation unit 15221 and a secondary transform processing unit 15222. The secondary transform processing derivation unit 15221 further includes a secondary transform processing configuration unit 152211. On the other hand, the secondary transform processing unit 15222 includes a secondary transform matrix derivation unit 152221, a subset derivation unit 152222, a subset transform processing unit 152223, and a subset storage unit 152224.

The secondary transform processing configuration unit 152211 receives an index (sec_idx) from the TT information decoding unit 13. Furthermore, the secondary transform processing configuration unit 152211 derives, from sec_idx, an index secTrIdx indicating whether to perform transform processing of vertical transform and horizontal transform, and sends the index secTrIdx (vertical direction secondary transform processing index secTrIdxV, horizontal direction secondary transform processing index secTrIdxH) to the secondary transform matrix derivation unit 152221.

secTrIdxH=secTrSet[sec_trans_idx_hor]

secTrIdxV=secTrSet[sec_trans_idx_ver]

Here, sec_trans_idx_ver=sec_idx>>1, sec_trans_idx_hor=sec_idx & 1 are satisfied.

The secondary transform matrix derivation unit 152221 derives, from the received parameters secTrIdxV and sec- TrIdxH indicating the secondary transform processing, a matrix transMatrixV[ ][ ] for vertical transform and a matrix transMatrixH[ ][ ] for horizontal transform necessary for actual transform (subset transform processing).

transMatrixV[ ][ ]=secTransMatrix[secTrIdxV][ ][ ]

transMatrixH[ ][ ]=secTransMatrix[secTrIdxH][ ][ ]

The secondary transform matrix derivation unit 152221 sends the derived matrix to the subset transform processing unit 152223.

The secondary transform processing unit 15222 sequentially extracts a part of the transform coefficient d[ ][ ] of nTbs×nTbs received from the inverse quantization unit 151, derives a subblock (matrix of M×N) (subset derivation unit 152222), performs inverse transform on the subblock by the derived unit (subset transform processing unit 152223), reconstructs the subblock subjected to the inverse transform again as a modification transform coefficient d[ ][ ] of nTbs×nTbs (subset storage unit 152224), and outputs the result to the core transforming unit 1521. Here, the size of the subblock may be 4×4, 4×8, 8×4, 8×8.

Hereinafter, the subblock coordinates (xS, yS) are sequentially configured, and each of the subblocks is processed by loop processing.

An example of a subblock derived by the subset derivation unit 152222 according to the present embodiment will be described below with reference to FIG. 21. (a) to (f) of FIG. 21 are diagrams each of which illustrates an example of a subblock derived by the subset derivation unit 152222.

Figure 21:
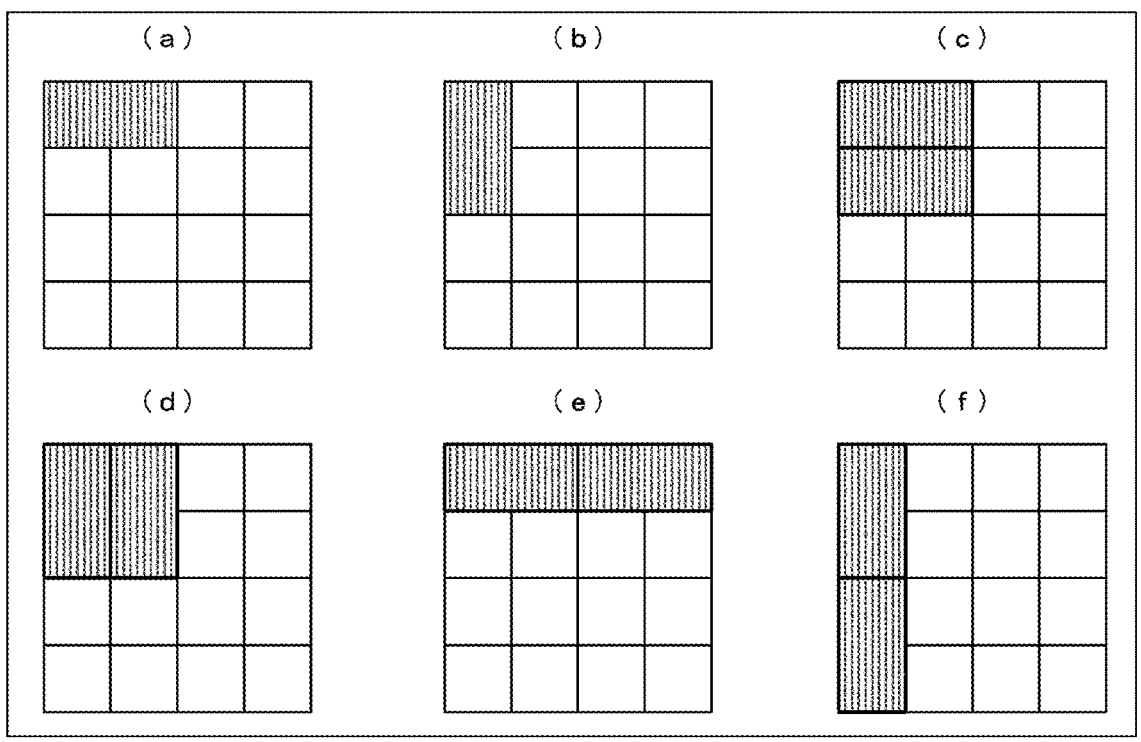
FIG. 21 is a diagram illustrating an example of a subblock derived as a target of secondary transform by the video decoding apparatus according to an embodiment of the present invention.

For example, as illustrated in (a) or (b) of FIG. 21, the subset derivation unit 152222 derives a subblock (8×4 or 4×8) of the top left coordinates (0, 0). The number of loops of a subblock loop in the example is one, and a loop variable is (xS, yS)=(0, 0).

In another example, as illustrated in (c) or (d) of FIG. 21, the subset derivation unit 152222 derives a subblock (8×4 or 4×8) of the top left coordinates (0, 0) and a subblock (8×4 or 4×8) adjacent to the subblock in the long side direction. In a case that the size of the subblock is 8×4, the loop variable of the subblock loop in the example is (xS, yS)=(0, 0), (xS, yS)=(0, 4). Alternatively, the number of loops of the subblock loop is two, in a case that the size of the subblock is 4×8, the loop variable is (xS, yS)=(0, 0), (xS, yS)=(4, 0).

In another example, as illustrated in (e) or (f) of FIG. 21, the subset derivation unit 152222 derives a subblock (8×4 or 4×8) of the top left coordinates (0, 0) and a subblock (8×4 or 4×8) adjacent to the subblock in the short side direction. In a case that the size of the subblock is 8×4, the loop variable of the subblock loop in the example is (xS, yS)=(0, 0), (xS, yS)=(8, 0). Alternatively, the number of loops of the subblock loop is two, in a case that the size of the subblock is 4×8, the loop variable is (xS, yS)=(0, 0), (xS, yS)=(0, 8).

In another example, the subset derivation unit 152222 does not extract the subblock from the transform coefficient d[ ][ ] of nTbs×nTbs received from the inverse quantization unit 151, and the subset transform processing unit 152223 transforms the transform coefficient d[ ][ ] of nTbs×nTbs. The number of loops of the subblock loop in the example is nTbs/M*nTbs/N, and the loop variable is xS=0 . . . nTbs/M−1, yS=0 . . . nTbs/N−1.

In the secondary transform processing unit 15222, to describe in more detail, the subset derivation unit 152222 extracts an M×N subblock e[ ][ ] at the position of coordinates (xS, yS) from the transform coefficient d[ ][ ] of nTbs×nTbs (an example of M×N subblock e[ ][ ] is as described above).

$e[i][j]=d[xx][yy]$, $xx=(xS)+i$, $yy=(yS)+j$ ($i=0 \ldots M-1$, $j=0 \ldots N-1$)

Here, i and j represent a position on the subblock, and xx and yy represent a position on the transform coefficient d[ ][ ] of nTbs×nTbs.

The subset transform processing unit 152223 performs the secondary transform processing indicated by the parameters secTrIdxV and secTrIdxH on the subblock e[ ][ ]. The subset transform processing unit 152223 transforms the subset e[ ][ ] to a temporary variable x[ ][ ] in the vertical subset transform (vertical secondary transform), and on the other hand, transforms a temporary variable x[j][y] to g[i][y] in the horizontal subset transform (horizontal secondary transform).

$x[x][i]=\Sigma(\text{transMatrixV}[i][j]\times e[x][j])$ ($j=0 \ldots N-1$)

$g[i][y]=\Sigma(\text{transMatrixH}[i][j]\times x[j][y])$ ($j=0 \ldots M-1$)

The subset storage unit 152224 stores g[i][j] as the modification transform coefficient d[xx][yy], and sends this transform coefficient (modification transform coefficient d[ ][ ]) to the core transforming unit 1521.

$d[xx][yy]=g[i][j]$, $xx=xS+i$, $yy=yS+j$ ($i=0 \ldots M-1$, $j=0 \ldots N-1$)

Non-Separable Transform (NSST)

Figure 22:
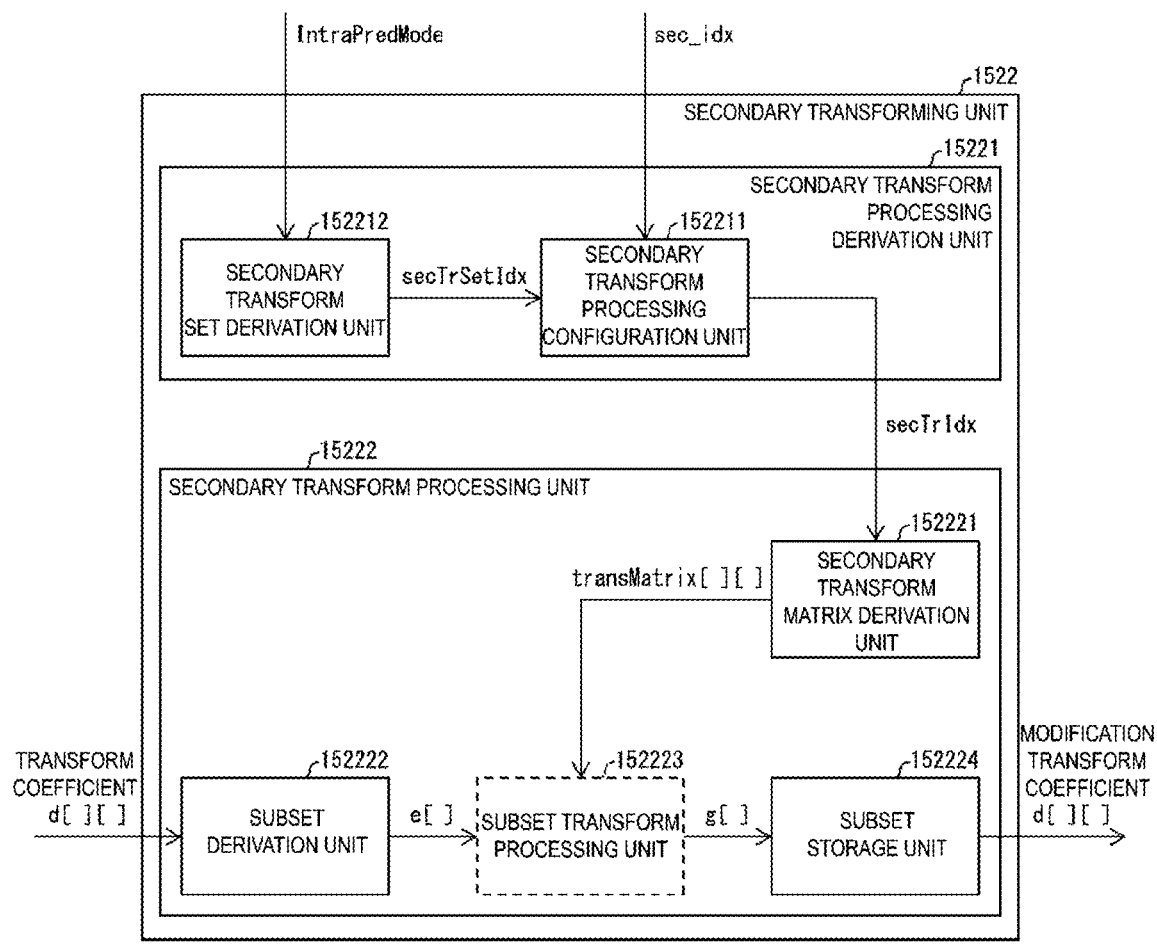
FIG. 22 is a diagram illustrating a configuration example in a case that the secondary transforming unit in FIG. 10 performs non-separable transform.

Next, the non-separable secondary transform (NSST) will be described using FIG. 22. FIG. 22 is a diagram illustrating, in a case that the secondary transforming unit 1522 in FIG. 19 performs the non-separable transform, a configuration example of the secondary transforming unit 1522.

The secondary transforming unit 1522 includes the secondary transform processing derivation unit 15221 and the secondary transform processing unit 15222. The secondary transform processing derivation unit 15221 further includes a secondary transform set derivation unit 152212 and the secondary transform processing configuration unit 152211. On the other hand, the secondary transform processing unit 15222 includes the secondary transform matrix derivation unit 152221, the subset derivation unit 152222, the subset transform processing unit 152223, and the subset storage unit 152224.

The secondary transform set derivation unit 152212 derives a secondary transform set index secTrSetIdx according to the intra prediction mode IntraPredMode, with reference to a secondary transform set index table secTrSetIdxTbl, and sends the derived index to the secondary transform processing configuration unit 152211.

secTrSetIdx=secTrSetIdxTbl[IntraPredMode]

The secondary transform processing configuration unit 152211 derives an index secTrIdx indicating a method of secondary transform from the secondary transform set index secTrSetIdx and a secondary transform set table SecTrSet, based on sec_idx.

secTrIdx=secTrSet[secTrSetIdx][sec_idx]

Here, sec_idx=0 indicates secondary transform off. The secondary transform processing configuration unit 152211 sends the derived secTrIdx to the secondary transform matrix derivation unit 152221.

The secondary transform matrix derivation unit 152221 derives, from the received parameter secTrIdx indicating the secondary transform processing, a matrix transMatrix[ ][ ] necessary for actual transform (subset transform processing).

transMatrix[ ][ ]=secTransMatrixTbl[secTrIdx][ ][ ]

The secondary transform matrix derivation unit 152221 sends the derived transform matrix to the subset transform processing unit 152223.

In the secondary transform processing, subset transform is performed in units of M×N subblock constituting the TU. Specifically, three kinds of processing of processing for deriving a subblock from a block (subset derivation unit 152222), processing for transforming the subblock (subset transform processing unit 152223), and processing for storing the subblock in the block (subset storage unit 152224) are included.

In the same manner as the separable transform (ROT), the size M×N of the subblock derived by the subset derivation unit 152222 may be 4×4, 4×8, 8×4, or 8×8. Here, size examples (configuration example 1 to 4) of a subblock that is derived by the subset derivation unit 152222 in accordance with the size (nTbs×nTbs) of the transform coefficient d[ ][ ] received from the inverse quantization unit 151 are described below.

Configuration Example 1

For example, in a case that the size (nTbs×nTbs) of the transform coefficient d[ ][ ] received from the inverse quantization unit 151 is 4×4, the subset derivation unit 152222 derives a subblock of 4×4. Furthermore, in a case that the size (nTbs×nTbs) of the transform coefficient d[ ][ ] received from the inverse quantization unit 151 is a size other than 4×4, the subset derivation unit 152222 selects one of a subblock of 4×8 and a subblock of 8×4. To describe in more detail, in a case that the lateral size of the transform coefficient d[ ][ ] received from the inverse quantization unit 151 is 4, the subset derivation unit 152222 selects a subblock of 4×8. In a case that the longitudinal size of the transform coefficient d[ ][ ] received from the inverse quantization unit 151 is 4, the subset derivation unit 152222 selects a subblock of 8×4. In a case that the longitudinal size and the lateral size of the transform coefficient d[ ][ ] received from the inverse quantization unit 151 are not 4, the subset derivation unit 152222 selects one of a subblock of 4×8 and a subblock of 8×4.

Configuration Example 2

For example, in a case that the size (nTbs×nTbs) of the transform coefficient d[ ][ ] received from the inverse quantization unit 151 is 4×4, the subset derivation unit 152222 does not extract a subblock from the transform coefficient d[ ][ ] of nTbs×nTbs received from the inverse quantization unit 151. Furthermore, in a case that the size (nTbs×nTbs) of the transform coefficient d[ ][ ] received from the inverse quantization unit 151 is a size other than 4×4, the subset derivation unit 152222 selects one of a subblock of 4×8 and a subblock of 8×4. To describe in more detail, in a case that the lateral size of the transform coefficient d[ ][ ] received from the inverse quantization unit 151 is 4, the subset derivation unit 152222 selects a subblock of 4×8. In a case that the longitudinal size of the transform coefficient d[ ][ ] received from the inverse quantization unit 151 is 4, the subset derivation unit 152222 selects a subblock of 8×4. In a case that the longitudinal size and the lateral size of the transform coefficient d[ ][ ] received from the inverse quantization unit 151 are not 4, the subset derivation unit 152222 selects one of a subblock of 4×8 and a subblock of 8×4.

Configuration Example 3

For example, in a case that the size (nTbs×nTbs) of the transform coefficient d[ ][ ] received from the inverse quantization unit 151 is 4×4, the subset derivation unit 152222 derives a subblock of 4×4. Furthermore, in a case that the lateral size of the transform coefficient d[ ][ ] received from the inverse quantization unit 151 is 4, the subset derivation unit 152222 derives a subblock of 4×8. Furthermore, in a case that the longitudinal size of the transform coefficient d[ ][ ] received from the inverse quantization unit 151 is 4, the subset derivation unit 152222 derives a subblock of 8×4. In a case that the longitudinal size and the lateral size of the transform coefficient d[ ][ ] received from the inverse quantization unit 151 are not 4, the subset derivation unit 152222 selects any one of a subblock of 4×8, a subblock of 8×4, and a subblock of 8×8.

Configuration Example 4

For example, in a case that one of the longitudinal size and the lateral size of the transform coefficient d[ ][ ] received from the inverse quantization unit 151 is 4 (in a case that the minimum value of the lateral and longitudinal sizes is 4), the subset derivation unit 152222 extracts a subblock of 4×4. Furthermore, in a case that neither the longitudinal size nor the lateral size of the transform coefficient d[ ][ ] received from the inverse quantization unit 151 is 4, one of a subblock of 4×4 and a subblock of 8×8 is selected.

The configuration examples 1 to 4 described above can be applied to Working Example 1 of the non-square secondary transform which will be described later. The configuration examples 1 and 2 described above can be applied to Working Example 2 of the non-square secondary transform which will be described later. The configuration examples 1 and 2 described above can be applied to Working Example 3 of the non-square secondary transform which will be described later.

Hereinafter, the subblock coordinates (xS, yS) are sequentially configured, and each subset is processed by loop processing. Here, the subblock size is M×N, where M=2^m, N=2^n are satisfied. The subblock loop is xS=0 ... nTbs/4−1, yS=0 ... nTbs/4−1.

The subset derivation unit 152222 derives a subblock e[j], in which an M×N block on the position of coordinates (xS<<2, yS<<2) is rearranged in a one-dimensional array, from the transform coefficient d[ ][ ] of nTbs×nTbs received from the inverse quantization unit 151.

$e[j]=d[xx][yy]$, $xx=(xS<<m)+j\%M$, $yy=(yS<<n)+j/M$
($j=0 \ldots M*N-1$)

The subset transform processing unit 152223 performs transform (subset transform) on the subblock of the one-dimensional vector e[j] of the M*N elements because of non-separable transform here, and derives g[i] (i=0 ... 15).

$g[i]=\Sigma(\text{transMatrix}[i][j] \times x[j])$ ($j=0 \ldots M*N-1$)

The subset storage unit 152224 stores g[i] as the transform coefficient d[xx][yy], and sends this modification transform coefficient d[ ][ ] to the core transforming unit 1521.

$d[xx][yy]=y[i]$, $xx=(xS<<m)+i\%M$, $yy=(yS<<n)+i/M$
($i=0 \ldots M*N-1$)

Decoding of Flag Sec_Idx for Secondary Transform

FIG. 23 is a diagram illustrating a configuration example of a syntax table of the CU information, the PT information PTI, and the TT information TTI according to an embodiment of the present invention. First, as illustrated in FIG. 23, the CU Information decoding unit 21 uses the decoding module 10 to decode the CU information (skip flag cu_skip_flag, CU prediction scheme information pred_mode_flag, PU split type information part_mode, and residual root flag rqt_root_cbf). Subsequently, the PU information decoding unit 12 uses the decoding module 10 to perform decoding processing on the PU information PUI (prediction_unit).

In a case that the residual root flag rqt_root_cbf is other than 0 (=1), the TT information decoding unit 13 decodes the transform tree transform_tree (SYN1700).

transform_tree(x0,y0,x0,y0,log2CbSize,0,0)

At this time, the TT information decoding unit 13 may derive the maximum TU hierarchy MaxTrafoDepth used to decode the transform tree transform_tree in accordance with the following equation.

MaxTrafoDepth=CuPredMode[x0][y0]==MODE_IN-TRA?(max_transform_hierarchy_depth_intra+untraSplitFlag):max_transform_hierarchy_depth_inter)

Next, in a case that the flag cbf_cu is other than 0 and the prediction mode is the intra prediction mode, the TT information decoding unit 13 decodes the index sec_idx.

if(cbf_cu&&PredMode==PRED_INTRA)

sec_idx[x0][y0][trafoDepth]

Figure 24:
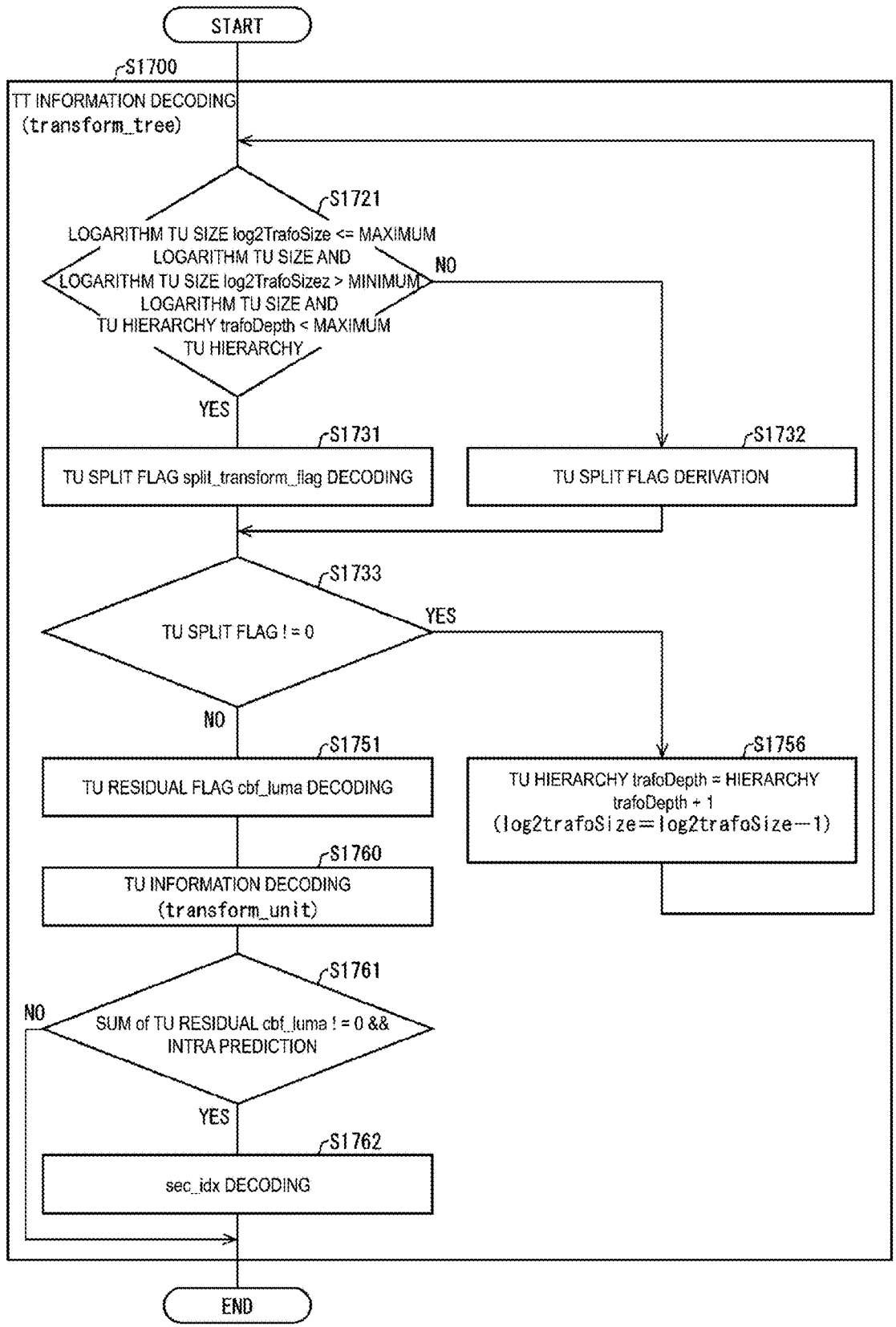
FIG. 24 is a flowchart illustrating schematic operations of the TT information decoding unit (TT information decoding S1700) according to an embodiment of the invention.

Next, processing in which the TT information decoding unit 13 decodes the index sec_idx relating to the secondary transform (SYN1700 in FIG. 23) will be described using FIG. 24. FIG. 24 is a flowchart illustrating schematic operations of the TT information decoding unit 13 (TT information decoding S1700) according to an embodiment of the invention. Note that for the sake of convenience of description, a step for performing the same processing and syntax indicating the same processing as the processing which has already been described are denoted by the same reference numerals, and description thereof will be omitted.

(S1731) The TT information decoding unit 13 decodes the TU split flag (split_transform_flag), in a case that the target TU size (e.g., logarithm TU size log2TrafoSize) is within a prescribed range of transform size (here, equal to or less than the maximum logarithm TU size MaxTbLog2SizeY, more than the minimum logarithm TU size MinTbLog2SizeY) and the TU hierarchy trafoDepth of the target TU is less than a prescribed hierarchy (here, less than the maximum TU hierarchy MaxTrafoDepth). More specifically, in a case of YES at S1721 in FIG. 24, the processing proceeds to S1731 to decode the TU split flag (split_transform_flag) (SYN1731). Note that the TT information decoding unit 13 may not decode the TU split flag split_transform_flag in a case that IntraSplitFlag==1 (N×N) is satisfied and TU hierarchy trafoDepth is 0.

(S1732) On the other hand, in a case that split_transform_flag does not appear in the coded data #1, that is, in a case of NO at S1721), the TT information decoding unit 13 derives the TU split flag split_transform_flag. More specifically, in a case that the logarithm TU size log2TrafoSize is greater than the maximum logarithm TU size MaxTbLog2SizeY, the TT information decoding unit 13 derives the TU split flag split_transform_flag as a value (=1) indicating splitting, and in other cases (logarithm TU size log2TrafoSize is equal to or less than the minimum logarithm TU size MaxTbLog2SizeY, or TU hierarchy trafoDepth is equal to or more than the maximum TU hierarchy MaxTrafoDepth), derives the TU split flag split_transform_flag as a value (=0) indicating not splitting.

(S1733) The TT information decoding unit 13 derives, in a case that the TU split flag split_transform_flag has a value indicating splitting (e.g., 1) (YES at S1733), x1 and y1 first.

$$x1=x0+(1<<(\log2\text{TrafoSize}-1))$$

$$y1=y0+(1<<(\log2\text{TrafoSize}-1))$$

Furthermore, in a case that the TU hierarchy trafoDepth=0 and the target transform tree is in the intra prediction mode, sec_idx is decoded. In other cases, sec_idx is not decoded and set to 0.

Next, four lower transform trees TT at positions of (x0, y0), (x1, y0), (x0, y1), and (x1, y1), which include the logarithm CT size log2CbSize−1 and the TU hierarchy trafoDepth+1, are set and the processing returns to S1721.

$$\text{transform\_tree}(x0,y0,x0,y0,\log2\text{TrafoSize}-1, \text{trafoDepth}+1,0)$$

$$\text{transform\_tree}(x1,y0,x0,y0,\log2\text{TrafoSize}-1, \text{trafoDepth}+1,1)$$

$$\text{transform\_tree}(x0,y1,x0,y0,\log2\text{TrafoSize}-1, \text{trafoDepth}+1,2)$$

$$\text{transform\_tree}(x1,y1,x0,y0,\log2\text{TrafoSize}-1, \text{trafoDepth}+1,3)$$

Here, x0, y0 represent top left coordinates of the target transform tree, x1, y1 represent coordinates derived by adding ½ of the target TU size (1<<log2TrafoSize) to transform tree coordinates (x0, y0), as in the following equation (SYN1756).

That is, the TT information decoding unit 13 updates, before recursively decoding the transform tree transform_tree, the TU hierarchy trafoDepth, which indicates the hierarchy of the transform tree TT, by adding one, and the logarithm CT size log2TrafoSize, which is the target TU size, by subtracting one in accordance with the following equations.

$$\text{trafoDepth}=\text{trafoDepth}+1$$

$$\log2\text{TrafoSize}=\log2\text{TrafoSize}-1$$

(S1751) On the other hand, in a case that the TU split flag split_transform_flag is 0 (NO at S1733), the TT information decoding unit 13 decodes a TU residual flag (e.g. cbf_luma) indicating whether or not the target TU includes a residual. Here, as the TU residual flag, a luminance residual flag cbf_luma indicating whether or not a residual is included in the luminance component of the target TU is used, but the configuration is not limited thereto.

(S1760) Next, the TT information decoding unit 13 decodes, in a case that the TU split flag split_transform_flag is 0, the transform unit TU transform_unit (x0, y0, xBase, yBase, log2TrafoSize, trafoDepth, blkIdx) indicated in SYN1760.

(S1761) The TT information decoding unit 13 decodes, in a case that the TU residual flag cbf_luma is 0 and the prediction mode is the intra prediction mode, the index sec_idx relating to the secondary transform.

Note that in the example described above, a case has been described in which the index sec_idx relating to the secondary transform is decoded at the CU level, but the configuration is not limited thereto. For example, sec_idx may be decoded at a TT level. Such a modification will be described below using FIG. 25 and FIG. 26.

Figure 25:
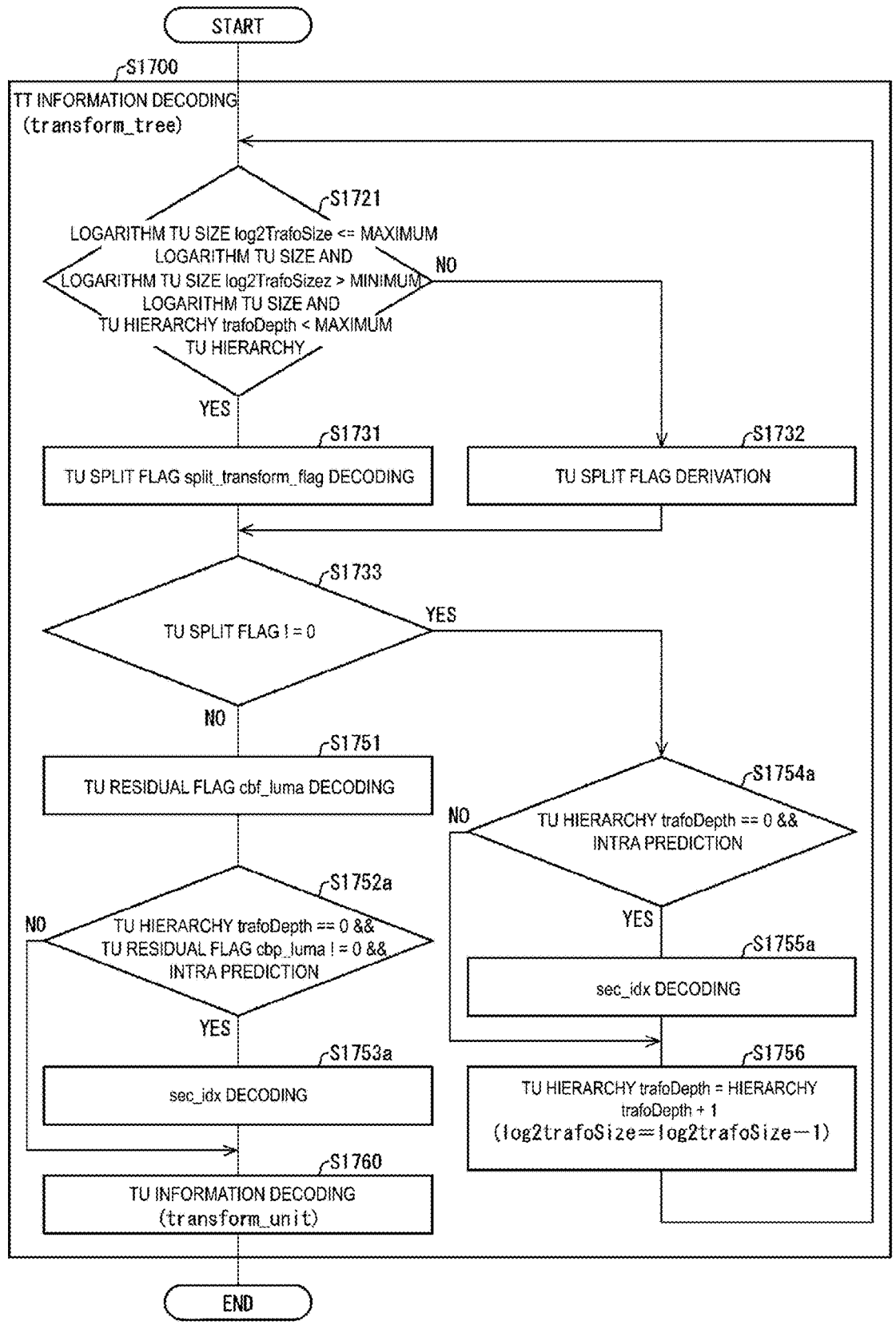
FIG. 25 is a flowchart illustrating schematic operations of the TT information decoding unit (TT information decoding S1700) according to another embodiment of the invention.

The processing in which the TT information decoding unit 13 decodes the index sec_idx relating to the secondary transform may be processed at the TT level as in FIG. 25. FIG. 25 is a flowchart illustrating schematic operations of the TT information decoding unit 13 (TT information decoding S1700) according to an embodiment of the invention. Furthermore, FIG. 26 is a diagram illustrating a configuration example of a syntax table of TT information TTI according to an embodiment of the present invention.

(S1755a) In a case that the TU split flag split_transform_flag has a value indicating splitting (e.g., 1) (YES at S1733), the TT information decoding unit 13 decodes, in a case that the TU hierarchy trafoDepth is 0 and the prediction mode is the intra prediction mode (YES at S1754a), the index sec_idx relating to the secondary transform (SYN1755a), and in other cases (NO at S1754a), derives as sec_idx=0, and the processing transitions to S1756.

(1756) The TT information decoding unit 13 sets four lower transform trees TT at positions of (x0, y0), (x1, y0), (x0, y1), and (x1, y1), which include the logarithm CT size log2CbSize−1 and the TU hierarchy trafoDept+1.

(S1751) On the other hand, in a case that the TU split flag split_transform_flag is 0 (NO at S1733), the TT information decoding unit 13 decodes the TU residual flag (e.g. cbf_luma). Here, as the TU residual flag, a luminance residual flag cbf_luma indicating whether or not a residual is included in the luminance component of the target TU is used, but the configuration is not limited thereto.

(S1753a) The TT information decoding unit 13 decodes, in a case that the TU hierarchy trafoDepth is 0, the TU residual flag (e.g., cbf_luma) is not 0, and the prediction mode is the intra prediction mode (YES at S1752a), the index sec_idx relating to the secondary transform (SYN1753a). In other cases (NO at S1752a), the TT information decoding unit 13 derives as sec_idx=0 without decoding the index sec_idx relating to the secondary transform from the coded data, and the processing transitions to S1760.

(S1760) Next, the TT information decoding unit 13 decodes, in a case that the TU split flag split_transform_flag is 0, the transform unit TU indicated in SYN1760.

$$\text{transform\_unit}(x0,y0,x\text{Base},y\text{Base},\log2\text{TrafoSize}, \text{trafoDepth},\text{blkIdx})$$

Non-Square Secondary Transform (Working Example 1)

Figure 27:
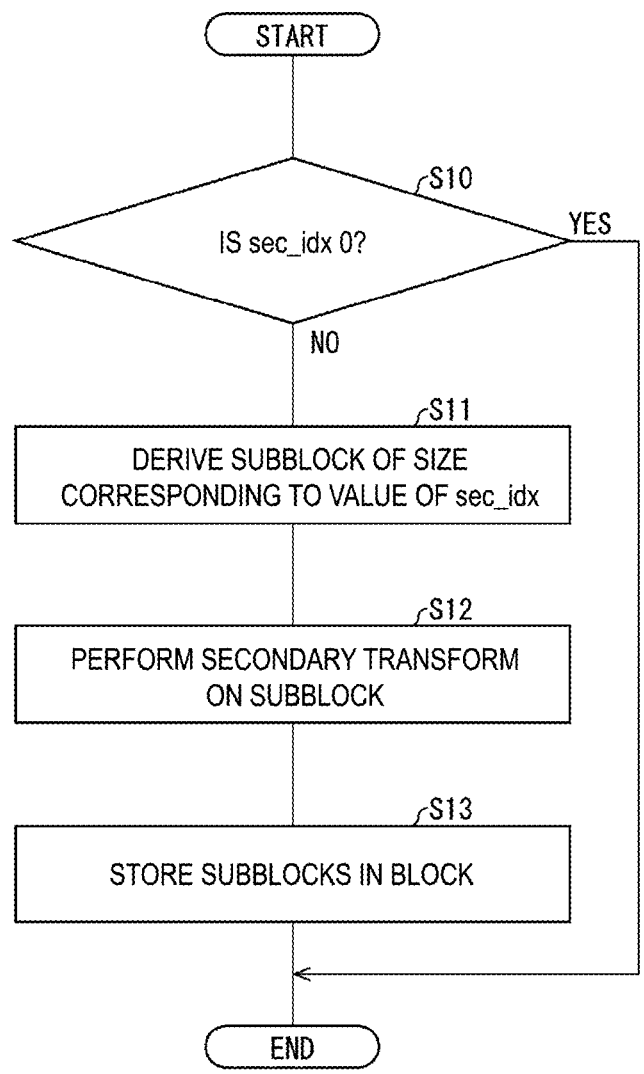
FIG. 27 is a flowchart diagram illustrating Working Example 1 of a non-square secondary transform method performed by the video decoding apparatus according to an embodiment of the present invention.

Working Example 1 of a non-square secondary transform method by the video deco ding apparatus 1 according to the present embodiment will be described below with reference to FIG. 27. FIG. 27 is a flowchart diagram illustrating Working Example 1 of the non-square secondary transform method performed by the video decoding apparatus 1 according to the present embodiment. Note that the non-square secondary transform method described below can be applied to both of the above-described separable transform (ROT) and non-separable transform (NSST).

First, the subset derivation unit 152222 determines whether or not sec_idx decoded by the TT information decoding unit 13 is 0 (step S10). In a case that the subset derivation unit 152222 determines that sec_idx is 0 (YES in step S10), the transform coefficient is sent to the core transforming unit 1521 without performing the secondary transform. In a case that the subset derivation unit 152222 determines that sec_idx is not 0 (NO in step S10), the processing proceeds to step S11.

In step S11, the subset derivation unit 152222 sequentially extracts a part of the transform coefficient d[ ][ ] of nTbs× nTbs received from the inverse quantization unit 151, and derives a subblock having a size corresponding to the value of sec_idx. The subblock having the size corresponding to the value of sec_idx here will be described later.

Next, the subset transform processing unit 152223 performs secondary transform on the subblock derived by the subset derivation unit 152222 (step S12).

Next, the subset storage unit 152224 stores the subblock subjected to the secondary transform by the subset transform processing unit 152223 in the block, and sends as a modification transform coefficient to the core transforming unit 1521 (step S13).

Figure 28:
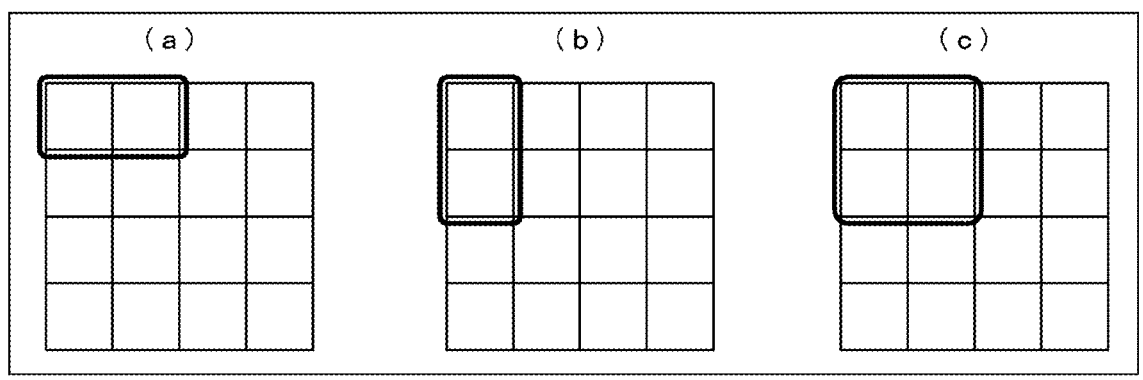
FIG. 28 is a diagram illustrating an example of a subblock as a target of secondary transform by the video decoding apparatus according to an embodiment of the present invention.

An example of the subblock having the size corresponding to the value of sec_idx that the subset derivation unit 152222 derives in step S11l described above will be described below with reference to FIG. 28. (a) to (c) of FIG. 28 are diagrams each of which illustrates an example of a subblock derived by the subset derivation unit 152222. For example, the subset derivation unit 152222 derives, in the case of sec_idx=1 or sec_idx=2, a subblock with size of 8×4 illustrated in (a) of FIG. 28. Furthermore, the subset derivation unit 152222 derives, in the case of sec_idx=3, a subblock with size of 4×8 illustrated in (b) of FIG. 28.

In another example, the subset derivation unit 152222 derives, in the case of sec_idx=1, a subblock with size of 4×8. Furthermore, the subset derivation unit 152222 derives, in the case of sec_idx=2 or sec_idx=3, a subblock with size of 8×4.

In another example, a subblock of 8×8 is included in subblocks derived by the subset derivation unit 152222. To describe in more detail, the subset derivation unit 152222 derives, in the case of sec_idx=1, a subblock with size of 4×8. Furthermore, the subset derivation unit 152222 derives, in the case of sec_idx=2, a subblock with size of 8×4. Furthermore, the subset derivation unit 152222 derives, in the case of sec_idx=3, a subblock with a size of 8×8 illustrated in (c) of FIG. 28.

Non-Square Secondary Transform (Working Example 2)

Figure 29:
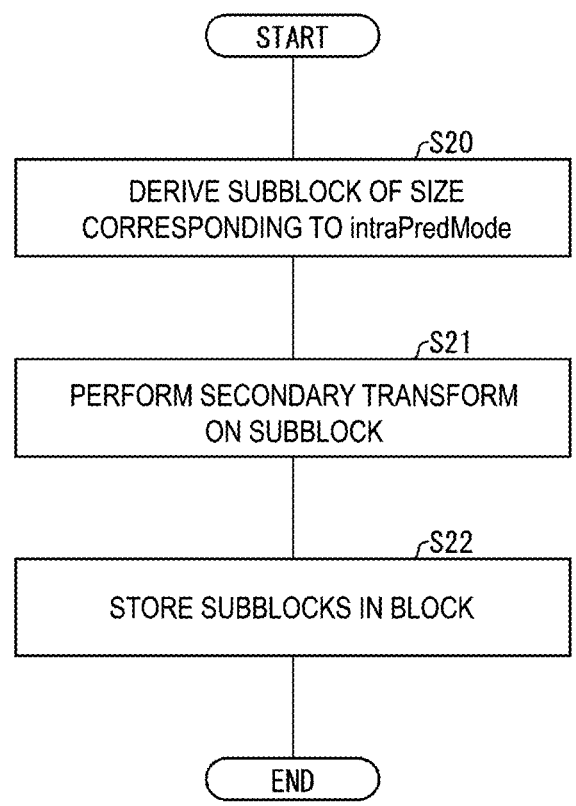
FIG. 29 is a flowchart diagram illustrating Working Example 2 of the non-square secondary transform method performed by the video decoding apparatus according to an embodiment of the present invention.

Working Example 2 of a non-square secondary transform method by the video decoding apparatus 1 according to the present embodiment will be described below with reference to FIG. 29. FIG. 29 is a flowchart diagram illustrating Working Example 2 of the non-square secondary transform method performed by the video decoding apparatus 1 according to the present embodiment. Note that the non-square secondary transform method described below can be applied to both of the above-described separable transform (ROT) and non-separable transform (NSST).

First, the subset derivation unit 152222 sequentially extracts a part of the transform coefficient d[ ][ ] of nTbs× nTbs received from the inverse quantization unit 151, and derives a subblock having a size corresponding to the intra prediction mode intraPredMode (step S20). Note that as illustrated in step S10 in FIG. 27, determination may also be made here as to whether or not to perform the secondary transform. The subblock having the size corresponding to the intra prediction mode intraPredMode here will be described later.

Next, the subset transform processing unit 152223 performs secondary transform on the subblock derived by the subset derivation unit 152222 (step S21).

Next, the subset storage unit 152224 stores the subblock subjected to the secondary transform by the subset transform processing unit 152223 in the block, and sends as a modification transform coefficient to the core transforming unit 1521 (step S22).

An example of the subblock having the size corresponding to the intra prediction mode intraPredMode that the subset derivation unit 152222 derives in step S20 described above will be described below. For example, in a case that the intra prediction mode intraPredMode indicates a vertical prediction, the transform coefficients are likely to concentrate on the upper side in the transform coefficient d[ ][ ] of nTbs×nTbs. Therefore, in this case, the subset derivation unit 152222 derives a subblock with size of 8×4. Furthermore, in a case that the intra prediction mode intraPredMode indicates a horizontal prediction, the transform coefficients are likely to concentrate on the left side in the transform coefficient d[ ][ ] of nTbs×nTbs. Therefore, in this case, the subset derivation unit 152222 derives a subblock with size of 4×8. In this manner, by selecting, in the vertical prediction, 8×4 of the horizontally long NSST block as the block size of the secondary transform, and selecting, in the horizontal prediction, 4×8 of the vertically long NSST block as the block size of the secondary transform, the energy of the residual can be efficiently concentrated.

Hereinafter, a specific example of a method in which the subset derivation unit 152222 determines the intra prediction mode and selects the size of the subblock in step S20 described above will be described. For example, the subset derivation unit 152222 derives, in a case of determining that the intra prediction mode intraPredMode indicates an angular prediction close to the vertical direction, a subblock with size of 8×4. Furthermore, the subset derivation unit 152222 derives, in a case of determining that the intra prediction mode intraPredMode indicates an angular prediction close to the horizontal direction, a subblock with size of 4×8.

In another example, the subset derivation unit 152222 calculates the distance between the intra prediction mode intraPredMode (angular prediction) and a vertical prediction mode verMode, or the distance between the intra prediction mode intraPredMode (angular prediction) and a horizontal prediction mode verMode, and selects the size of the subblock in accordance with the distance. To describe in more detail, the subset derivation unit 152222 derives, in a case that Expression (10) indicated below is satisfied, a subblock with size of 8×4, and derives, in a case that Expression (11) indicated below is satisfied, a subblock with size of 4×8.

$$\text{abs(IntraPredMode−verMode)} < \text{intraHorVerDistThres} \quad \text{Expression (10)}$$

$$\text{abs(IntraPredMode−horMode)} < \text{intraHorVerDistThres} \quad \text{Expression (11)}$$

intraHorVerDistThres is a prescribed threshold. The subset derivation unit 152222 derives a subblock with size of 4×4 in a case that neither Equation (10) nor Equation (11) is satisfied.

In another example, the subset derivation unit 152222 compares the intra prediction mode intraPredMode (angular prediction) and an intra prediction mode diagMode in the upper left diagonal direction (45 degrees) with each other, and selects the size of the subblock. To describe in more detail, the subset derivation unit 152222 derives, in a case that Expression (12) indicated below is satisfied, a subblock with size of 8×4, and derives, in a case that Expression (13) indicated below is satisfied, a subblock with size of 4×8.

$$\text{IntraPredMode} > \text{diagMode} \quad \text{Expression (12)}$$

$$\text{IntraPredMode} \leq \text{diagMode} \quad \text{Expression (13)}$$

Non-Square Secondary Transform (Working Example 3)

Figure 30:
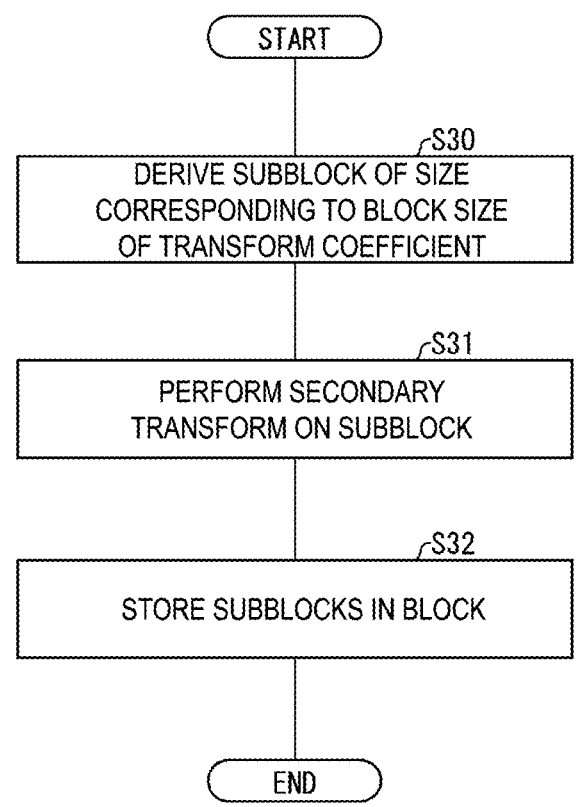
FIG. 30 is a flowchart diagram illustrating Working Example 3 of the non-square secondary transform method performed by the video decoding apparatus according to an embodiment of the present invention.

Working Example 3 of a non-square secondary transform method by the video decoding apparatus 1 according to the present embodiment will be described below with reference to FIG. 30. FIG. 30 is a flowchart diagram illustrating Working Example 3 of the non-square secondary transform method performed by the video decoding apparatus 1 according to the present embodiment. Note that the non-square secondary transform method described below can be applied to both of the above-described separable transform (ROT) and non-separable transform (NSST).

First, the subset derivation unit 152222 sequentially extracts a part of the transform coefficient d[ ][ ] received from the inverse quantization unit 151, and derives a subblock having a size corresponding to a block size of the transform coefficient d[ ][ ] (step S30). Note that as illustrated in step S10 in FIG. 27, determination may also be made here as to whether or not to perform the secondary transform. The subblock having the size corresponding to the block size of the transform coefficient d[ ][ ] here will be described later.

Next, the subset transform processing unit 152223 performs secondary transform on the subblock derived by the subset derivation unit 152222 (step S31).

Next, the subset storage unit 152224 stores the subblock subjected to the secondary transform by the subset transform processing unit 152223 in the block, and sends as a modification transform coefficient to the core transforming unit 1521 (step S32).

An example of the subblock having the size corresponding to the block size of the transform coefficient d[ ][ ] that the subset derivation unit 152222 derives in step S30 described above will be described below with reference to FIG. 31. (a) to (d) of FIG. 31 are diagrams each of which illustrates a block of the transform coefficient d[ ][ ] and a subblock (thick frame) included in the block.

Figure 31:
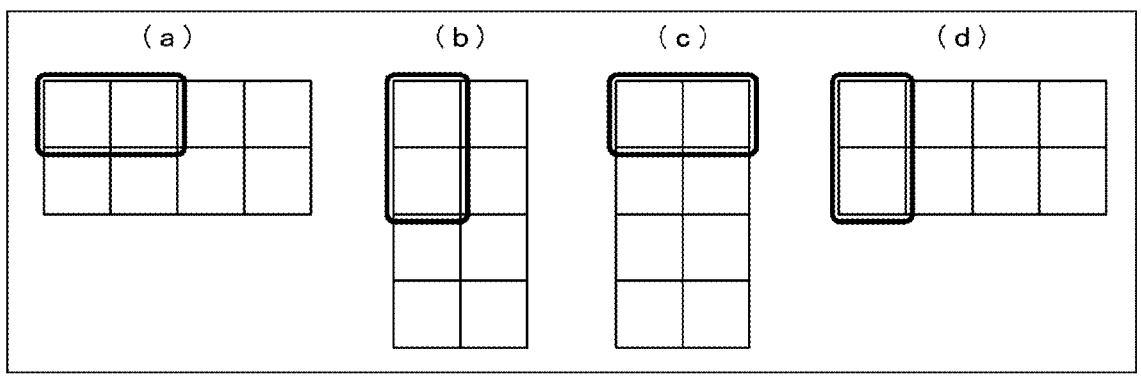
FIG. 31 is a diagram illustrating a block of a transform coefficient d[ ][ ] used by the video decoding apparatus according to an embodiment of the present invention and a subblock (thick frame) included in the block.

For example, as illustrated in (a) of FIG. 31, in a case that the block of the transform coefficient d[ ][ ] is long in the horizontal direction (W>H), the subset derivation unit 152222 derives a subblock with size of 8×4. Furthermore, as illustrated in (b) of FIG. 31, in a case that the block of the transform coefficient d[ ][ ] is long in the vertical direction (W<=H), the subset derivation unit 152222 derives a subblock with size of 4×8.

In another example, as illustrated in (c) of FIG. 31, in a case that the block of the transform coefficient d[ ][ ] is long in the vertical direction (W<=H), the subset derivation unit 152222 derives a subblock with size of 8×4. Furthermore, as illustrated in (d) of FIG. 31, in a case that the block of the transform coefficient d[ ][ ] is long in the horizontal direction (W>H), the subset derivation unit 152222 derives a subblock with size of 4×8. In the above description, W is the width of the block and H is the height of the block.

Supplement

As described above, an image decoding apparatus (video decoding apparatus 1) according to the present embodiment is an image decoding apparatus for performing inverse transform of a transform coefficient on a prescribed unit basis, the image decoding apparatus including: a first transforming unit (core transforming unit 1521) configured to apply core transform to the transform coefficient; and a second transforming unit (secondary transforming unit 1522) configured to perform secondary transform of a non-separable transform coefficient, in which a unit of transform by the second transforming unit includes a non-square subblock.

According to the above-described configuration, since the block to be a target of the secondary transform is a non-square block, by using a non-square block having a size smaller than that of the existing square block as a target of the secondary transform, the processing time (latency) required for the transform can be reduced. Additionally, a circuit scale of the transform or a memory size for storing the transform basis matrix can be reduced.

Furthermore, in the image decoding apparatus (video decoding apparatus 1) according to the present embodiment, the second transforming unit may switch a size of the non-square subblock in accordance with an intra prediction mode.

According to the above-described configuration, in accordance with the intra prediction mode, the size of the non-square subblock to be a target of the secondary transform can be switched. By the intra prediction mode, since a position, at which the transform coefficients are likely to concentrate, in a block of a prescribed unit being a target of the inverse transform can be estimated, by appropriately configuring the size of the subblock to be switched depending on the position, at which the transform coefficients are likely to concentrate, which can be estimated by the intra prediction mode, the energy of the residual can be efficiently concentrated.

Furthermore, in the image decoding apparatus (video decoding apparatus 1) according to the present embodiment, the second transforming unit may switch a size of the non-square subblock in accordance with a block size of the prescribed unit.

According to the above-described configuration, in accordance with a block size of a prescribed unit being a target of the inverse transform, by appropriately configuring the size of the non-square subblock to be switched, the energy of the residual can be efficiently concentrated.

Furthermore, an image decoding apparatus (video decoding apparatus 1) according to the present embodiment is an image decoding apparatus for performing inverse transform of a transform coefficient on a prescribed unit basis, the image decoding apparatus including: a first transforming unit configured to apply core transform to the transform coefficient; a second transforming unit configured to perform secondary transform of the transform coefficient; and a switching unit configured to switch a unit of transform by the second transforming unit in accordance with an index.

According to the above-described configuration, by the index, the configuration of another secondary transform can be appropriately defined and the size of the subblock to be a target of the secondary transform can be defined. Accordingly, the processing time (latency) required for the transform can be reduced.

Furthermore, the video coding apparatus 2 having the same configuration as the video decoding apparatus 1 according to the present embodiment is also included in the scope of the present embodiment. An image coding apparatus (video coding apparatus 2) according to the present embodiment is an image coding apparatus including a forward transforming unit configured to perform forward transform of a prediction error on a prescribed unit basis to derive a transform coefficient, and an inverse transform processing unit configured to perform inverse transform of a transform coefficient on a prescribed unit basis, the image coding apparatus including: a first transforming unit configured to apply core transform to the prediction error and the transform coefficient; and a second transforming unit configured to perform secondary transform of a non-separable transform coefficient, in which a unit of transform by the second transforming unit includes a non-square subblock.

According to the above-described configuration, similarly to the effect achieved by the image decoding apparatus according to the present embodiment, since the block to be a target of the secondary transform is a non-square block, by using a non-square block having a size smaller than that of the existing square block as a target of the secondary transform, the processing time (latency) required for the transform can be reduced. Additionally, a circuit scale of the transform or a memory size for storing the transform basis matrix can be reduced.

Embodiment 3

With respect to the core transform AMT and the secondary transform NSST described above, there are a huge number of combinations of the core transform AMT and the secondary transform NSST performed by the video decoding apparatus 1. Therefore, there is a problem as to which of these combinations the video decoding apparatus 1 selects and performs. Additionally, selecting from among a huge number of combinations of the core transform AMT and the secondary transform NSST, and performing the selected core transform AMT and secondary transform NSST increases the amount of processing relating to reconstruction of the prediction residual.

In order to solve the above-described problem, the video decoding apparatus 1 according to the present embodiment includes: a first transforming unit (core transforming unit 1521) configured to apply core transform of any one of first type core transform (basic core transform) and second type core transform (extended core transform) to a transform coefficient, and a second transforming unit (secondary transforming unit 1522) configured to perform secondary transform on the transform coefficient only in a case that the first transforming unit performs the first type core transform.

Embodiment 2 of the present invention having the configuration described above will be described as follows with reference to the drawings. Note that in the present embodiment as well, the video decoding apparatus 1 and the video coding apparatus 2 according to Embodiment 1 are used. Therefore, members having the same function as the members included in the video decoding apparatus 1 described in Embodiment 1 are denoted by the same reference signs, and description thereof will be omitted.

Primary Part Configuration of Embodiment 3

Figure 32:
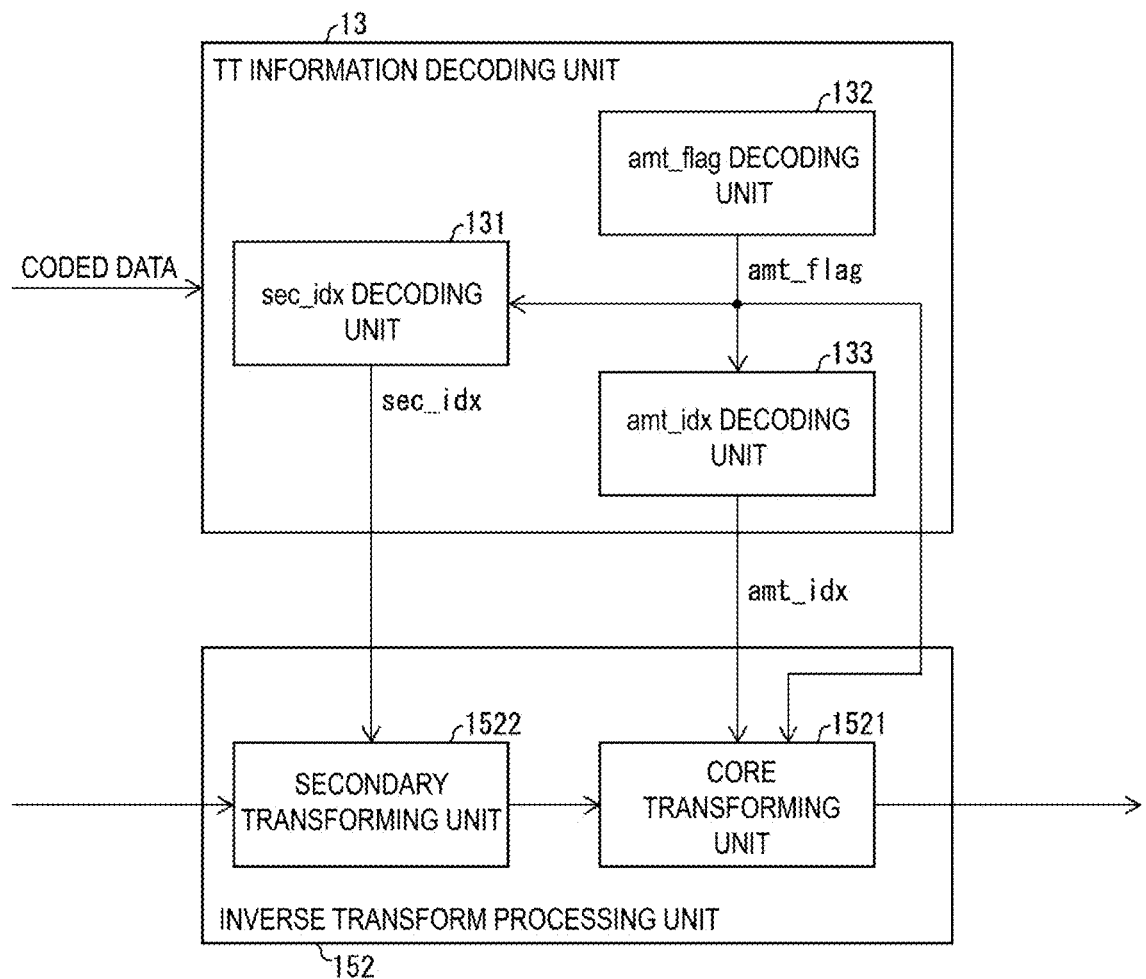
FIG. 32 is a functional block diagram illustrating an example of configurations of the TT information decoding unit and the inverse transform processing unit according to an embodiment of the present invention.

The configurations of the TT information decoding unit 13 and the inverse transform processing unit 152 will be described using FIG. 32. FIG. 32 is a functional block diagram illustrating an example of configurations of the TT information decoding unit 13 and the inverse transform processing unit 152. The TT information decoding unit 13 includes a sec_idx decoding unit 131, an amt_flag decoding unit 132, and an amt_idx decoding unit 133, and performs TT information decoding and TU information decoding. The inverse transform processing unit 152 includes the secondary transforming unit 1522 and the core transforming unit 1521.

The amt_flag decoding unit 132 decodes the AMT flag amt_flag and sends the decoded AMT flag amt_flag to the amt_idx decoding unit 133 and the core transforming unit 1521.

The amt_idx decoding unit 133 decodes the AMT index amt_idx based the received AMT flag amt_flag and sends the decoded AMT index amt_idx to the core transforming unit 1521. To describe in more detail, in a case of amt_flag=0 (basic core transform), the amt_idx decoding unit 133 does not decode the AMT index amt_idx based the received AMT flag amt_flag. On the other hand, in a case of amt_flag=1 (extended core transform), the amt_idx decoding unit 133 decodes the AMT index amt_idx based the received AMT flag amt_flag.

In a case that the TT information decoding unit 13 receives the coded data from the CU information decoding unit 21, the sec_idx decoding unit 131 decodes sec_idx and sends the decoded sec_idx to the secondary transforming unit 1522. To describe in more detail, the sec_idx decoding unit 131 refers to the amt_flag decoded by the amt_flag decoding unit 132, and in a case of amt_flag=0 (basic core transform), decodes sec_idx. On the other hand, in a case of amt_flag=1 (extended core transform), the sec_idx decoding unit 131 configures sec_idx=0 indicating that the secondary transform is not performed.

In accordance with the value of sec_idx, the secondary transforming unit 152 selects whether or not to perform secondary transform on the transform coefficient d[ ][ ], and in a case of performing the secondary transform, selects which secondary transform is to be performed, and performs it. On the other hand, the core transforming unit 1521 receives the modification transform coefficient d[ ][ ] from the secondary transforming unit 1522, and performs transform processing according to the values of the AMT flag amt_flag and the AMT index amt_idx.

Core Transform and Secondary Transform Limitation

Figure 33:
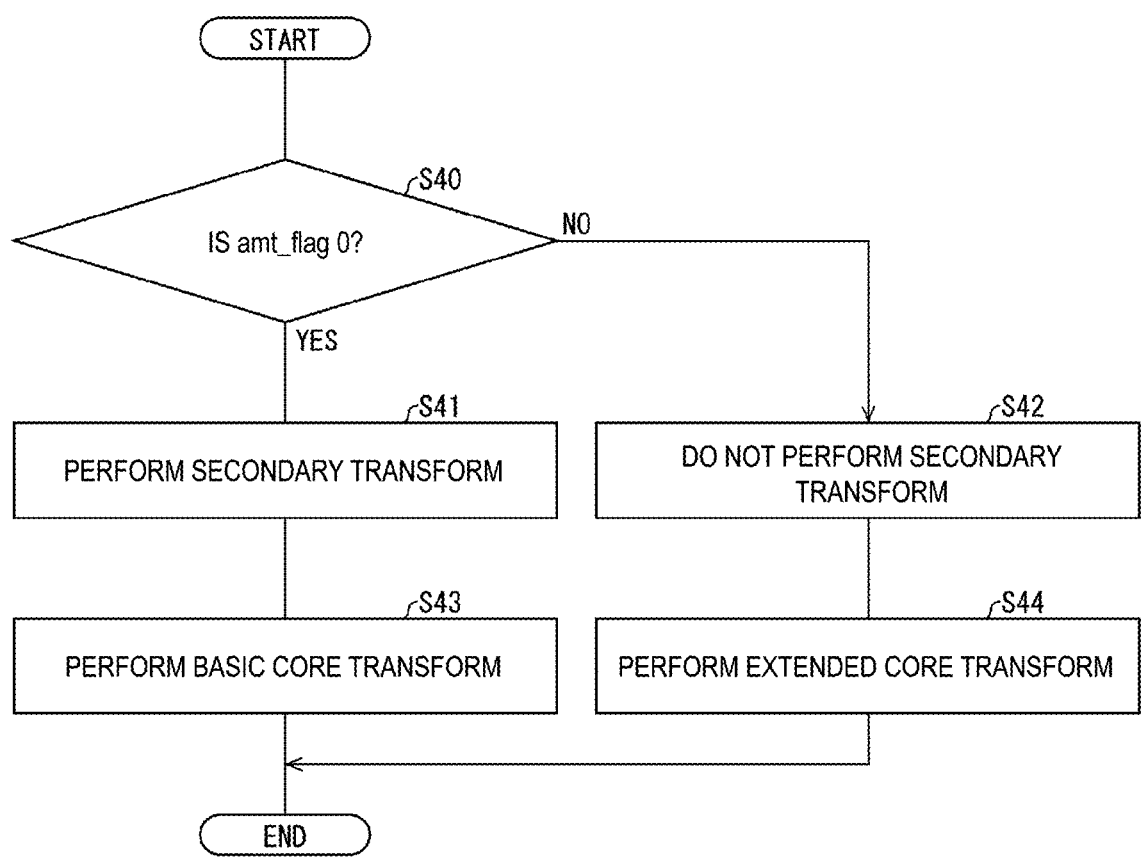
FIG. 33 is a flowchart diagram illustrating a core transform and secondary transform limitation method performed by the video decoding apparatus according to an embodiment of the present invention.

A core transform and secondary transform limitation method by the video decoding apparatus 1 according to the present embodiment will be described below with reference to FIG. 33. FIG. 33 is a flowchart diagram illustrating the core transform and secondary transform limitation method performed by the video decoding apparatus 1 according to the present embodiment.

First, the sec_idx decoding unit 131 determines whether or not amt_flag decoded by the amt_flag decoding unit 132 is 0 (step S40).

In a case that amt_flag is 0 (YES in step S40), the sec_idx decoding unit 131 decodes sec_idx, and the secondary transforming unit 1522 performs the secondary transform indicated by sec_idx decoded by the sec_idx decoding unit 131 on the transform coefficient d[ ][ ], and sends the modification transform coefficient d[ ][ ] after the secondary transform to the core transforming unit 1521 (step S41).

In a case that amt_flag is 1 (NO in step S40), the sec_idx decoding unit 131 configures sec_idx to 0, and the secondary transforming unit 1522 sends, in accordance with sec_idx=0 configured by the sec_idx decoding unit 131, without performing the secondary transform, the transform coefficient d[ ][ ] to the core transforming unit 1521 (step S42).

As a next step of step S41, the core transforming unit 1521 performs basic core transform on the modification transform coefficient d[ ][ ] obtained by the secondary transform performed by the secondary transforming unit 1522 (step S43). The basic core transform here is fixed transform in which switching by an index is not perform, and is separable transform in which transform of a block is performed in two stages of vertical transform and horizontal transform.

As a next step of step S42, the core transforming unit 1521 performs extended core transform according to the value of amt_idx decoded by the amt_idx decoding unit 133 on the transform coefficient d[ ][ ] received from the secondary transforming unit 1522 (step S44). The extended core transform here is selective transform in which switching by an index is performed. Furthermore, the extended core transform may be separable transform in which transform of a block is performed in two stages of vertical transform and horizontal transform, or Non-separable secondary transform (NSST) in which transform of a block is performed at once as one-dimensional 16×1 vector transform.

Supplement

As described above, an image decoding apparatus (video decoding apparatus 1) according to the present embodiment is an image decoding apparatus for performing inverse transform of a transform coefficient on a prescribed unit basis, the image decoding apparatus includes: a first transforming unit (core transforming unit 1521) configured to apply any one of first type core transform and second type core transform to the transform coefficient; and a second transforming unit (secondary transforming unit 1522) configured to perform secondary transform of the transform coefficient only in a case that the first transforming unit performs the first type core transform.

According to the above-described configuration, in a case that the second type core transform having a long processing time is performed, the secondary transform is not performed, and thus the amount of processing relating to the reconstruction of the prediction residual can be reduced.

Furthermore, in the image decoding apparatus (video decoding apparatus 1) according to the present embodiment, the second type core transform applied by the first transforming unit may be non-separable transform.

According to the above-described configuration, in a case that the secondary transform is the non-separable transform, it is possible to avoid waste that the second type core transform of non-separable transform and the secondary transform of the non-separable transform are simultaneously performed. Therefore, the amount of processing relating to the reconstruction of the prediction residual can be reduced.

Furthermore, in the image decoding apparatus (video decoding apparatus 1) according to the present embodiment, the first transforming unit may select the first type core transform with reference to first syntax, and select the second type core transform with reference to the first syntax and second syntax.

According to the above-described configuration, in a case of selecting the first type core transform, it is sufficient that only the first syntax is referred to, and thus the amount of processing relating to the reconstruction of the prediction residual can be reduced.

Furthermore, the video coding apparatus 2 having the same configuration as the video decoding apparatus 1 according to the present embodiment is also included in the scope of the present embodiment. An image coding apparatus (video coding apparatus 2) according to the present embodiment is an image coding apparatus including a forward transforming unit configured to perform forward transform of a prediction error on a prescribed unit basis to derive a transform coefficient, and an inverse transform processing unit configured to perform inverse transform of a transform coefficient on a prescribed unit basis, the image coding apparatus including: a first transforming unit configured to apply any one of first type core transform and second type core transform to the transform coefficient; and a second transforming unit configured to perform secondary transform of the transform coefficient only in a case that the first transforming unit performs the first type core transform.

According to the above-described configuration, similarly to the effect achieved by the image decoding apparatus according to the present embodiment, in a case that the second type core transform is performed, the secondary transform is not performed, and thus the amount of processing relating to the reconstruction of the prediction residual can be reduced.

Video Coding Apparatus

Figure 34:
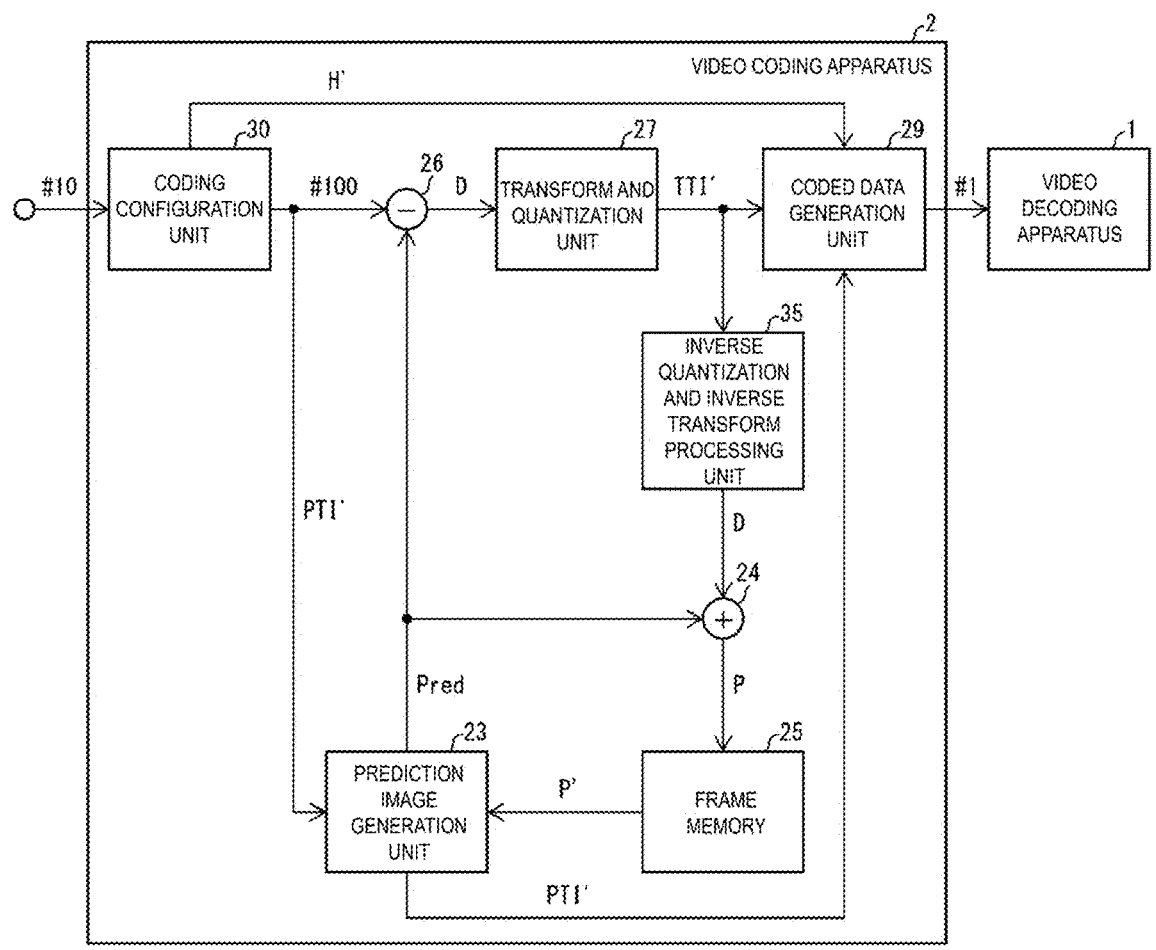
FIG. 34 is a functional block diagram illustrating a schematic configuration of a video coding apparatus according to an embodiment of the present invention.

The video coding apparatus 2 (image coding apparatus) according to the present embodiment will be described below with reference to FIG. 34.

Overview of Video Coding Apparatus

The video coding apparatus 2 is, roughly speaking, a device that generates coded data #1 by encoding an input image #10 and outputs the coded data #1 to the video decoding apparatus 1.

Configuration of Video Coding Apparatus

First, a configuration example of the video coding apparatus 2 will be described using FIG. 34. FIG. 34 is a functional block diagram illustrating the configuration of the video coding apparatus 2. As illustrated in FIG. 34, the video coding apparatus 2 includes a coding configuration unit 30, an inverse quantization and inverse transform processing unit 35, a prediction image generation unit 23, an adder 24, a frame memory 25, a subtractor 26, a transform and quantization unit 27, and an coded data generation unit (adaptive processing means) 29.

The coding configuration unit 30 generates image data and various pieces of configuration information relating to coding, based on the input image #10.

Specifically, the coding configuration unit 30 generates the following image data and configuration information.

First, the coding configuration unit 30 generates a CU image #100 for a target CU by sequentially splitting the input image #10 in units of slice and in units of tree unit.

Furthermore, the coding configuration unit 30 generates header information H' based on the result of the splitting processing. The header information H' includes (1) information on the size and shape of a tree unit belonging to a target slice and the position in the target slice, and (2) CU information CU' on the size and shape of CU belonging to each tree unit and the position in a target tree unit.

In addition, the coding configuration unit 30 generates PT configuration information PTI' with reference to the CU image #100 and the CU information CU'. The PT configuration information PTI' includes information on all combinations of (1) an available split pattern of the target CU for each PU, and (2) an available prediction mode assigned for each PU.

The coding configuration unit 30 supplies the CU image #100 to the subtractor 26. Furthermore, the coding configuration unit 30 supplies the header information H' to the coded data generation unit 29. Furthermore, the coding configuration unit 30 supplies the PT configuration information PTI' to the prediction image generation unit 23.

The inverse quantization and inverse transform processing unit 35 reconstructs, by performing inverse quantization and inverse orthogonal transform on a quantized prediction residual for each TU supplied from the transform and quantization unit 27, the prediction residual D for each TU. The inverse orthogonal transform is as described above in the inverse quantization and inverse transform processing unit 15 illustrated in FIG. 2 and FIG. 10, and thus description thereof will be omitted here.

In addition, the inverse quantization and inverse transform processing unit 35 integrates the prediction residual for each block in accordance with a split pattern indicated by TT split information (described later), and generates the prediction residual D for the target CU. The inverse quantization and inverse transform processing unit 35 supplies the generated prediction residual D for the target CU to the adder 24.

The prediction image generation unit 23 generates the prediction image Pred for the target CU, with reference to a local decoded image P' recorded in the frame memory 25 and the PT configuration information PTI'. The prediction image generation unit 23 configures the prediction parameter obtained by the prediction image generation processing in the PT configuration information PTI', and transfers the PT configuration information PTI' after the configuration to the coded data generation unit 29. Note that the prediction image generation processing by the prediction image generation unit 23 is the same as that of the prediction image generation unit 14 included in the video decoding apparatus 1, and thus description thereof is omitted here.

The adder 24 generates the decoded image P for the target CU by adding the prediction image Pred supplied from the prediction image generation unit 23 and the prediction residual D supplied from the inverse quantization and inverse transform processing unit 35.

The decoded image P which is decoded is sequentially recorded in the frame memory 25. In the frame memory 25, at the time point of decoding the target tree unit, decoded images corresponding to all the tree units (e.g., all the tree units preceding in raster scan order) decoded earlier than the target tree unit are recorded along with the parameter used for decoding of the decoded image P.

The subtractor 26 generates the prediction residual D for the target CU by subtracting the prediction image Pred from the CU image #100. The subtractor 26 supplies the generated prediction residual D to the transform and quantization unit 27.

The transform and quantization unit 27 performs orthogonal transform and quantization on the prediction residual D to generate a quantized prediction residual. Note that the orthogonal transform here refers to orthogonal transform from a pixel domain to a frequency domain. Additionally, examples of the inverse orthogonal transform include Discrete Cosine Transform (DCT transform), Discrete Sine Transform (DST transform), and the like.

Specifically, the transform and quantization unit 27 determines a split pattern of the target CU into one or multiple blocks with reference to the CU image #100 and the CU information CU'. Additionally, in accordance with the determined split pattern, the prediction residual D is split into a prediction residual for each block.

Furthermore, the transform and quantization unit 27 generates the prediction residual in the frequency domain by performing orthogonal transform on the prediction residual for each block, and then generates a quantized prediction residual for each block by performing quantization on the prediction residual in the frequency domain.

Furthermore, the transform and quantization unit 27 generates TT configuration information TTI' including the generated quantized prediction residual for each block, TT split information for indicating the split pattern of the target CU, and information relating to all available split patterns of the target CU into each block. The transform and quantization unit 27 supplies the generated TT configuration information TTI' to the inverse quantization and inverse transform processing unit 35 and the coded data generation unit 29.

The coded data generation unit 29 codes the header information H', the TT configuration information TTI', and PT configuration information PTI', multiplexes the coded header information H, TT configuration information TTI, and PT configuration information PTI to generate and output the coded data #1.

Application Examples

The video coding apparatus 2 and the video decoding apparatus 1 described above can be utilized being installed to various apparatuses performing transmission, reception, recording, and reconstruction of videos. Note that, videos may be natural videos imaged by cameras or the like, or may be artificial videos (including CG and GUI) generated by computers or the like.

At first, referring to FIG. 35, it will be described that the video coding apparatus 2 and the video decoding apparatus 1 described above can be utilized for transmission and reception of videos.

Figure 35:
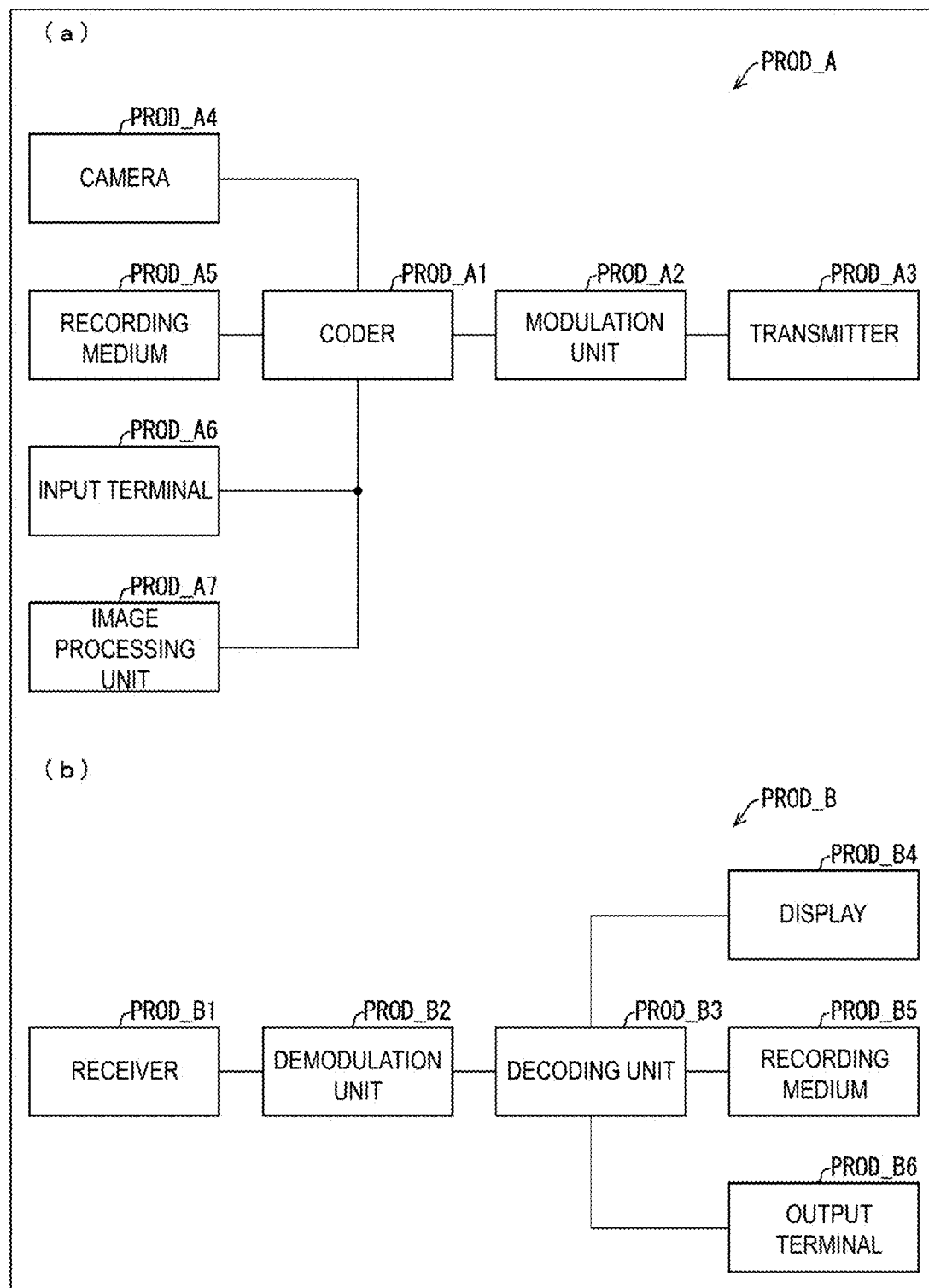
FIG. 35 is a diagram illustrating configurations of a transmission device equipped with the video coding apparatus and a reception device equipped with the video decoding apparatus. (a) illustrates the transmission device equipped with the video coding apparatus, and (b) illustrates the reception device equipped with the video decoding apparatus.

(a) of FIG. 35 is a block diagram illustrating a configuration of a transmission device PROD_A installed with the video coding apparatus 2. As illustrated in (a) of FIG. 35, the transmission device PROD_A includes an coder PROD_A1 which obtains coded data by coding videos, a modulation unit PROD_A2 which obtains modulation signals by modulating carrier waves with the coded data obtained by the coder PROD_A1, and a transmitter PROD_A3 which transmits the modulation signals obtained by the modulation unit PROD_A2. The above-mentioned video coding apparatus 2 is utilized as the coder PROD_A1.

The transmission device PROD_A may further include a camera PROD_A4 imaging videos, a recording medium PROD_A5 recording videos, an input terminal PROD_A6 to input videos from the outside, and an image processing unit A7 which generates or processes images, as sources of supply of the videos input into the coder PROD_A1. In (a) of FIG. 35, although the configuration that the transmission device PROD_A includes these all is exemplified, a part may be omitted.

Note that the recording medium PROD_A5 may record videos which are not coded, or may record videos coded in a coding scheme for recording different than a coding scheme for transmission. In the latter case, a decoding unit (not illustrated) to decode coded data read from the recording medium PROD_A5 according to coding scheme for recording may be interleaved between the recording medium PROD_A5 and the coder PROD_A1.

(b) of FIG. 35 is a block diagram illustrating a configuration of a reception device PROD_B installed with the video decoding apparatus 1. As illustrated in (b) of FIG. 35, the reception device PROD_B includes a receiver PROD_B1 which receives modulation signals, a demodulation unit PROD_B2 which obtains coded data by demodulating the modulation signals received by the receiver PROD_B1, and a decoding unit PROD_B3 which obtains videos by decoding the coded data obtained by the demodulation unit PROD_B2. The above-mentioned video decoding apparatus 1 is utilized as the decoding unit PROD_B3.

The reception device PROD_B may further include a display PROD_B4 displaying videos, a recording medium PROD_B5 to record the videos, and an output terminal PROD_B6 to output videos outside, as supply destination of the videos output by the decoding unit PROD_B3. In (b) of FIG. 35, although the configuration that the reception device PROD_B includes these all is exemplified, a part may be omitted.

Note that the recording medium PROD_B5 may record videos which are not coded, or may record videos which are coded in a coding scheme for recording different from a coding scheme for transmission. In the latter case, an coder (not illustrated) to code videos acquired from the decoding unit PROD_B3 according to a coding scheme for recording may be interleaved between the decoding unit PROD_B3 and the recording medium PROD_B5.

Note that the transmission medium transmitting modulation signals may be wireless or may be wired. The transmission aspect to transmit modulation signals may be broadcasting (here, referred to as the transmission aspect where the transmission target is not specified beforehand) or may be telecommunication (here, referred to as the transmission aspect that the transmission target is specified beforehand). Thus, the transmission of the modulation signals may be realized by any of radio broadcasting, cable broadcasting, radio communication, and cable communication.

For example, broadcasting stations (broadcasting equipment, and the like)/receiving stations (television receivers, and the like) of digital terrestrial television broadcasting is an example of transmission device PROD_A/reception device PROD_B transmitting and/or receiving modulation signals in radio broadcasting. Broadcasting stations (broadcasting equipment, and the like)/receiving stations (television receivers, and the like) of cable television broadcasting are an example of transmission device PROD_A/reception device PROD_B transmitting and/or receiving modulation signals in cable broadcasting.

Servers (work stations, and the like)/clients (television receivers, personal computers, smartphones, and the like) for Video On Demand (VOD) services, video hosting services using the Internet and the like are an example of transmission device PROD_A/reception device PROD_B transmitting and/or receiving modulation signals in telecommunication (usually, any of radio or cable is used as transmission medium in the LAN, and cable is used for as transmission medium in the WAN). Here, personal computers include a desktop PC, a laptop type PC, and a graphics tablet type PC. Smartphones also include a multifunctional portable telephone terminal.

Note that a client of a video hosting service has a function to code a video imaged with a camera and upload the video to a server, in addition to a function to decode coded data downloaded from a server and to display on a display. Thus, a client of a video hosting service functions as both the transmission device PROD_A and the reception device PROD B.

Next, referring to FIG. 36, it will be described that the video coding apparatus 2 and the video decoding apparatus 1 described above can be utilized for recording and reconstruction of videos.

Figure 36:
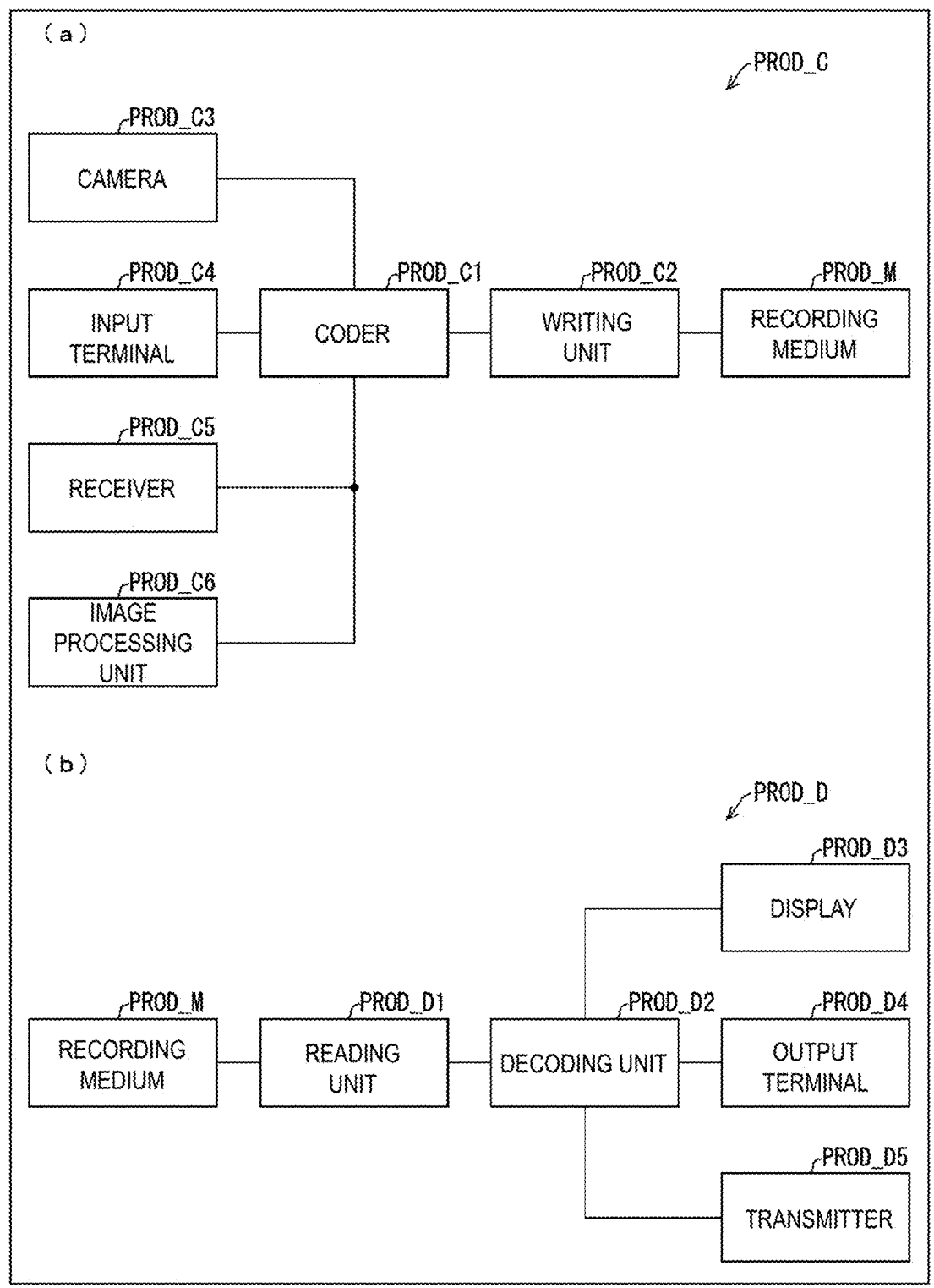
FIG. 36 is a diagram illustrating configurations of a recording apparatus equipped with the video coding apparatus and a reconstruction apparatus equipped with the video decoding apparatus. (a) illustrates the recording apparatus equipped with the video coding apparatus, and (b) illustrates the reconstruction apparatus equipped with the video decoding apparatus.

(a) of FIG. 36 is a block diagram illustrating a configuration of a recording apparatus PROD_C installed with the above-mentioned video coding apparatus 2. As illustrated in (a) of FIG. 36, the recording apparatus PROD_C includes an coder PROD_C1 which obtains coded data by coding a video, and a writing unit PROD_C2 which writes the coded data obtained by the coder PROD_C1 in a recording medium PROD_M. The above-mentioned video coding apparatus 2 is utilized as the coder PROD_C1.

Note that the recording medium PROD_M may be (1) a type built in the recording apparatus PROD_C such as Hard Disk Drive (HDD), Solid State Drive (SSD), or the like may be (2) a type connected to the recording apparatus PROD_C such as an SD memory card, a Universal Serial Bus (USB) flash memory, or the like, and may be (3) a type loaded in a drive apparatus (not illustrated) built in the recording apparatus PROD_C such as Digital Versatile Disc (DVD), Blu-ray Disc (BD: trade name), or the like.

The recording apparatus PROD_C may further include a camera PROD_C3 imaging a video, an input terminal PROD_C4 to input the video from the outside, a receiver PROD_C5 to receive the video, and an image processing unit C6 which generates or processes images, as sources of supply of the video input into the coder PROD_C1. In (a) of FIG. 36, although the configuration that the recording apparatus PROD_C includes these all is exemplified, a part may be omitted.

Note that the receiver PROD_C5 may receive a video which is not coded, or may receive coded data coded in a coding scheme for transmission different from a coding scheme for recording. In the latter case, a decoding unit (not illustrated) for transmission to decode coded data coded in a coding scheme for transmission may be interleaved between the receiver PROD_C5 and the coder PROD_C1.

Examples of such recording apparatus PROD_C include a DVD recorder, a BD recorder, a Hard Disk Drive (HDD) recorder, and the like (in this case, the input terminal PROD_C4 or the receiver PROD_C5 is the main source of supply of a video). A camcorder (in this case, the camera PROD_C3 is the main source of supply of a video), a personal computer (in this case, the receiver PROD_C5 or the image processing unit C6 is the main source of supply of a video), a smartphone (in this case, the camera PROD_C3 or the receiver PROD_C5 is the main source of supply of a video), or the like is an example of such recording apparatus PROD_C.

(b) of FIG. 36 is a block illustrating a configuration of a reconstruction apparatus PROD_D installed with the above-mentioned video decoding apparatus 1. As illustrated in (b) of FIG. 36, the reconstruction apparatus PROD_D includes a reading unit PROD_D1 which reads coded data written in the recording medium PROD_M, and a decoding unit PROD_D2 which obtains a video by decoding the coded data read by the reading unit PROD_D1. The above-mentioned video decoding apparatus 1 is utilized as the decoding unit PROD_D2.

Note that the recording medium PROD_M may be (1) a type built in the reconstruction apparatus PROD_D such as HDD, SSD, or the like may be (2) a type connected to the reconstruction apparatus PROD_D such as an SD memory card, a USB flash memory, or the like, and may be (3) a type loaded in a drive apparatus (not illustrated) built in the reconstruction apparatus PROD_D such as DVD, BD, or the like.

The reconstruction apparatus PROD_D may further include a display PROD_D3 displaying a video, an output terminal PROD_D4 to output the video to the outside, and a transmitter PROD_D5 which transmits the video, as the supply destination of the video output by the decoding unit PROD_D2. In (b) of FIG. 36, although the configuration that the reconstruction apparatus PROD_D includes these all is exemplified, a part may be omitted.

Note that the transmitter PROD_D5 may transmit a video which is not coded, or may transmit coded data coded in a coding scheme for transmission different than a coding scheme for recording. In the latter case, an coder (not illustrated) to code a video in a coding scheme for transmission may be interleaved between the decoding unit PROD_D2 and the transmitter PROD_D5.

Examples of such reconstruction apparatus PROD_D include a DVD player, a BD player, an HDD player, and the like (in this case, the output terminal PROD_D4 to which a television receiver, and the like is connected is the main supply target of the video). A television receiver (in this case, the display PROD_D3 is the main supply target of the video), a digital signage (also referred to as an electronic signboard or an electronic bulletin board, and the like, the display PROD_D3 or the transmitter PROD_D5 is the main supply target of the video), a desktop PC (in this case, the output terminal PROD_D4 or the transmitter PROD_D5 is the main supply target of the video), a laptop type or graphics tablet type PC (in this case, the display PROD_D3 or the transmitter PROD_D5 is the main supply target of the video), a smartphone (in this case, the display PROD_D3 or the transmitter PROD_D5 is the main supply target of the video), or the like is an example of such reconstruction apparatus PROD_D.

Implementation Examples by Software and
Implementation Examples by Software

Each block of the video decoding apparatus 1 and the video coding apparatus 2 described above may be realized as a hardware by a logical circuit formed on an integrated circuit (IC chip), or may be realized as a software using a Central Processing Unit (CPU).

In the latter case, each apparatus includes a CPU performing a command of a program to implement each function, a Read Only Memory (ROM) stored in the program, a Random Access Memory (RAM) developing the program, and a storage apparatus (recording medium) such as a memory storing the program and various data, and the like. The purpose of the present invention can be achieved by supplying, to each of the apparatuses, the recording medium recording readably the program code (execution form program, intermediate code program, source program) of the control program of each of the apparatuses which is a software implementing the above-mentioned functions with a computer, and reading and performing the program code that the computer (or a CPU or a MPU) records in the recording medium.

For example, as the recording medium, a tape such as a magnetic tape or a cassette tape, a disc including a magnetic disc such as a floppy (trade name) disk/a hard disk and an optical disc such as a Compact Disc Read-Only Memory (CD-ROM)/Magneto-Optical disc (MO disc)/Mini Disc (MD)/Digital Versatile Disc (DVD)/CD Recordable (CD-R)/Blu-ray Disc (trade name), a card such as an IC card (including a memory card)/an optical card, a semiconductor memory such as a mask ROM/Erasable Programmable Read-Only Memory (EPROM)/Electrically Erasable and Programmable Read-Only Memory (EEPROM)/a flash ROM, or a Logical circuits such as a Programmable logic device (PLD), a Field Programmable Gate Array (FPGA), or the like can be used.

Each of the apparatuses is configured connectably with a communication network, and the program code may be supplied through the communication network. This communication network may be able to transmit a program code, and is not specifically limited. For example, the Internet, the intranet, the extranet, Local Area Network (LAN), Integrated Services Digital Network (ISDN), Value-Added Network (VAN), a Community Antenna television/Cable Television (CATV) communication network, Virtual Private Network, telephone network, a mobile communication network, satellite communication network, and the like are available. A transmission medium constituting this communication network may also be a medium which can transmit a program code, and is not limited to a particular configuration or a type. For example, a cable communication such as Institute of Electrical and Electronic Engineers (IEEE) 1394, a USB, a power line carrier, a cable TV line, a phone line, an Asymmetric Digital Subscriber Line (ADSL), or the like, and a radio communication such as infrared ray such as Infrared Data Association (IrDA) or a remote control, BluTooth (trade name), IEEE 802.11 radio communication, High Data Rate (HDR), Near Field Communication (NFC), Digital Living Network Alliance (DLNA), a cellular telephone network, a satellite channel, a terrestrial digital network, or the like are available. Note that the present invention can be also realized in the form of computer data signals embedded in a carrier wave where the program code is embodied by electronic transmission.

The present invention are not limited to the abovementioned embodiments, and various modifications are possible within the scope of the claims. Thus, embodiments obtained by combining technical means modified appropriately within the scope defined by claims are included in the technical scope of the present invention.

The present invention is not limited to each of the above-described embodiments. It is possible to make various modifications within the scope of the claims. An embodiment obtained by appropriately combining technical elements each disclosed in different embodiments falls also within the technical scope of the present invention. Further, when technical elements disclosed in the respective embodiments are combined, it is possible to form a new technical feature.

CROSS-REFERENCE TO RELATED APPLICATION

This application claims the benefit of priority to JP 2017-189061 filed on Sep. 28, 2017, which is incorporated herein by reference in its entirety.

REFERENCE SIGNS LIST

1 Video decoding apparatus (image decoding apparatus)
10 Decoding module
11 CT information decoding unit (decoding unit)
12 PU information decoding unit (decoding unit)
13 TT information decoding unit (decoding unit)
15, 35 Inverse quantization and inverse transform processing unit
16, 25 Frame memory
2 Video coding apparatus (image coding apparatus)
131 sec_idx decoding unit
132 amt_flag decoding unit
133 amt_idx decoding unit
21 CU information decoding unit
25 Frame memory
27 Transform and quantization unit

The invention claimed is:
1. An image decoding apparatus for performing an inverse transform of a transform coefficient on a prescribed unit basis, the image decoding apparatus comprising:
at least one processor; and a storage device coupled to the at least one processor and storing a program which, when executed by the at least one processor, causes the at least one processor to:

determine whether to apply a secondary transform to the transform coefficient to generate a modification transform coefficient;

apply a core transform to the modification transform coefficient by a first type core transform when the secondary transform is applied to the transform coefficient; and apply the core transform to the transform coefficient by a second type core transform different from the first type core transform when the secondary transform is not applied to the transform coefficient, wherein:

the second type core transform is selected with reference to a first syntax and a second syntax; and the first type core transform is selected with reference to the first syntax without reference to the second syntax.

2. The image decoding apparatus according to claim 1, wherein the second type core transform is a non-separable transform.

3. The image decoding apparatus according to claim 1, wherein the program, when executed by the at least one processor, further causes the at least one processor to:

receive a flag for the transform coefficient; and determine, based on the flag, whether to apply the secondary transform to the transform coefficient to generate the modification transform coefficient.

4. The image decoding apparatus according to claim 3, wherein the flag is identical to the first syntax.

5. The image decoding apparatus according to claim 4, wherein the first type core transform is a fixed transform independent to the second syntax and the second type core transform is a selective transform in which switching by the second syntax is performed.

6. The image decoding apparatus according to claim 1, wherein the first type core transform is selected with no reference to the second syntax.

7. An image coding apparatus comprising:

at least one processor; and a storage device coupled to the at least one processor and storing a program which, when executed by the at least one processor, causes the at least one processor to:

perform an inverse transform of a transform coefficient on a prescribed unit basis;

determine whether to apply a secondary transform to the transform coefficient to generate a modification transform coefficient;

apply a core transform to the modification transform coefficient by a first type core transform when the secondary transform is applied to the transform coefficient; and apply the core transform to the transform coefficient by a second type core transform different from the first type core transform when the secondary transform is not applied to the transform coefficient, wherein:

the second type core transform is selected with reference to a first syntax and a second syntax; and the first type core transform is selected with reference to the first syntax without reference to the second syntax.

* * * * *